(12) United States Patent
Noureldin et al.

(10) Patent No.: US 9,606,594 B2
(45) Date of Patent: Mar. 28, 2017

(54) METHODS FOR SIMULTANEOUS PROCESS AND UTILITY SYSTEMS SYNTHESIS IN PARTIALLY AND FULLY DECENTRALIZED ENVIRONMENTS

(71) Applicant: Saudi Arabian Oil Company, Dhahran (SA)

(72) Inventors: Mahmoud Bahy Noureldin, Dhahran (SA); Mana M. Al-Owaidh, Al-Khubar Al-Ulaya (SA); Abdulaziz Al-Nutaifi, Dammam (SA); Faisal F. Al-Musa, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 862 days.

(21) Appl. No.: 13/757,467

(22) Filed: Feb. 1, 2013

(65) Prior Publication Data
US 2013/0245844 A1  Sep. 19, 2013

Related U.S. Application Data

(60) Provisional application No. 61/612,470, filed on Mar. 19, 2012.

(51) Int. Cl.
| | | |
|---|---|---|
| G06F 1/26 | (2006.01) | |
| G05B 17/02 | (2006.01) | |
| G05B 17/00 | (2006.01) | |

(52) U.S. Cl.
CPC .............. G06F 1/26 (2013.01); G05B 17/00 (2013.01); G05B 17/02 (2013.01)

(58) Field of Classification Search
CPC ............ G05B 17/02; G05B 17/00; G06F 1/26
See application file for complete search history.

(56) References Cited

U.S. PATENT DOCUMENTS 4,455,614 A   6/1984  Martz et al.
5,479,358 A   12/1995 Shimoda et al.
(Continued)

FOREIGN PATENT DOCUMENTS

CN    1570784 A    1/2005
CN    1771413 A    5/2006
(Continued)

OTHER PUBLICATIONS

Rian Reyneme, energy optimization, Aspentech, Dec. 1, 2010.*
(Continued)

*Primary Examiner* — Christopher E Everett
(74) *Attorney, Agent, or Firm* — Bracewell LLP; Constance G. Rhebergen; Christopher L. Drymalla

(57) ABSTRACT

Methods of providing a combined synthesis of cost-effective heat and power (CHP) utility systems and the key process systems are provided. An exemplary method includes process steps for identifying the best key subsystem design and operating conditions for both the process and the utility systems. The method can include the step of determining an optimal allocation of steam and power between both process and utility systems for one or more industrial process facilities in both partially and totally decentralized environments. This can include defining rigorously bounded decision variables as model input data, processing the model input data by a combined heat and power utility and process subsystem mathematical program model, and determining a plurality of at least substantially optimal process and utility subsystem conditions.

43 Claims, 44 Drawing Sheets

(56) References Cited

U.S. PATENT DOCUMENTS

| | | | |
|---|---|---|---|
| 5,841,652 A | 11/1998 | Sanchez | |
| 5,886,895 A | 3/1999 | Kita et al. | |
| 6,134,511 A | 10/2000 | Subbarao | |
| 6,681,155 B1 | 1/2004 | Fujita et al. | |
| 6,757,591 B2 | 6/2004 | Kramer | |
| 7,433,743 B2 | 10/2008 | Pistikopoulos et al. | |
| 7,580,817 B2* | 8/2009 | Bing | G01W 1/10 703/6 |
| 7,698,022 B2 | 4/2010 | Noureldin et al. | |
| 7,729,809 B2 | 6/2010 | Noureldin | |
| 7,873,443 B2 | 1/2011 | Noureldin et al. | |
| 7,900,451 B2 | 3/2011 | Amir et al. | |
| 7,974,826 B2 | 7/2011 | Davari et al. | |
| 8,032,262 B2 | 10/2011 | Noureldin | |
| 8,116,918 B2 | 2/2012 | Noureldin et al. | |
| 8,116,920 B2 | 2/2012 | Noureldin | |
| 8,150,559 B2 | 4/2012 | Noureldin | |
| 8,150,560 B2 | 4/2012 | Noureldin | |
| 8,311,682 B2 | 11/2012 | Noureldin et al. | |
| 8,364,013 B2 | 1/2013 | Nijim | |
| 2003/0125843 A1 | 7/2003 | Prasad | |
| 2003/0125905 A1 | 7/2003 | Patanian et al. | |
| 2005/0107895 A1 | 5/2005 | Pistikopoulos et al. | |
| 2005/0116475 A1 | 6/2005 | Hibi | |
| 2006/0116789 A1 | 6/2006 | Subramanian | |
| 2007/0067068 A1 | 3/2007 | Havlena et al. | |
| 2007/0168174 A1 | 7/2007 | Davari et al. | |
| 2008/0015839 A1 | 1/2008 | Noureldin et al. | |
| 2008/0257413 A1 | 10/2008 | Noureldin et al. | |
| 2009/0228291 A1 | 9/2009 | Rothberg et al. | |
| 2010/0030547 A1* | 2/2010 | Noureldin | F22B 33/00 703/18 |
| 2010/0070258 A1 | 3/2010 | Noureldin | |
| 2010/0223198 A1 | 9/2010 | Noureldin et al. | |
| 2010/0332373 A1 | 12/2010 | Crabtree et al. | |
| 2011/0046997 A1* | 2/2011 | Noureldin | F01K 13/02 705/7.12 |
| 2011/0046998 A1* | 2/2011 | Noureldin | F01K 13/02 705/7.37 |
| 2011/0054715 A1* | 3/2011 | Noureldin | F01K 13/02 700/300 |
| 2011/0066258 A1 | 3/2011 | Torzhkov et al. | |
| 2011/0087380 A1 | 4/2011 | Noureldin | |
| 2011/0087475 A1* | 4/2011 | Noureldin | F01K 13/02 703/9 |
| 2011/0106504 A1* | 5/2011 | Noureldin | G06F 17/5009 703/1 |
| 2011/0112698 A1 | 5/2011 | Edwards | |
| 2011/0178835 A1* | 7/2011 | Noureldin | F01K 13/02 705/7.23 |
| 2011/0276160 A1 | 11/2011 | Kelly et al. | |
| 2012/0010757 A1 | 1/2012 | Francino et al. | |
| 2012/0010758 A1 | 1/2012 | Francino et al. | |
| 2012/0041610 A1 | 2/2012 | Varigonda et al. | |
| 2012/0166616 A1 | 6/2012 | Meehan et al. | |

FOREIGN PATENT DOCUMENTS

| | | |
|---|---|---|
| CN | 101203871 A | 6/2008 |
| CN | 101512448 A | 8/2009 |
| CN | 101751620 A | 6/2010 |
| JP | 2004334451 | 11/2004 |
| NZ | 527244 | 7/2003 |
| WO | 0108054 A2 | 2/2001 |
| WO | 2005010783 A1 | 2/2005 |
| WO | 2007149582 A2 | 12/2007 |
| WO | 2009149447 A2 | 12/2009 |
| WO | 2010088657 A2 | 8/2010 |

OTHER PUBLICATIONS

The International Search Report and Written Opinion for Related PCT Application PCT/US2013/031254, Jul. 3, 2013.

The International Search Report and Written Opinion for Related PCT Application PCT/US2013/031351, Jul. 3, 2013.

The International Search Report and Written Opinion for Related PCT Application PCT/US2013/031254, Jul. 3, 2013; pp. 1-9.

The International Search Report and Written Opinion for Related PCT Application PCT/US2013/031351, Jul. 3, 2013; pp. 1-9.

De Ruyck, et al., "Broadening the Capabilities of Pinch Analysis Through Virtual Heat Exchanger Networks," Energy Conversion & Management 44 (2003); pp. 2321-2329.

Dhole, V.R., et al.; "Total Site Targets for Fuel, Co-Generation, Emissions, and Cooling" Department of Chemical Engineering, University of Manchester Institute of Science and Technology, European Symposium on Computer Aided Process Engineering (1992); pp. S101-S109.

Lagaros, et al., "Multi-Objective Design Optimization Using Cascade Evolutionary Computations" Comput. Methods Appl. Mech. Engrg. 194 (2005); pp. 3496-3515.

Mavromatis, S.P. and Kokossis, A.C.; "Conceptual Optimisation of Utility Networks for Operational Variations—1. Targets and Level Optimisation." Chemical Engineering Science, (Jan. 1997) vol. 53, No. 8, pp. 1585-1608.

Mohan, T., and El-Halwagi, M.; "Al Algebraic Targeting Approach for Effective Utilization of Biomass in Combined Heat and Power Systems Through Process Integration," Clean Techn Environ Policy (2007) 9; pp. 13-25.

Nordman, Roger; "New process integration methods for heat-saving retrofit projects in industrial systems", Thesis for the Degree of Doctors of Philosophy, 2005, pp. 1-89.

PCT International Search Report and Written Opinion, European Patent Office, International Application No. PCT/US2009/046595, Sep. 7, 2011; pp. 1-15.

Petchers, N.; "An Integrated Approach to Energy Resource Optimization" Chapter 8, Combined Heating, Cooling & Power Handbook: Technologies & Applications, (2003); pp. 1-23.

Press, W.H., et al.; "Chapter 10. Maximization or Maximization of Functions" Numerical Recipes in Pascal. Art of Scientific Computing, Cambridge, Cambridge Univ. Press Jan. 1, 1989, pp. 274-334, XP-002122410.

Pretty, B., and Rutkowski, M.A.; "A Road Map for Long Term Energy Savings," 2001 Chem Show, (Oct. 23-25, 2001); pp. 1-10.

Ravagnani, et al.; "Heat Exchanger Network Synthesis and Optimisation Using Genetic Algorithm" Applied Thermal Engineering 25 (2005); pp. 1003-1017.

Reyneke, "Energy Optimization: Energy efficiency through the asset lifecycle in the Petroleum Industry", Slide Show, 2010, pp. 2-41, Aspen Technology.

Serna, Medaro, et al., "An Area Targeting Algorithm for the Synthesis of Heat Exchanger Networks" Chemical Engineering Science, Oxford, GB, vol. 59, No. 12 (2004); pp. 2517-2520.

* cited by examiner

FIG. 4A

SYSTEMATIC METHOD FOR COLUMNS INTEGRATION UNDER POSSIBLE COMBINATIONS OF REFLUX RATIO AND OPERATING PRESSURE MODIFICATIONS

| | 1 | 2 | 3 | 4 | 5 |
|---|---|---|---|---|---|
| 1<N<9 | PROCESS | D1 | D2 | D3 | D4 |

(A) TOTAL PROCESS INTEGRATION

N:
REPRESENTS NUMBER OF DISTILLATION COLUMNS IN A PROCESS PLANT AND "PROCESS"(WHICH IS THE REST-OF –THE-PROCESS SUBSYSTEM STREAMS TO BE COOLED) OF STREAMS TO BE HEATED AND

OPTIONS:
REPRESENTS THE TOTAL NUMBER OF POSSIBLE COMBINATIONS FOR ENERGY INTEGRATION OF DISTILLATION COLUMNS WITH THE REST-OF-PROCESS AND AMONG THEMSELVES

Sets:
REPRESENT LIST OF ENERGY INTEGRATION OPTIONS AMONG DISTILLATION COLUMNS AND WITH THE REST-OF-PROCESS

| N | 5 |
|---|---|
| Options | 52 |

[Do It]

| ITEM1 | ITEM2 | ITEM3 | ITEM4 | ITEM5 | SETS |
|---|---|---|---|---|---|
| 0 | 0 | 0 | 0 | 0 | {1,2,3,4,5} |
| 0 | 0 | 0 | 0 | 1 | {1,2,3,4}{5} |
| 0 | 0 | 0 | 1 | 0 | {1,2,3,5}{4} |
| 0 | 1 | 2 | 2 | 0 | {1,5}{2}{3,4} |
| 0 | 1 | 2 | 2 | 1 | {1}{2,5}{3,4} |
| 0 | 1 | 2 | 2 | 2 | {1}{2}{3,4,5} |
| 0 | 1 | 2 | 2 | 3 | {1}{2}{3,4}{5} |
| 0 | 1 | 2 | 3 | 0 | {1,5}{2}{3}{4} |
| 0 | 1 | 2 | 3 | 1 | {1}{2,5}{3}{4} |
| 0 | 1 | 2 | 3 | 2 | {1}{2}{3,5}{4} |
| 0 | 1 | 2 | 3 | 3 | {1}{2}{3}{4,5} |
| 0 | 1 | 2 | 3 | 4 | {1}{2}{3}{4}{5} |

SYSTEMATIC METHOD FOR COLUMNS "AMONG-THEMSELVES-INTEGRATION"
UNDER POSSIBLE COMBINATIONS OF REFLUX RATIO AND OPERATING PRESSURE MODIFICATIONS (B) DISTILLATION COLUMNS-ONLY INTEGRATION

| 1 | 2 | 3 | 4 |
|---|---|---|---|
| D1 | D2 | D3 | D4 |

| N | 4 |
|---|---|
| Options | 15 |

[Do It]

1<N<9

| Item1 | Item2 | Item3 | Item4 | Sets |
|-------|-------|-------|-------|------|
| 0 | 0 | 0 | 0 | 0 {1, 2, 3, 4} |
| 0 | 0 | 0 | 1 | 1 {1, 2, 3}{4} |
| 0 | 0 | 1 | 0 | 1 {1, 2, 4}{3} |
| 0 | 0 | 1 | 1 | 1 {1, 2}{3, 4} |
| 0 | 1 | 0 | 0 | 2 {1, 2}{3}{4} |
| 0 | 1 | 0 | 1 | 0 {1, 3, 4}{2} |
| 0 | 1 | 1 | 0 | 1 {1, 3}{2, 4} |
| 0 | 1 | 1 | 1 | 2 {1, 3}{2}{4} |
| 0 | 1 | 1 | 2 | 0 {1, 4}{2, 3} |
| 0 | 1 | 2 | 1 | 1 {1}{2, 3, 4} |
| 0 | 1 | 2 | 2 | 2 {1, 4}{2, 3} |
| 0 | 1 | 1 | 2 | 0 {1}{2, 3}{4} |
| 0 | 1 | 2 | 1 | 1 {1, 4}{2}{3} |
| 0 | 1 | 2 | 2 | 2 {1}{2, 4}{3} |
| 0 | 1 | 2 | 2 | 3 {1}{2}{3, 4} |

N: REPRESENTS NUMBER OF DISTILLATION COLUMNS IN A PROCESS PLANT

OPTIONS: REPRESENTS THE TOTAL NUMBER OF POSSIBLE COMBINATIONS FOR ENERGY INTEGRATION OF DISTILLATION COLUMNS AMONG THEMSELVES

SETS: REPRESENT LIST OF ENERGY INTEGRATION OPTIONS AMONG DISTILLATION COLUMNS

FIG. 4B

PROCESS STEAM DEMAND INTERVALS (E.G. 3 HEADERS CONFIGURATION)

| HP | | | MP | | | | LP | | | |
|---|---|---|---|---|---|---|---|---|---|---|
| Pr | Tmp | Min | Max | Pr | Tmp | Min | Max | Pr | Tmp | Min | Max |
| 625 | 730 | 15 | 44 | 450 | 457 | 400 | 1000 | 140 | 354 | 1000 | 3000 |
| 625 | 730 | 15 | 44 | 450 | 457 | 600 | 1200 | 100 | 329 | 1500 | 3200 |
| 625 | 730 | 15 | 44 | 450 | 457 | 450 | 1300 | 75 | 309 | 1100 | 3400 |
| 625 | 730 | 15 | 44 | 340 | 430 | 500 | 1000 | 140 | 354 | 1500 | 3000 |
| 625 | 730 | 15 | 44 | 340 | 430 | 250 | 1200 | 100 | 329 | 2000 | 3200 |
| 625 | 730 | 15 | 44 | 340 | 430 | 600 | 1300 | 75 | 309 | 1000 | 3500 |
| 625 | 730 | 15 | 44 | 270 | 409 | 600 | 1000 | 140 | 354 | 1000 | 3100 |
| 625 | 730 | 15 | 44 | 270 | 409 | 543 | 1200 | 100 | 329 | 1286 | 3300 |
| 625 | 730 | 15 | 44 | 270 | 409 | 557 | 1300 | 75 | 309 | 1282 | 3400 |

PROCESS STEAM GENERATION INTERVALS

| HP-Process Htr | | MP-Process Htr | | LP-Process Htr | |
|---|---|---|---|---|---|
| Min | Max | Min | Max | Min | Max |
| 0 | 500 | 0 | 500 | 0 | 500 |
| 0 | 500 | 0 | 500 | 0 | 500 |
| 0 | 500 | 0 | 500 | 0 | 500 |
| 0 | 500 | 0 | 500 | 0 | 450 |
| 0 | 500 | 0 | 500 | 0 | 450 |
| 0 | 500 | 0 | 500 | 0 | 450 |
| 0 | 500 | 0 | 500 | 0 | 450 |
| 0 | 500 | 0 | 500 | 0 | 450 |
| 0 | 500 | 0 | 500 | 0 | 450 |

AVAILABLE FUELS AND THEIR OPERATING COST

| Fuel Type | HHV | Cost $/MMBtu | Max. Available |
|---|---|---|---|
| Fuel Gas | | | |
| Desil | | | |
| Fuel Oil | | | |
| Curde | | | |

POWER EXPORT INTERVAL

| Power Export | Min | Max |
|---|---|---|
| MW | 0 | 120 |

POWER DEMAND INTERVAL

| Power Demand | Fixed Load | Switchable load to STs | Min Pwr Demand | Max Pwr Demand |
|---|---|---|---|---|
| MW | 20 | 15 | 20 | 35 |

FIG. 13

| EQUIPMENT LIST | | |
|---|---|---|
| EQUIP. NAME | MIN | MAX |
| HP- BOILER | 0 | 4000 |
| HP-COGEN | 0 | 4000 |
| MPi- BOILER | 0 | 4000 |
| MPi- COGEN | 0 | 4000 |
| ː | | |
| HP-PROCESS STMGEN | 300 | 500 |
| MPi-PROCESS STMGEN | 250 | 500 |
| ː | | |
| LPN-PROCESS STMGEN | 90 | 450 |
| ː | | |
| STG-HP-MPi | 0 | 2000 |
| ː | | |
| STG-HP-LPn | 0 | 2000 |
| ː | | |
| STG-MPi-LPn | 0 | 2000 |
| ː | | |
| STG-HP-COND | 0 | 2500 |
| SOLAR HP-STM | 0 | 400 |
| SOLAR MPi-STM | 0 | 500 |
| ː | | |
| SOLAR LPN-STM | 0 | 500 |
| ː | | |
| SOLAR BFW-PREHEAT TEMP. | 0 | 50 |

NO. OF HEADERS DEFINITION:
i: = NUMBER OF MEDIUM PRESSURE STEAM HEADERS
n: = NUMBER OF LOW PRESSURE STEAM HEADERS

| NO. HEADERS | HP | MPi | LPn |
|---|---|---|---|
| 2 | 1 | 0 | 1 |
| 3 | 1 | 1 | 1 |
| 4 | 1 | 2 | 1 |
| 5 | 1 | 3 | 1 |
| 6 | 1 | 3 | 2 |
| 7 | 1 | 4 | 2 |

FIG. 14

| STEAM TURBINES & MOTORS LIST | | | | |
|---|---|---|---|---|
| Type | SERVICE | SWITCHABLE/NOT | RATED HP | EFF.% |
| MOTOR-XX | SERVICE-1 | YES | | |
| MOTOR-XX | | YES | | |
| MOTOR-XX | | NO | | |
| MOTOR-XX | | NO | | |
| MOTOR-XX | SERVICE-2 | NO | | |
| MOTOR-XX | | NO | | |
| MOTOR-XX | | YES | | |
| MOTOR-XX | | YES | | |
| MOTOR-XX | SERVICE-3 | NO | | |
| MOTOR-XX | | NO | | |
| MOTOR-XX | | NO | | |
| MOTOR-XX | | NO | | |
| MOTOR-XX | SERVICE-I | YES | | |
| MOTOR-XX | | YES | | |
| MOTOR-XX | | YES | | |
| MOTOR-XX | | YES | | |
| MOTOR-XX | | YES | | |
| MOTOR-XX | | | | |

| Type | SERVICE | SWITCHABLE/NOT | RATED HP | STM RATE (STM/HP) |
|---|---|---|---|---|
| ST-XX | SERVICE-1 | YES | | |
| ST-XX | | YES | | |
| ST-XX | | NO | | |
| ST-XX | | NO | | |
| ST-XX | SERVICE-2 | NO | | |
| ST-XX | | NO | | |
| ST-XX | | YES | | |
| ST-XX | | YES | | |
| ST-XX | SERVICE-3 | NO | | |
| ST-XX | | NO | | |
| ST-XX | | NO | | |
| ST-XX | | NO | | |
| ST-XX | SERVICE-I | YES | | |
| ST-XX | | YES | | |
| ST-XX | | YES | | |
| ST-XX | | YES | | |
| ST-XX | | YES | | |
| ST-XX | | | | |

FIG. 15

| Symbol | Discretion |
|---|---|
| A | CogenerationUnits |
| B | BoilersProducing High Pressure Steam |
| C | Solar Thermal for SteamGenerationat Mediumpressure header |
| D | Process heating or Furnace Generating Mediumpressure steam |
| E | Steam System Network Balance Summary |
| F | High Pressure Steam Header and HeaderProperties |
| G | HighPressure Steam Users (Heat Exchangers, columns, and so on) |
| H | Reducing station unit from High pressure header to Medium Pressure steam header |
| I | Back Pressure Steam Turbines Driving Mechanical Loads (pumps, compressors, fans...) |
| J | Back Pressure Steam Turbines Drives Generator |
| K | Solar Thermal for heating boiler feed water (BFW)on the condensate header |
| L | CondensingSteam Turbines Drives Generator |
| M | Process heating or Furnace Generating Lowpressure steam |
| N | De-super-heaterunit at low pressure st eam header (injecting BFW to maintain header properties) |
| O | Deaeratorunits to remo ve air and pre-heat BFW |
| P | Medium Pressure Steam Users (Heat Exchangers, columns, and so on) |
| Q | Low Pressure Steam Users (Heat Exchangers, columns, and so on) |
| R | Flash drum to Recover steam from BD |
| S | Make-up Water to plant |
| T | Steam Fin-Fan Condensers to condense lowpressure steam |

FIG. 17

```
MIN AREA   PROJECTS                                    HELP
    EDITING PROJECT
   NAME:    ONE HOT, TWO COLD EXAMPLE
   SOURCE: # HEAT EXCHANGERS....
            heat_exchanger "H1"
            heat_exchanger "H2"

# JUNCTIONS....
            junctions"J1"
            junctions"J2"
            junctions"J3"
            junctions"J4"
            junctions"J5"
            junctions"J6"

# STREAMS....
            stream"H1_in"
            stream"H1_out"
            stream"c1"
            stream"c2"

h1_in > junction("J1")
            junction("J1") > junction("J2")
            junction("J1") = junction("J2")

junction("J2") >   heat_exchanger ("H1").hot  > junction("J6") >
            junction("J4") > stream("H1_out")
            stream ("c1")  >> heat_exchanger ("H1").cold junction("J3") >   heat_exchanger ("H2").hot  > junction("J5") >
            junction("J4")
            stream ("c2")  >> heat_exchanger ("H2").cold junction("J5") > junction("J2")
            junction("J6") = junction("J3")
```

```
c1_in  >   j1
```
Means stream c1_in feeds into junction J1 ...

```
j1  >  j2
```
Means there is a stream flowing out of junction J1 into junction J2 ...

```
e1.cold
```
Refers to the cold side of the heat exchanger E1

```
cu1 >> u1.cold
```
Means stream cu1 enters the cold side of heat exchanger U2 and then exits the network (no longer connected) (mainly external hot/cold utilities)

```
junction("J1")
junction("J2")

stream("H1_in") ; stream("H2_in"); stream("H1_out"); stream("H2_out");
stream("C1_in") ; stream("C2"); stream("C1_out"); stream("C2_out");
stream("CU1") ; stream("HU2"); stream("HU3");

heat_exchanger("E1");heat_exchanger("E2");heat_exchanger("E3");heat_exchanger("E4");

heat_exchanger("U1");heat_exchanger("U2");heat_exchanger("U3");
```

[A] → # network Connections .....

[B] →
```
c1_in > j1 > e3.cold > u3.cold > c1_out
j1 > j2
j1 > e1.cold > j2
```

```
c2_in > e2.cold > e4.cold > u2.cold > c2_out h1_in > e1.hot > e2.hot > h1_out
h2_in > e3.hot > e4.hot > u1.hot > h2_out cu1 >> u1.cold
hu2 >> u2.hot
hu3 >> u3.hot
```

FIG. 24B

MIN AREA    PROJECTS                                                                                    HELP

EDITING PROJECT        EXAMPLE 1

NAME: EXAMPLE 1

HEAT EXCHANGERS (7)

| NAME | Q MIN | Q MAX | dtmin MIN | dtmin MAX | U |
|------|-------|-------|-----------|-----------|-----|
| E1   | 100.0 | 100.0 | 10.0      | i         | 1.2 |
| E2   | 200.0 | 200.0 | 10.0      | i         | 1.5 |
| E3   | 400.0 | 440.0 | 10.0      | i         | 1.0 |
| E4   | 260.0 | 300.0 | 10.0      | i         | 2.0 |
| U1   | 60.0  | 100.0 | 10.0      | i         | 1.5 |
| U2   | 120.0 | 120.0 | 10.0      | i         | 2.0 |
| ~~U3~~ | ~~260.0~~ | ~~300.0~~ | ~~10.0~~ | ~~i~~ | ~~2.0~~ |

STREAMS (53)

| NAME   | TEMP MIN | TEMP MAX | FCb MIN | FCb MAX |
|--------|----------|----------|---------|---------|
| H1_in  | 510.0    | 510.0    | 1.0     | 1.0     |
| H2_in  | 610.0    | 630.0    | 2.0     | 2.0     |
| H1_out | 210.0    | 210.0    | 1.0     | 1.0     |
| H2_out | 200.0    | 200.0    | 2.0     | 2.0     |

For each heat exchanger enter:
- min, max Q
- Min, max × ΔT_min
- U

For each stream enter:
- Min, max Temp
- Min, max FCp

ENTERING "i" AS LIMIT VALUE CAUSES IGNORING THAT LIMIT (MIN AND MAX DATA ONLY)
IF MIN = MAX THEN AN EQUALITY CONSTRAINT IS AUTO GENERATED

INTERMEDIATE STREAMS ARE AUTO-GENERATED

FIG. 26

| MIN AREA   PROJECTS | HELP |
|---|---|

EXAMPLE 1  [BACK]

```
model
H1_in_temp=510.0 ;
H1_in_fcb -1.0 ;
H2_in_temp>=610.0 ; H2_in_temp<=610.0 ;
H2_in_fcb=2.0 ;
H1_out_temp=210.0 ;
H1_out_fcb=1.0 ;
H2_out_temp - 230.0 ;
H2_out_fcb=2.0 ;
C1_in_temp=400.0 ;
C2_in_fcb=4.0 ;
C2_in_temp>=150.0 ; C2_in_temp<=170.0 ;
C2_in_fcb=2.0 ;
C1_out_temp=600.0 ;
C1_out_fcb=4.0 ;
C2_out_temp=460.0 ;
C2_out_fcb=2.0 ;
CU1_temp=220.0 ;
CU1_fcb>=60.0 ; CU1_fcb<=100.0 ;
HU2_temp=480.0 ;
HU2_fcb =120.0 ;
HU3_temp=630.0 ;
HU3_fcb>=260.0 ;HU3_fcb<=300.0 ;
CU1_exiting_temp=221.0 ;
CU1_exiting_fcb>=60.0 ; Cu1_exiting_fcb<=100.0 ;
HU2_exiting_temp=479.0 ;
HU2_exiting_fcb =120.0 ;
HU3_exiting_temp=629.0 ;
HU3_exiting_fcb>=260.0 ;Hu3_exiting_fcb<=300.0 ;
E1_q=100.0;
E1_theta-_1>=10.0;
```

[SELECT MODEL]

| MIN AREA   PROJECTS | | HELP |
|---|---|---|

EXAMPLE 1 [BACK]

GLOBAL OPTIMAL SOLUTION FOUND.

| | |
|---|---|
| OBJECTIVE VALUE: | 24.80031 |
| OBJECTIVE BOUND: | 24.80030 |
| INFEASIBILITIES: | 0.1932676E-11 |
| EXTENDED SOLVER STEPS: | 12 |
| TOTAL SOLVER ITERATIONS: | 13155 |

| VARIABLE | VALUE | REDUCED COST |
|---|---|---|
| H1_IN_TEMP | 510.0000 | 0.000000 |
| H1_IN_FCB | 1.000000 | 0.000000 |
| H2_IN_TEMP | 630.0000 | 0.000000 |
| H2_IN_FCB | 2.000000 | 0.000000 |
| H1_OUT_TEMP | 210.0000 | 0.000000 |
| H1_OUT_FCB | 1.000000 | 0.000000 |
| H2_OUT_TEMP | 230.0000 | 0.000000 |
| H2_OUT_FCB | 2.000000 | 0.000000 |
| C1_IN_TEMP | 400.0000 | 0.000000 |
| C1_IN_FCB | 4.000000 | 0.000000 |
| C2_IN_TEMP | 150.0000 | 0.000000 |
| C2_IN_FCB | 2.000000 | 0.000000 |
| C1_OUT_TEMP | 600.0000 | 0.000000 |
| C1_OUT_FCB | 4.000000 | 0.000000 |
| C2_OUT_TEMP | 460.0000 | 0.000000 |
| C2_OUT_FCB | 2.000000 | 0.000000 |
| CU1_TEMP | 220.0000 | 0.000000 |
| CU1_FCB | 100.0000 | 0.000000 |
| HU2_TEMP | 480.0000 | 0.000000 |
| HU2_FCB | 120.0000 | 0.000000 |
| HU3_TEMP | 630.0000 | 0.000000 |
| HU3_FCB | 300.0000 | 0.000000 |
| CU1_EXITING_TEMP | 221.0000 | 0.000000 |
| CU1_EXITING_FCB | 100.0000 | 0.000000 |
| HU2_EXITING_TEMP | 479.0000 | 0.000000 |
| HU2_EXITING_FCB | 120.0000 | 0.000000 |
| HU3_EXITING_TEMP | 629.0000 | 0.000000 |
| HU3_EXITING_FCB | 300.0000 | 0.000000 |
| E1_Q | 100.0000 | 0.000000 |
| E1_THETA_1 | 10.00000 | 0.000000 |
| E1_THETA_2 | 37.21692 | 0.000000 |

U (OVERALL HEAT TRANSFER COEFFICIENT) FOR EACH EXCHANGER SERVICE; IS AS FOLLOWS

{Ui-p-to-p} = {1.2, 1.5, 1.0, 2.0} (kW/m2.°K)
{Ui-utility} = {1.5, 2.0, 2.0}
{ΔTmin-ij} = 10 °K

FIG. 32

METHODS FOR SIMULTANEOUS PROCESS AND UTILITY SYSTEMS SYNTHESIS IN PARTIALLY AND FULLY DECENTRALIZED ENVIRONMENTS

RELATED APPLICATIONS

This non-provisional patent application claims priority to and the benefit of U.S. Provisional Patent Application No. 61/612,470, filed on Mar. 19, 2012, titled "System, Method, and Computer Program For Simultaneous Processing Utility Systems Synthesis in Partially and Fully Decentralized Environments," and is related to U.S. Non-Provisional application titled "Systems and Computer Programs For Simultaneous Process and Utility Systems Synthesis in Partially Fully Decentralized Environments," filed on Feb. 1, 2013, as U.S. application Ser. No. 13/757,491, each incorporated by reference in its entirety. See Appendix 1 for a list of additional related applications.

BACKGROUND OF THE INVENTION

Field of the Invention

The present invention relates in general to the field of energy management systems, and in particular, to systems, computer program code, and methods related to simultaneously synthesizing cost-effective combined heat and power utility systems and the process plant's heat exchangers network and distillation network sequence.

Description of the Related Art

Many different types of processes consume multiple steam levels and electricity to obtain an output result, or to produce a required product or compound. For large-scale processes that consume significant amounts of steam, it is preferable to optimize the consumption of energy through careful operation, design or reconfiguration of the plant and the equipment used. Further, in some industrial manufacturing processes, specific streams of material flows need to be supplied to different types of equipment and machinery at specific temperatures. These material flows may need to be heated or cooled from an original starting or supply temperature to a target temperature. This, in turn, will require the consumption of steam to heat specific streams and consumption of water, for example, to cool down specific streams. Energy to heat or cool down the specific streams can come from utility plant systems and/or through a network of heat exchange units which can recover potentially lost energy, reducing the amount of energy needed from the utility plant systems.

In nowadays mega complexes, the cost of fuel, power and its infrastructure as well as the site process heat exchangers network (HEN) and distillation network can be huge. A total site utility system in a chemical processing site, interlinked to the chemical plants production processes, for example, provides heat and power to chemical production processes. The economic performance of the total site utility systems directly influences the operating cost of the chemical processing site, hence it is recognized by the inventors that improvements in the synthesis of process subsystems and the total site utility systems can lead to significant savings.

Two basic approaches have been developed for the synthesis of utility systems (CHP). The first one is based on thermodynamic performance of the plant and aims in maximizing the plant's overall energy efficiency. Some optimization techniques may be included as part of the solution procedures. The second approach only uses optimization methods such as, for example, MILP and MINLP to satisfy the predefined targets/demands. In the methods that have been employed in both commercial software (e.g. Aspen Utilities Planner of Aspentech, Star software of university of Manchester/PI department, and ProSteam of KBC) and academic literatures, the task has been to design a utility plant that satisfies given/specific steam and power demands. This approach was later extended to account for uncertainty and disturbance in such one-time given/specific power and steam demand to multi-periods of again specific/given power and steam demand.

The state-of-the-art methodology presently adopted by the industrial community (e.g., process engineering departments) and academia, is also employed without systematic consideration of both distillation columns subsystem best sequence, design and operating conditions, and HEN synthesis, as well as best design conditions using high fidelity utility CHP details. The inventors have recognized that such approach is performed without considering the process degrees of freedom in the design of HEN, large distillation network sequence, or small but important groups of distillation network sequence or using the best process conditions to enable the best synthesis of the utility system. That is, recognized by the inventors is that the state-of-the-art fails to recognize or employ simultaneous syntheses of such subsystems, CHP, distillation columns, HEN, and/or the rest of process conditions. The numerous potential combinations of the degrees of freedom in both utility system and the key process systems such as, for example, HEN and process distillation network sequence and process design and operating conditions, however, can allow significant opportunity for both systems' syntheses optimization.

The combination of the two approaches as been demonstrated. Neither one of the combined approaches addressed the simultaneous synthesis of key process systems, such as, for example, the distillation sequence system, the HEN system, much less taking into consideration all possible combinations of process changes in the rest of the process such as temperature, pressure, reflux ratio, inter-coolers, and inter-heaters, in distillation columns, and so on, with the utility system synthesis.

In order to try to "optimize" energy recovery in both the process and the utility plants, the state-of-the-art has generally attempted to solve the synthesis problem by utilizing two entirely decomposed optimization problems: one for the chemical/process plant and one for the utility plant. Those two problems are currently solved in most of the companies by two different teams, either located in two separately decentralized departments within the same company, or in two different companies with the first being in the process plant and the second being in the utility plant. According to such conventional methodology, the process synthesis team/group dictates the process steam demand and process steam generation as well as equipment driver's type (motor or steam) to the utility subsystem (CHP) synthesis team/group, ahead of the CHP synthesis.

As such, the utility system synthesis problem is always addressed in both industry and academia as a "follower" objective problem. The process is always synthesized first and its process conditions are set. Thereafter the desired steam quantity and quality are defined to the utility system. The decision for process liquid and gas driving using motors driven or steam turbine driven pumps and compressors are decided ahead of the utility system synthesis. Such arguably archaic approach applied by managers in the decentralized company office emanates from an adherence to decisions made in the past, where the utility system was merely a bunch of boilers and the major capital in the facility was the process systems (e.g., distillation and HEN subsystems).

Recognized by the inventors, however, is that as a result of the new era of cogeneration, tri-generation and even quadra-generation where power and water emerged as new products, it may be more economically prudent to "change the chairs" such that the process systems, such as the HEN and distillation network, become the "follower" and the "utility system" becomes the "leader". The inventors further recognize that the "utility system synthesis guy" can provide better results where his counterpart "process synthesis guy" cooperates, especially if the capital cost of the utility system is much higher than that of HEN and/or distillation network. Naturally, effective management of such utility systems syntheses can render big impact on projects' profitability and life cycle success.

Nevertheless, also recognized is that even in case of the closeness in capital cost between the utility system and the process system, the problem may become one of conflicting design objectives types. The problem can also become a little more complicated when the designer and/or the owner of the central utility system providing utilities to the chemical complex is a "third party" (other than the chemical company owner) who may have an investment plan of his own and limited project budget, and/or may represent the country national power grid. In such case, conflicting objectives may arise that may need to be addressed and solved between the chemical complex owner and the utility system owner in order to produce a result which satisfies both parties. Hence, it is recognized that there is a need for a different solution approach than the currently available in both industry and academia.

Correspondingly, recognized is the need for systems, computer program, and methods synthesizing cost-effective combined heat and power (CHP) utility systems and the process plant's heat exchangers network and distillation network sequence, which can identify its/the best key design and operating conditions in both partially and totally decentralized environments in order to address the problem of obtaining an optimal tradeoff among the CHP utility system synthesis and the key process units (HEN and distillation sequences) syntheses in mega facilities, which require many complex and huge interactions to be explored for best economic decisions.

SUMMARY OF THE INVENTION

In view of the foregoing, various embodiments of the present invention advantageously provide systems, computer programs, computer readable media, and methods of providing a combined synthesis of cost-effective heat and power (CHP) utility systems and the key process systems (e.g., process plant's heat exchangers network and distillation network sequence), which can include identifying its best key design and operating conditions in both partially and totally decentralized environments. Advantageously, various embodiments of the present invention address the problem of obtaining an optimal tradeoff among the CHP utility system synthesis and the key process units (heat exchanger network (HEN) and distillation sequences) syntheses in mega facilities, which require many complex and huge interactions to be explored for best economic decisions.

One particular aspect where current approaches have an important limitation is in accounting explicitly for the interactions that take place when synthesizing total processing systems that include several major components such as hot utility system, HEN and chemical plant processing units. Various embodiments of the present invention can advantageously overcome such limitation by allowing virtual simultaneous selection of structural, design and operating parameters of the hot utility system, HEN and the "key" process units (distillation columns).

According to one or more embodiments of the present invention, a unique formulation is presented by a CHP utility and process system/subsystem mathematical model, which can advantageously explicitly account for the interactions that take place in the syntheses of CHP, HEN, and distillation networks/key process units and systems. The solved problem's degrees of freedom can advantageously include: the utility system super structure, the HEN, the process operating parameter/conditions, the process design parameters/conditions, and the structural parameters for some key process units such as distillation, absorption, adsorption, stripping and its operating pressure. The degrees of freedom can also include the reflux ratio, number of stages, and the columns intra-heaters and intra-coolers, as well as the different potential sequences. The degrees of freedom can further include different sources of fuel, boilers, gas turbines, HRSGs, and steam turbines different configurations (each having minimum and maximum levels).

For example, various embodiments of the present invention advantageously provide systematic methods, computer programs, computer readable media, and systems for the simultaneous syntheses of combined heat and power (CHP) utility and process subsystems for a facility or cluster of process facilities, e.g., usable by chemical process industries. One or more exemplary embodiments can include/perform one or more of the following the steps/operations: determining an optimal allocation of steam and power between both process and utility systems for one or more industrial process facilities, and determining a plurality of at least substantially optimal process and utility subsystem conditions. The steps/operations can include: defining a plurality of rigorously bounded process variables for one or more process plants/facilities as decision variables to thereby form model input data for a CHP utility and process subsystem mathematical program model, processing the model input data by the CHP utility and process subsystem mathematical program model, and determining the plurality of at least substantially optimal process and utility subsystem conditions. The decision variables can include a process steam demand interval at each of a plurality of different steam pressure levels and/or a process power generation interval, with the interval describing the respective upper and lower bounds of the respective variables. The process conditions can include a process steam demand load value at each of the plurality of different steam pressure levels and/or a process power generation value for the one or more process facility defining model output. The utility subsystem conditions include combined heat and power utility subsystem steam and/or power generation and allocation values. The CHP utility and process subsystem mathematical program model can include a cost function configured to minimize total cost of the utility and process subsystems of the one or more process facilities, to thereby determine the at least substantially optimal process and utility subsystem conditions.

According to one or more embodiments, the step/operation of determining a plurality of at least substantially optimal process and utility subsystem conditions includes one or more of the following steps/operations: determining CHP utility subsystem steam and power generation and allocation values, determining a number of steam headers for the modeled utility subsystem and operating conditions of each steam header, determining a number of boilers for the modeled utility subsystem and designated capacities of each boiler, determining a number of steam turbine generators for the modeled utility subsystem and capacity of each steam turbine generator, determining a number of cogeneration units for the modeled utility subsystem and designated capacities of each cogeneration unit, determining a number of electrical motors and steam turbines for process equipment driving and size of each, determining a size and location of solar power system for the modeled utility subsystem, and determining an optimal allocation of steam and power between both process and utility subsystems, whereby the optimal utility subsystem solution is solved first and the process subsystem conditions solution is solved second utilizing portions of the optimal utility subsystem solution as a basis thereof, or alternatively, the process subsystem conditions solution is solved first.

The step/operation of determining a plurality of at least substantially optimal process and utility subsystem conditions can also or alternatively include one or more of the following steps/operations: identifying process conditions which render a minimum number of HEN units for the one or more process facilities for all reasonably possible distillation columns sequences, and identifying process conditions which render a minimum total heat exchanger surface area of a HEN network design for the one or more facilities and define the surface area of each heat exchanger unit in the HEN. The heat exchanger surface area identification step/operation can be performed, for example, under/for one or more of the following: one or more reasonably possible combinations of steam generation and demand loads' levels and/or one or more given or desired combinations of steam generation and demand loads' levels, one or more reasonably possible distillation columns sequences, one or more reasonably possible distillation columns sequences in conjunction with one or more possible combinations of steam generation and demand loads' levels, one or more reasonably possible distillation columns sequences and one or more given or desired combinations of steam generation and demand loads' levels, one or more reasonably possible HEN configurations and one or more reasonably possible combinations of steam generation and demand loads' levels, and one or more reasonably possible HEN configurations and one or more given or desired combinations of steam generation and demand loads' levels.

One or more embodiments of the methods, computer program, and/or systems, can advantageously include/perform the following steps/operations: providing rigorously bounded decision variables to a combined heat and power mixed integer linear program model for processing by a computer, and determining at least substantially simultaneously by the computer, an optimal allocation of steam and power between both process and combined heat and power utility systems for one or more industrial process facilities responsive to the rigorously bounded decision variables and the combined heat and power mixed integer linear program model. The step of determining can include providing, by the combined heat and power mixed integer linear program model, combined heat and power utility subsystem steam and power generation and allocation values and process system steam generation, steam demand loads and levels, power generation, and power export values as output variables calculated responsive to the rigorously bounded decision variables.

One or more other exemplary embodiments of the methods, computer program, and/or systems can also or alternatively include/perform synthesizing preparation and execution steps/operations. The steps/operations can include selecting an optimal fuel type/energy source mix (e.g., coal, heavy fuel oil, natural gas, biomass, waste materials, solar etc.), and selecting equipment which generate steam (e.g., for heating purposes, pumps and compressors driving, heat carrying, cleaning, cooling) and power (e.g., for lighting and other applications). The steps/operations can also or alternatively include defining the number of steam headers and its conditions (pressure or saturation temperature), determining the shaft work network configuration, and/or determining the optimal allocation of steam and power to both process and utility plants usage in both partially and totally decentralized environments, under/for various conditions or constraints.

The various conditions/constraints can include one or more of the following: all reasonably possible combinations of process design parametric changes (e.g., pre-identified potential parameter values) using all generally available sources of fuel/energy available to the utility system provider, all reasonably possible combinations of process design and operation parametric changes using all generally available sources of fuel or energy available to the utility system provider, all reasonably possible distillation sequences using all generally available sources of fuel or energy available to the utility system provider, all reasonably possible distillation sequences and under all reasonably possible combinations of process design and operation parametric changes using all generally available sources of fuel or energy available to the utility system provider, all reasonably possible HEN designs using all generally available sources of fuel or energy available to the utility system provider, for all reasonably possible HEN designs under all reasonably possible combinations of process design and operation parametric changes using all generally available sources of fuel or energy available to the utility system provider, all reasonably possible distillation columns sequences and HEN designs using all generally available sources of fuel or energy available to the utility system provider, and all reasonably possible distillation columns sequences and HEN designs under all reasonably possible combinations of process design and operation parametric changes using all generally available sources of fuel or energy available to the utility system provider.

According to one or more embodiments of the methods, computer program, and/or systems, the systematic method and computer program can also advantageously further or alternatively include provisions for determining the process plant's HEN network design and distillation network sequence with its main design and operating conditions under all reasonably possible combinations of process operation parametric changes using, for example, all generally available sources of fuel/energy for fully decentralized and/or partially decentralized process and utility systems design environments responsive to receiving and/or determining a plurality of sets of values each defining a potential range of attribute values for defining a separate one of the corresponding plurality of process operation parametric changes.

One or more embodiments of the methods, computer program, and/or systems can also or alternatively provide systematic methods, computer programs, computer readable media, and systems for the identification of process conditions which render the minimum number of plant's HEN units for all reasonably possible distillation columns sequences.

One or more embodiments of the methods, computer program, and/or systems can also alternatively provide a systematic methods, computer programs, computer readable media, and systems for the identification of process conditions which render minimum total surface area of plant's HEN network design and define the surface area of each unit in the network: for possible combinations of steam generation and demand loads' levels, for given/desired combinations of steam generation and demand loads' levels, for possible distillation columns sequences, for possible distillation columns sequences and possible combinations of steam generation and demand loads' levels, for possible distillation columns sequences and for given/desired combinations of steam generation and demand loads' levels, for possible HEN configurations and possible combinations of steam generation and demand loads' levels, and/or for possible HEN configurations and given/desired combinations of steam generation and demand loads' levels. According to an exemplary process flow, optimal allocation of steam and power for the utility system solution is solved first and the allocation of steam and power for the process system conditions solution is solved second utilizing portions of the optimal utility allocation of steam and power as a basis thereof, although the reverse can be alternatively employed.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIGS. 4A-4B are graphical illustrations showing a schematic method for columns integration under possible combinations of reflux ratio and operating pressure modifications according to an embodiment of the present invention;

FIG. 13 is a table illustrating tabular input fields that provide for entry of interval data according to an embodiment of the present invention;

FIG. 14 is a table illustrating tabular input fields that provide for entry of equipment pressure and steam pressure type data according to an embodiment of the present invention;

FIG. 15 is a table illustrating tabular input fields that provide for entry of steam turbines and motors data according to an embodiment of the present invention;

FIG. 17 is a table providing abbreviations used in the CHP program output module of FIG. 16 according to an embodiment of the present invention;

FIGS. 24A-B is a graphical illustration providing an example of project details editing according to an embodiment of the present invention;

FIG. 26 is a graphical illustration of an optimal process conditions and HEN area identification enter data set according to an embodiment of the present invention;

FIG. 27 is a graphical illustration of an optimal process conditions and HEN area identification model formulation according to an embodiment of the present invention;

FIG. 28 is a graphical illustration of solution results of the model formulation according to an embodiment of the present invention;

FIG. 32 is a graphical illustration of an exemplary configuration of a HEN solution example according to an embodiment of the present invention;

DETAILED DESCRIPTION

Figure 1:
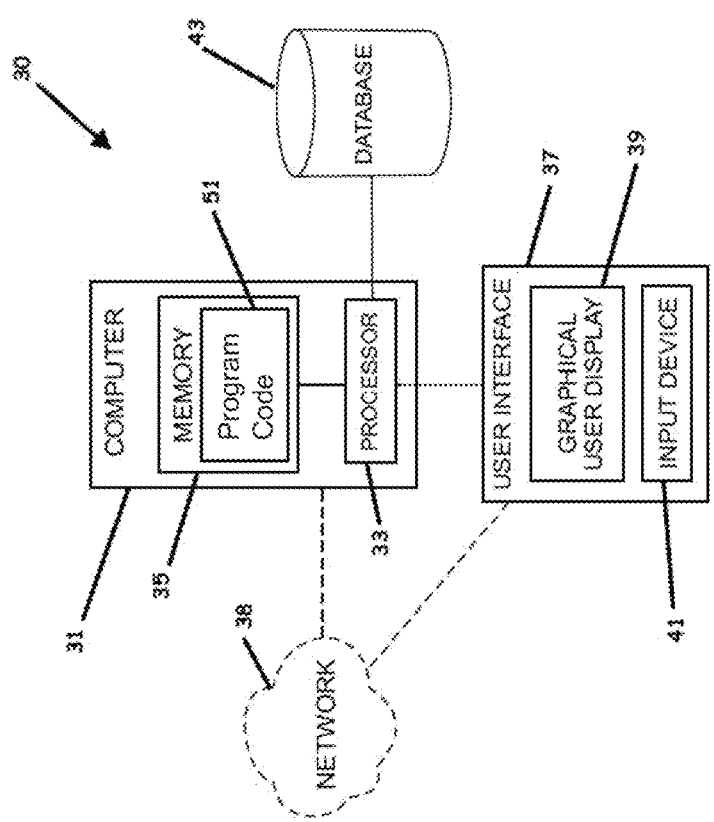
FIG. 1 is a high-level block system diagram illustrating an embodiment of a system for providing combined synthesis of cost-effective combined heat and power (CHP) utility systems and key process systems according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

In the synthesis of total site utility systems, it is often the case that considerable changes exist between total site utility systems and chemical processes. Therefore, the integration of chemical processes and total site utility systems needs to be considered in the synthesis problem. Conventional wisdom in that field is to sequentially synthesize the process units/system first and the utility system second, in decentralized departments. Such approach can result in severe economic loss in both the process units and utility system design. One major technical reason behind such myopic approach is that, the synthesis of the combined heat and power utility system, alone, is a complex combinatorial problem that has multiple objectives. Adding the complexity of heat exchanger network (HEN) synthesis to the complexity of this synthesis problem, which is, itself, mathematically also considered NP-hard along with the synthesis problem of selecting optimal plant's distillation sequence, would result in the problem becoming intractable.

The synthesis of the combined heat and power (CHP) utility system involves four major tasks: (1) the selection of fuel type/energy source mix (e.g., coal, heavy fuel oil, natural gas, biomass, waste materials, renewable/solar etc.); (2) the hardware/devices/equipment which generate steam (e.g., mainly for heating, driving, heat carrying, cleaning, and even cooling) and power; (3) the number of steam headers and its conditions (e.g., pressure or saturation temperature); and (4) the determination of the shaft work generation structural configuration; as well as the optimal allocation of such two commodities (e.g., steam and power) to both process and utility plants usage (e.g., heating loads allocation, drivers selection, cooling tasks, and so on). The inventors have recognized that such decision variables interact with the in-process steam and power demand and generation. The number of steam levels, and its placement are also recognized to have significant impact, not only on the steam headers design and cogeneration potential of the synthesized CHP system including the steam turbines efficiencies variation and its size selection, but also on in-process key units such as the distillation and stripping network structural and parametric designs, as well as the heat exchangers network synthesis.

Conventionally, there are no systems, computer programs, computer readable media, or methods that simultaneously synthesize the CHP system with the interlinked key process systems such as heat exchangers network and distillation sequence. Although commercial software does exist to synthesize CHP systems, such as, for example, Star, Pro Steam, and others, they do not provide such capability. In academia, the big HEN problems are considered NP-hard. Making the problem even more combinatorial via the addition of distillation sequences and CHP synthesis, would make the problem an intractable problem to solve, especially for a mega industrial complex, which can have as many as 25 plants on the single site. Beneficially, various embodiments of the present invention provide a systematic methodology for simultaneous synthesis of: cost-effective combined heat and power utility system; process plant heat exchanger network; and distillation network sequence, with identification of substantially optimal key design and operating conditions. Various embodiments of the present invention also can account for the interactions between the CHP, HEN, and key process units including the distillation columns, can synthesize the utility system in consideration of the degrees of freedom and design of the process system (e.g., HEN and distillation network sequence), and can determine or facilitate the determination of an optimal trade-off between costs associated with utility system and costs associated with the process system.

System Information

Various system options according to exemplary embodiments of the present invention are described below.

FIG. 1, for example, illustrates a system 30 for providing a cost-effective combined heat and power (CHP) utility system, process plant heat exchanger network (HEN or HEN network), and distillation network sequence, with identification of substantially optimal key design and operating conditions under all possible combinations of process and utility parameters variations for an industrial process facility (individual process facility or cluster of industrial process facilities). The system 30 can include a CHP utility and process subsystems analysis and design computer 31 having a processor 33, memory 35 coupled to the processor 33 to store software and database records therein, and a user interface 37 which can include a graphical display 39 for displaying graphical images, and a user input device 41 as known to those skilled in the art, to provide a user access to manipulate the software and database records. Note, the computer 31 can be in the form of a personal computer or in the form of a server or server farm serving multiple user interfaces 37 or other configuration known to those skilled in the art. Accordingly, the user interface 37 can be either directly connected to the computer 31 or through a network 38 as known to those skilled in the art.

The system 30 can also include a database 43 stored in the memory 35 (internal or external) of the CHP utility and process subsystems analysis and design computer 31 and having a plurality of sets of values each separately defining a potential range of values for each operational attribute for each of a plurality of the utility and process subsections. Such attributes can include, for example, fuel type/energy source (coal, heavy fuel oil, natural gas, biomass, waste materials, solar etc.), equipment which generate steam (for heating purposes, pumps and compressors driving, heat carrying, cleaning, cooling) and power (for lighting and other applications), steam headers and its range of conditions (pressure or saturation temperature), shaft work network configuration, and the range of values with respect to allocation of steam and power to both process and utility plants usage, and discrete values identified as providing optimal and potentially optimal results.

Such attributes can also include a lower and an upper boundary value for the process supply temperature (Ts) of each of the hot process streams and each of the cold process streams, a lower and an upper boundary value for a target temperature (Tt) of each of the hot process streams and each of the cold process streams, and/or a lower and an upper boundary value for a heat capacity flow rate (FCp) of each of the hot process streams and each of the cold process streams, capital costs of various utility system components and various HEN equipment for the industrial facility according to the received streams conditions, along with one or more sets of stream-specific minimum temperature approach values between streams ($\Delta T\_min\_i$), streams initial types, streams matching constraints, global utility consumption values [Qh], [Qc] where the "[ ]" denotes interval values. Such attributes can also include the interval and/or discrete locations of the pinch regions often referred to as a "pinch point" which describe a "region of minimum choice lower and upper temperature boundaries" at least for each pinch point controlling process stream/stream temperature, identification of the streams that control the pinch locations, data linking the pinch points define a map or maps of the pinch locations according to a progressive change in $\Delta T\_min\_i$ or process conditions, and the minimum number of HEN units required for a network condition at each pinch location, among others.

The system 30 can also include a CHP utility and process subsystems analysis and design program 51 stored in memory 35 of the CHP utility and process subsystems analysis and design computer 31 and adapted to provide a systematic process which includes various unique phases of analysis and design, which provide a revolutionary solution approach to providing an optimal solution for both utility and process systems/subsystems in both partially and fully decentralized environments.

Figure 2:
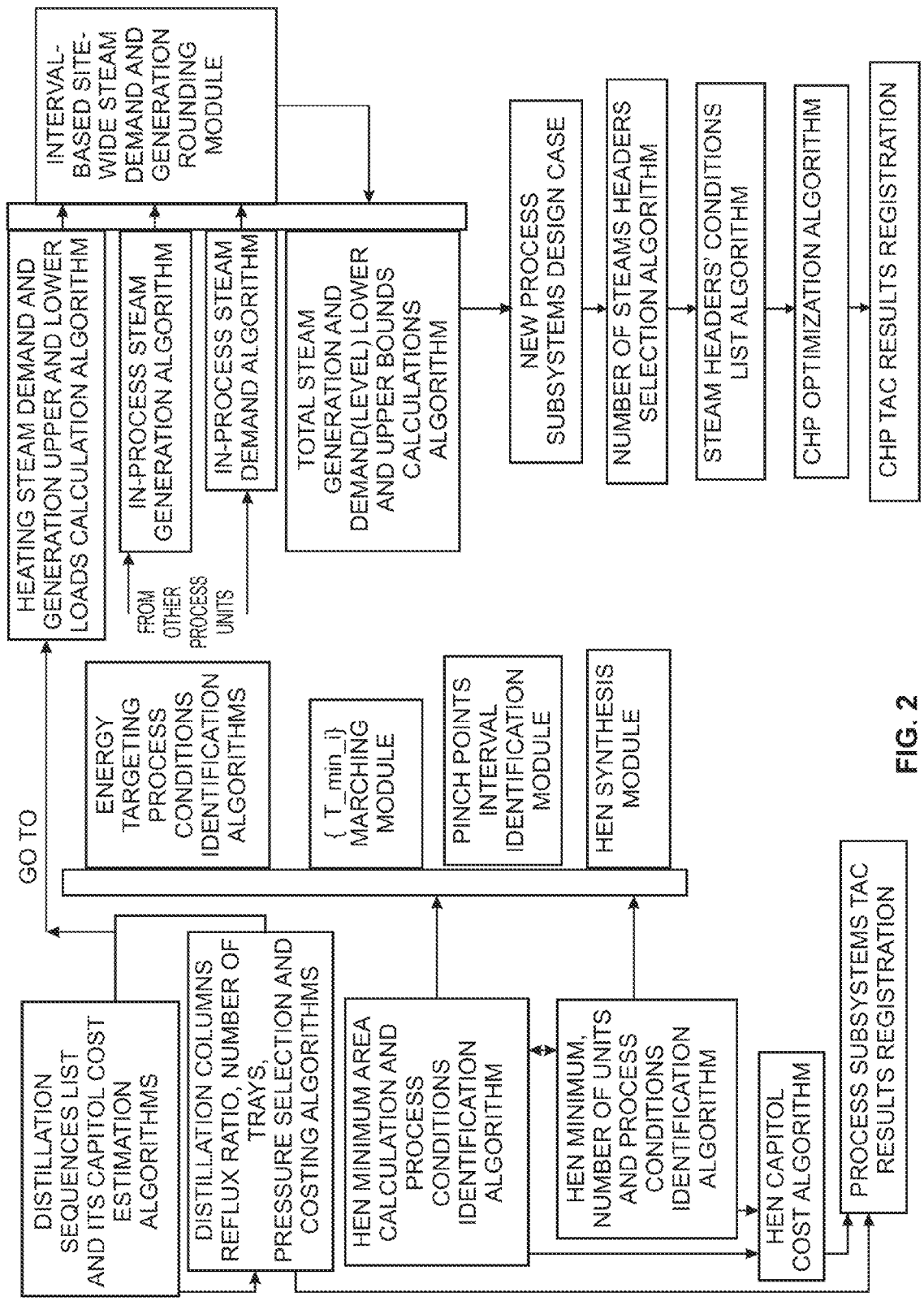
FIG. 2 is a block flow diagram illustrating a process for simultaneous processing utility systems synthesis in partially and totally decentralized environments according to an embodiment of the present invention.

The program 51 can incorporate one or more combinations of the following algorithms to include: a heating steam demand and generation upper and lower loads calculation algorithm, an in-process steam generation algorithm, an in-process steam demand algorithm, a distillation sequences list and its capital cost estimation algorithm(s), distillation columns reflux ratio, number of trays and pressure selection and costing algorithms, a HEN minimum area calculation and process conditions identification algorithm, a HEN minimum number of units and process conditions identification algorithm, a HEN minimum capital cost algorithm, a utility and process system cost comparison algorithm, an independent CHP utility system design and costing algorithms, a total steam generation and demand (level) lower and upper bounds calculations and/or targeting algorithm(s), a number of steam headers selection algorithm, a steam headers' conditions identifications algorithm, a process and distillation columns integration algorithm, and a CHP optimization algorithm. The set of algorithms can also include an energy targeting and process conditions identification algorithm described, for example, in U.S. Pat. No. 7,698,022, a {$\Delta T\_min\_i$} marching module is described, for example, in U.S. Pat. No. 8,032,262 titled "System, Method, and Program Product For Synthesizing Non-Constrained Heat Exchanger Networks, a pinch points interval identification module is described, for example, in U.S. patent application Ser. No. 13/041,057, titled "Systems and Program Product For Heat Exchanger Network Energy Efficiency Assessment and Lifetime Retrofit, an interval-based site-wide steam demand and generation bounding module is described, for example, in U.S. patent application Ser. No. 12/480,415, titled "Method and Software For Global Targeting of Process Utilities Under Varying Conditions, and a HEN synthesis module is described, for example, in U.S. Pat. No. 7,729,809, titled "System, Method, and Program Product for Targeting and Identification of Optimal Process Variables in Constrained Energy Recovery Systems. FIG. 2 illustrates the interconnection between the major algorithms according to an embodiment of the present invention.

Note, the CHP utility and process subsystems analysis and design program 51 can be in the form of microcode, programs, routines, and symbolic languages that provide a specific set for sets of ordered operations that control the functioning of the hardware and direct its operation, as known and understood by those skilled in the art. Note also, the CHP utility and process subsystems analysis and design program 51, according to an embodiment of the present invention, need not reside in its entirety in volatile memory, but can be selectively loaded, as necessary, according to various methodologies as known and understood by those skilled in the art.

Serial Synthesis of Combined Heat and Power (CHP) Utility and Process Subsystems Having Total System Minimum Annualized Cost Methodology for Partially Decentralized Application:

In such category we typically have a project with a single company objective of synthesizing both the process and the utility subsystems to have a total system minimum annualized cost, but with the syntheses tasks of process subsystems and utility subsystem (CHP) conducted in a decentralized approach. For example, the process design department and utility design department are working separately. Both departments are trying to achieve the best possible synthesis/design (minimum total annualized cost) for their respective subsystems, subject to their problem's constraints. According to the current state of art, the utility subsystem (CHP) designer gets his/her constraints from its own problem superstructure in addition to the decision variables of the process subsystems' optimization problem solution (i.e., for the distillation network and heat exchangers network (HEN) subsystems). The process problem is solved first by the process designer to provide the nominal design exact demand and generation values for steam levels and for power demand, as well as equipment to drive by power, and the utility subsystem problem (CHP) is solved later for a given desired process designer situation.

According to various embodiments of the present invention, three different analysis categories are recognized, which are dealt with differently. For example, according to an embodiment of the present invention, in order to determine the appropriate category for proper analysis, all viable process subsystems syntheses alternatives are first evaluated to determine the process subsystems' total annualized cost (PSTAC) values. The parameters of the promising alternatives are then used to calculate the steam demand and generation bounds for the utility subsystem synthesis (CHP) under all possible combinations of desired process subsystems synthesis design and operating conditions (distillation networks and HEN) using, for example, {ΔT_min-i} intervals. The CHP subsystem then starts synthesizing its subsystem using such steam bounds to get best total annualized cost (USTAC) of the utility subsystem.

Case I: Process Subsystems are the Leader and Utility Subsystem is the Follower

If the CHP USTAC is much less in dollar value compared to the PSTAC, the process subsystems become the problem objective leader and the CHP becomes the problem objective follower. According to the solution approach to this problem, the process designer solves the problem to his/her best interest first and dictates to the follower to find his/her best objective under his/her superstructure constraints and the decision variables, obtained from the process designer problem solution, given to him/her by the process subsystems designer. These constraints and decision variables include steam demand and generation levels and operating conditions and an ad hoc selection of process equipment drivers, such as turbines and/or motors, for pumps and compressors. This class of problem is currently implemented, at least to some extent, in CHP utility subsystem synthesis in both academia and industry.

Case II: Process Subsystems are the Follower and Utility Subsystem is the Leader If the PSTAC is much less in dollar value compared to the CHP USTAC, the CHP becomes the problem objective leader and the process subsystems become the problem of objective follower. According to this solution, the process designer initially provides a broad set of constraints which the utility system designer utilizes to formulate its optimal solution. The output parameters regarding steam and power are then provided back to the process system designer to be utilized in designing its optimal solution given the utility system constraints.

Case III: Tie Cooperating Approach Between Process and Utility Subsystems

If the PSTAC and the CHP USTAC are similar in costs, a Pareto-type diagram can be established to analyze the cheapest distillation sequence and heat exchange network versus CHP costs using a simple iteration between departments. A Pareto-type diagram for company-wide best decision-making can be employed using {ΔT_min_i} as a marching variable. An example of such a marching technique is described, for example, in U.S. Pat. No. 8,032,262.

Method for Totally Decentralized Application

In such category; the syntheses tasks of both the process subsystems and utility subsystem (CHP) can be conducted in a fully decentralized fashion. For example, in a typical scenario, we have two companies working on a project in which one company's objective is to synthesize the process plant (e.g., chemical complex) and the other company's objective is to synthesize a utility plant (CHP) to serve it. The utility plant synthesizer is normally a party with a certain investment capability. He or she wants to invest but with a limited budget. The process designer can reduce its capital investment at the expense of the utility system capital. However, extending this approach to its maximum capability might hinder the opportunity for finding a utility investor. During the early stages of the project, both parties discuss and negotiate the point until achieving a win-win situation.

Figure 3:
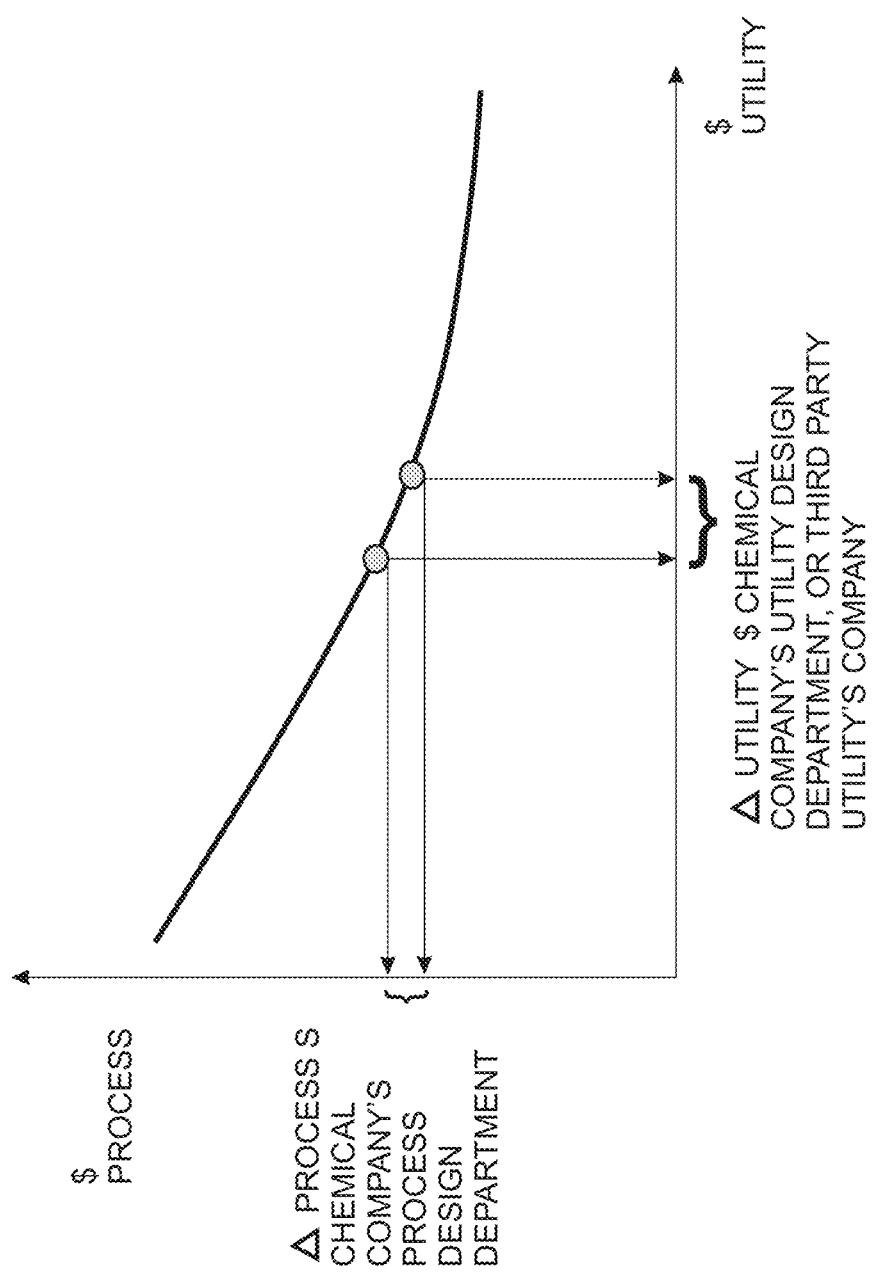
FIG. 3 is a graphical illustration in the form of a Pareto diagram illustrating a method of determining a trade-off between process and utility capital costs according to an embodiment of the present invention.

A methodology employed by an embodiment of the present invention in order to achieve the win-win situation, systematically handles this category of application using Pareto-like curve that enables both process and utility companies to optimally find their best acceptable decision and smartly help the chemical/other industrial processes plant in its search for best financing opportunities for finding a builder to the chemical/other industrial complex utility plant. FIG. 3 illustrates utilization of a Pareto-like curve useful to aid in the determination of the optimal settling point between the conflicting goals of the two companies, ideally located at a point where movement in either direction along the curve would result in a larger increase in costs to one company than the savings costs afforded the other company.

Process and Distillation Columns Integration under Possible Combinations of Reflux Ratio and Operating Pressure Modifications Systematic Methodology.

The above described cases and/or scenarios rely on the ability to determine an optimal process subsystems' total annualized cost. In order to do so, various embodiments of the present invention provide for process and distillation columns integration under a wide range of parameters. According to an exemplary methodology, the process can include the following steps/operations:

Step 1: Start a base case design with low column(s) operating pressure for above ambient processes and base case design study with high columns operating pressure for sub ambient processes.
Step 2: Conceptually design the distillation column using low reflux ratio to high reflux ratio.
Step3: Register Column(s) cost in each case.
Step 4: Simulate distillation column(s), in the pressure cases (base and higher) or (base and lower) or low to high reflux ratio and extract for the heat integration application streams data in form of intervals for FCp of cold stream to be evaporated -continued (evap) heated and hot stream to be condensed (cond) cooled,
Ts and Tt are numbers specific to the pressure used
for each column.

Step 5: Output and store [FCp_evap_P_base], ts, tt;
[FCp_evap_P_new], ts, tt and [FCp_cond_P_base],
Ts, Tt; [FCp_cond_P_new], Ts, Tt.

Step 6: Conduct energy targeting under all possible combinations
of process changes and reflux ratios for distillation
column(s) at base pressure.

Step 7: Conduct energy targeting under all possible combinations
of process changes and reflux ratios for distillation column(s)
at desired high pressure (for sub-ambient processes).

Step 8: Find thermal pinch points interval, define different pinch
points location and identify pinch point controlling stream
(this step is useful to help select which column' pressure
need to be increased (if all of them are viable options,
continue).

Step 9: Register the difference in energy operating cost between
the low pressure base case design and high pressure column'
case and decide either to increase the column (s) pressure
or not to increase it.

Step 10: Use energy targeting step result for distillation column(s)
operating at desired high pressure and start using for
column-by-column, while other columns at high
pressure, the column' stream data lying at low operating
pressure base case design to explore the possibility to
reduce some of the columns' pressures without having a
big impact on energy operating cost saving.

Step 11: Define the level of integration in the plant between the
distillation columns and the rest of the process or among
the distillation columns only under all possible combinations
of process design modifications for base case pressure and
high pressure using the simple algorithm illustrated in the
two graphs in FIGS. 4A and 4B which render the way
to find best level of integration via conducting energy
targeting for all elements of the "SET" shown in graph.

Step 12: Collapse the whole problem streams data from intervals
to just numbers for the desired heating and/or cooling
utilities case requirement to identify utilities load and level,
best distillation column design parameters including
reflux ratio, operating pressure besides rest of process
design and operating conditions modifications.

Step 13: Repeat the above steps for each distillation sequence in one
group, for many possible sequences, or combinations of
several groups of distillation columns but with small number of
sequences, for instance as per the two graphs in FIGS. 5A and
5B.

According to Step 1, the process begins by starting a base case design with low column(s) operating pressure for above ambient processes and base case design study with high columns operating pressure for sub ambient processes. Step 2 involves conceptually designing the distillation column using a low reflux ratio to a high reflux ratio. In Step 3, the column cost is registered in each case.

Note, for above ambient temperature processes, increase the column(s) pressure from the base case design to higher pressure to decrease the column(s) cost. The highest column pressure is the one that is situated beyond the pressure where the column (cost) increases is due to its metal weight and thickness increase. For sub-ambient processes, decrease the pressure of the base case design until the increase in column (s) vapor loading/diameter increases the column(s) (cost).

In Step 4, simulate distillation column(s) according to the pressure cases (base and higher) or (base and lower), or low to high reflux ratio, and extract data for the heat integration application streams data in form of intervals for FCp of cold streams to be either evaporated (evap) heated and hot streams to be condensed (cond) cooled, where the hot and cold stream supply and target temperatures (Ts, ts, and Tt, tt, respectively) are numbers specific to the pressure used for each column. In Step 5, the following output data is recorded: [FCp_evap_P_base], ts, tt; [FCp_evap_P_new], ts, tt and [FCp_cond_P_base], Ts, Tt; [FCp_cond_P_new], Ts, Tt.

In Step 6, energy targeting is conducted under all possible combinations of process changes and reflux ratios for distillation column(s) at base pressure, and in Step 7, energy targeting is conducted, for example, under all possible combinations of process changes and reflux ratios for distillation column(s) at the desired high pressure (for above ambient processes).

In Step 8, the process determines the thermal pinch points interval, determines the different pinch points location, and identifies the pinch point controlling stream to help select which column's pressure need to be increased. If all of them are viable options, the process continues.

In Step 9, the difference in energy operating cost between the low pressure base case design and high pressure column's case registered and a decision is made to either to increase the column (s) pressure or not to increase it.

In Step 10, the results from the energy targeting step for the distillation column(s) operating at desired high pressure is utilized to perform a column-by-column examination of pressure. In this step, the column's stream data lying at low operating pressure base case design is applied to one of the columns with the other columns remaining at high pressure to explore the possibility to reduce some of the columns' pressures without having a big impact on energy operating cost savings.

In Step 11, the process defines the level of integration in the plant between the distillation columns and the rest of the process or among the distillation columns only under all possible combinations of process design modifications for base case pressure and high pressure. An example technique employs the simple algorithm illustrated in FIG. 4A, which render the roadmap to find the best level of integration via conducting energy targeting for all elements of the "SET" shown in graph. Note, the N=5 distillation column problem shown in FIG. 4A provides an example of a systematic method for "total process" columns integration under all possible combinations of reflux ratio and operating pressure modifications. Here, the four distillation columns, represented by items 2-5 in the table, are integrated with the "rest of the process" subsystem cold streams to be heated and hot streams to be cooled, represented by the item 1. The term "options" represents the total number of possible energy integration combinations of the four distillation columns with the rest of the process and each other, and "sets" represents a list of energy integration options among the four distillation columns with the rest of the process.

The N=4 distillation column problem shown in FIG. 4B provides an example of a systematic method for "distillation columns-only" columns "among-themselves-integration" under all possible combinations of reflux ratio and operating pressure modifications. Here, the four distillation columns, represented by items 1-4 in the table, are integrated with each other only. The term "options" represents the total number of possible energy integration combinations of the four distillation columns among themselves, and the "sets" represents the list of energy integration options among the four distillation columns. For example, the first element in the "set" represents the option of integrating the four columns all together. The third element in the "set" represents the option whereby columns 1 and 2 and 4 are integrated among themselves while column three is left on utility-usage only scheme.

In Step 12, the whole problem streams data is collapsed from intervals to just numbers for the desired heating and/or cooling utilities case requirement to identify utilities load and level, best distillation column design parameters including reflux ratio and operating pressure in addition to the rest of the process design and operating conditions modifications.

Figure 5A:
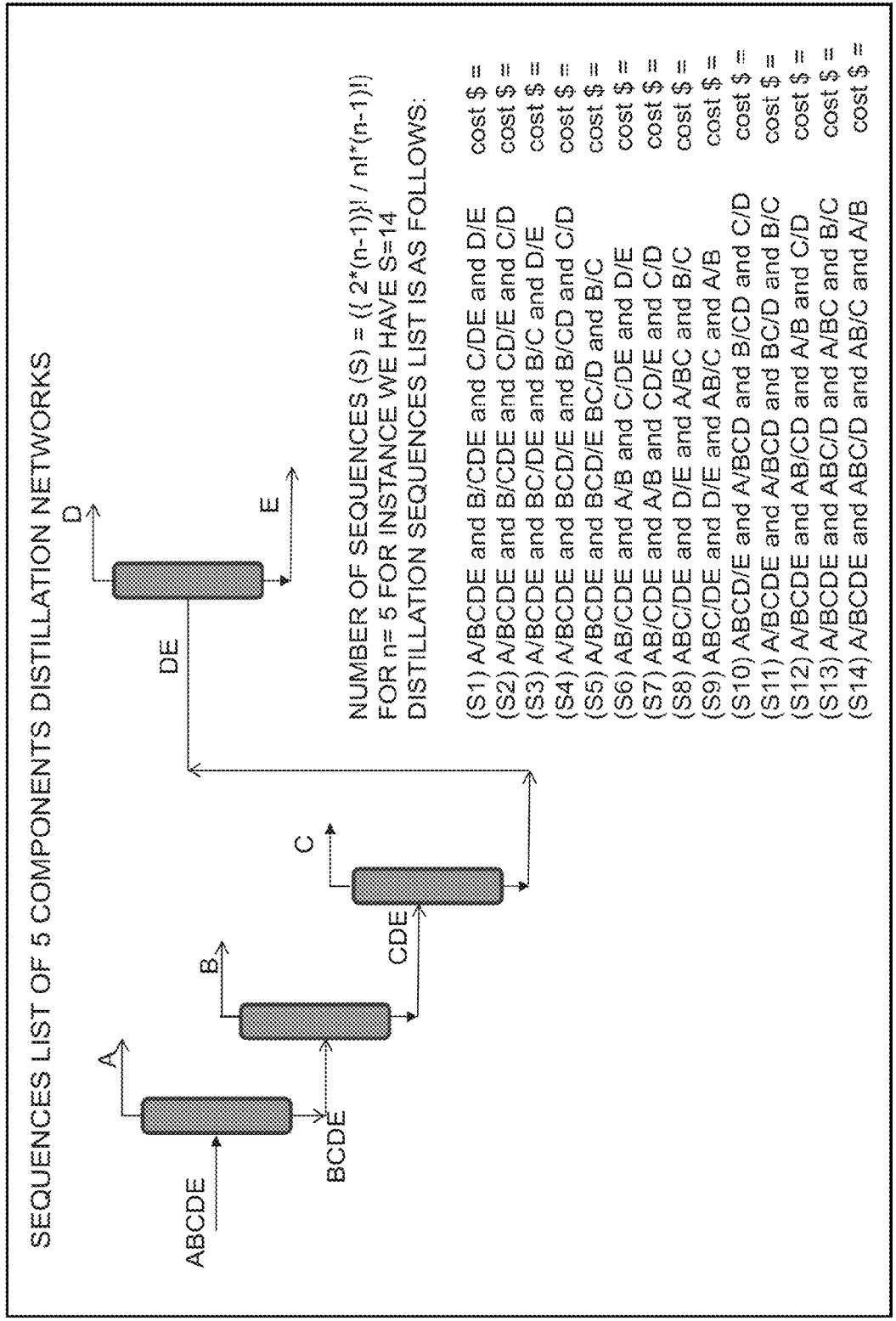
FIGS. 5A-5B are graphical illustrations showing a sequence list for complex and simple distillation networks examples according to an embodiment of the present invention.
Figure 5B:
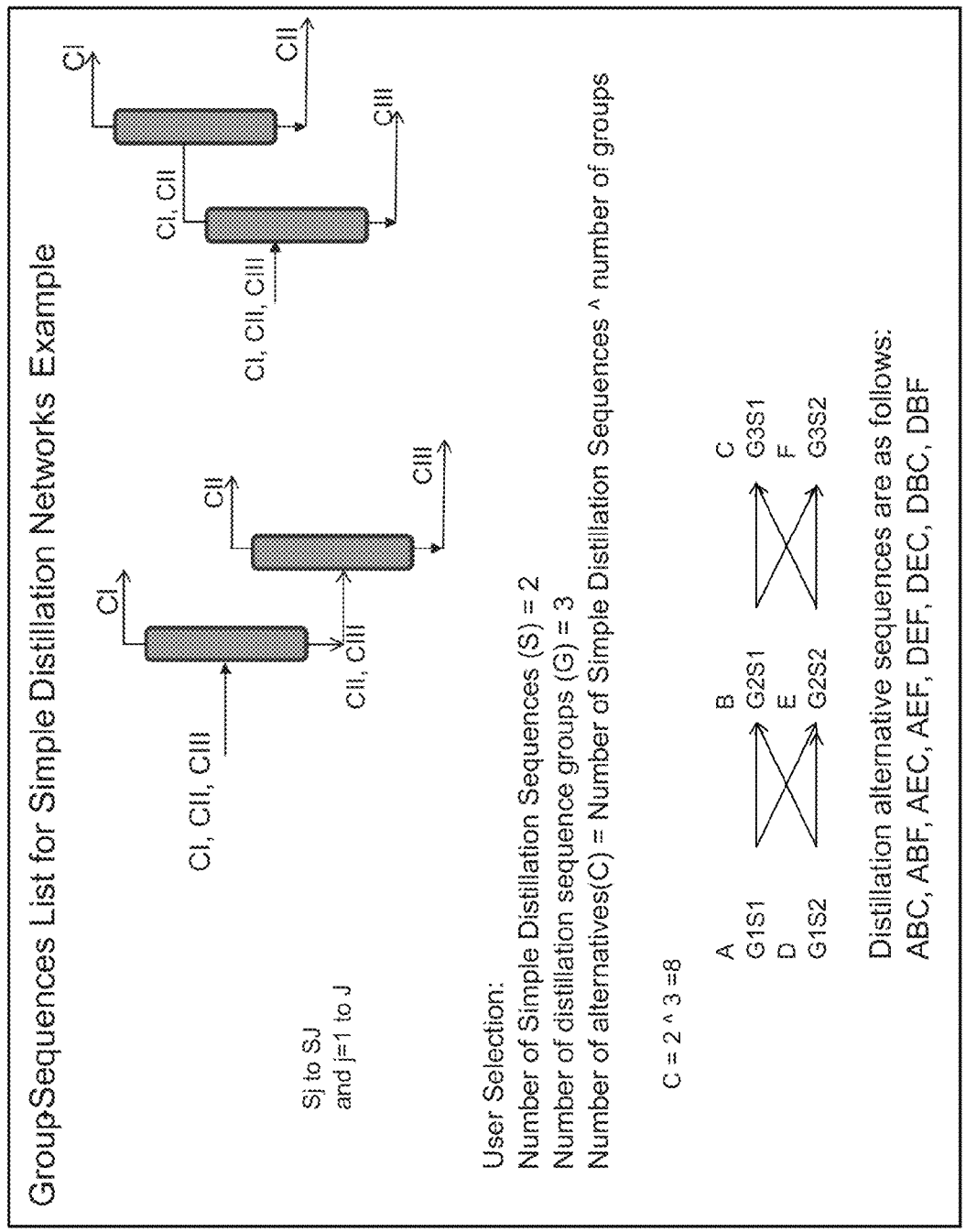

In Step 13, the above steps are repeated for each distillation sequence in one group for the many possible sequences, or for the combinations of several groups of distillation columns, but with small number of sequences, as shown, for example, in FIGS. 5A and 5B.

Total Steam Levels Targeting Under Possible Combinations of Process Modifications Various embodiments of the present invention provide both process steam generation interval targeting from a non-cooling task and process steam demand interval targeting from a non-heating task.

Process Steam Generation Interval Targeting from a Non-Cooling Task

According to an exemplary configuration, the in-process steam generation model for process unit (i) is calculated as follows:

[STM_GEN]$ik$=$F$([PDP],[POP])$ik$, wherein PDP=[x1,x2], and POP=[y1,y2].

PDP and POP are process design parameters and process operating parameters related/representing different process units including reflux ratio and pressure inter-heaters and inter-coolers, supply temperatures and target temperatures, catalyst type that affects streams' flowrate and/or supply and target temperatures, solvent type in absorption that affects stream's target and supply temperature, among others as understood by one of ordinary skill in the art.

Structural decisions such as complex distillation columns sequences and simple distillation sequences in multi-groups are handled via enumerating algorithms, described above. Another important application is the process steam demand for "Equipment Driving" which is handled in CHP algorithm, described later.

Process Steam Demand Interval Targeting from a Non-Heating Task

According to an exemplary configuration, the in-process steam demand model for process unit (j) is calculated as follows:

[Process_STM_Demand]$jk$=$F$([PDP],[POP])$jk$, wherein PDP=[D1,D2], and POP=[O1,O2].

Heating Steam Levels Targeting Under Possible Combinations of Process Modifications According to an exemplary configuration, heating steam levels targeting utilizes the algorithms described, for example, in U.S. patent application Ser. No. 12/480,415, titled "System, Program Product, and Related Methods for Global Targeting of Process Utilities Under Varying Conditions." According to the exemplary configuration, the process includes the various steps shown in the table illustrated below and described thereafter.

| | |
|---|---|
| Step 1: | List hot and cold stream data in interval (range) form for the problem to be solved in a data entry table. |
| Step 2: | Construct and interval-cascade diagram using the entered problem data. |
| Step 3: | Balance the interval cascade diagram via adding a hot stream. |
| Step 4: | Draw the residuals from each step versus the average temperature on a T-Q diagram to produce the Interval-Grande-Composite-Curves. |
| Step 5: | Combine the low-pressure, medium pressure, and high pressure steam intervals rendered by the Interval-Grand-Composite Curves to those produced from other process applications due to non-heating process applications to identify the total steam levels under all possible combinations of process modifications. |

Figure 6:
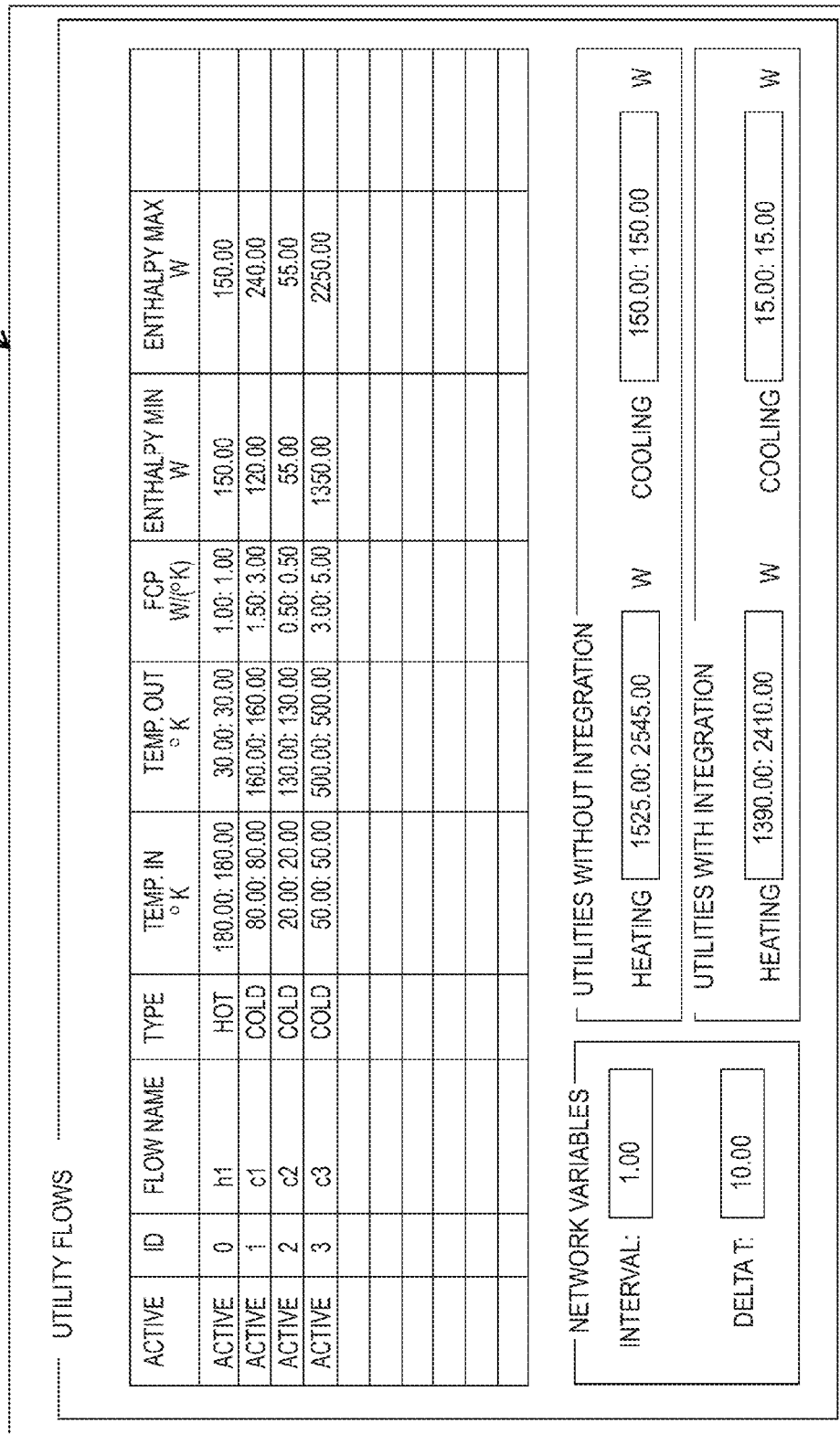
FIG. 6 is a graphical illustration of a graphical user interface illustrating input data entry for a CHP Mathematical Program according to an embodiment of the present invention.
Figure 7:
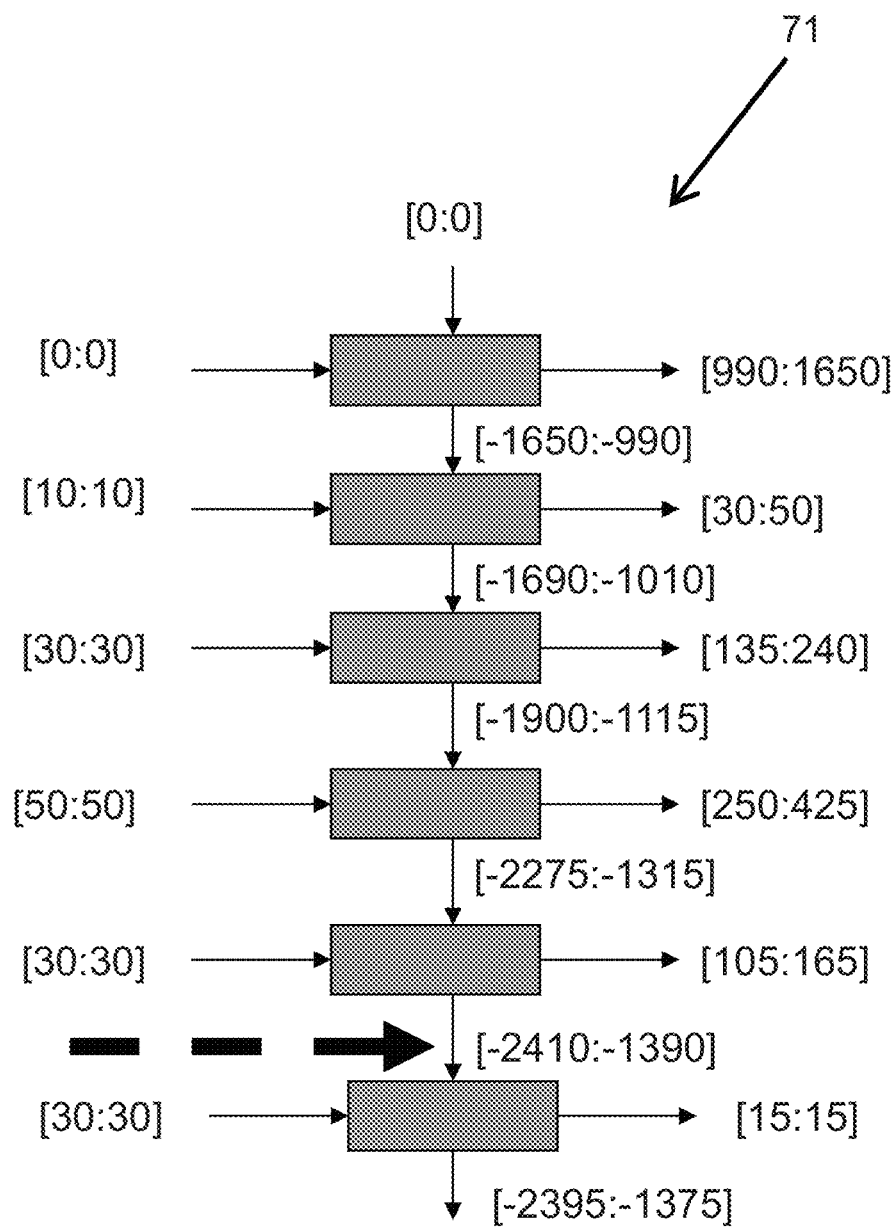
FIG. 7 is a schematic block diagram of a group sequences list for a simple distillation network according to an embodiment of the present invention.
Figure 8A:
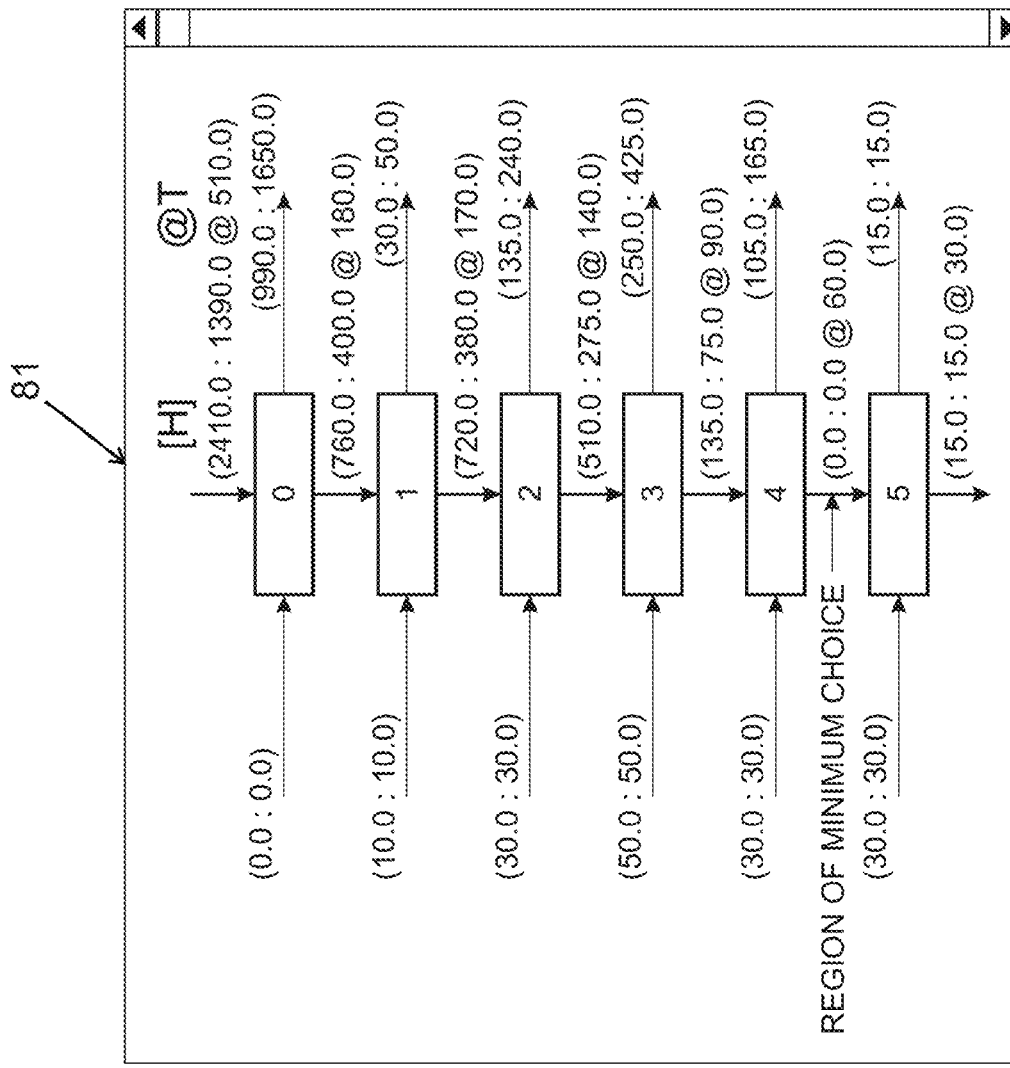
FIGS. 8A-8B are schematic diagrams of an interval cascade diagram and interval grand composite curves, respectively, according to an embodiment of the present invention.
Figure 8B:
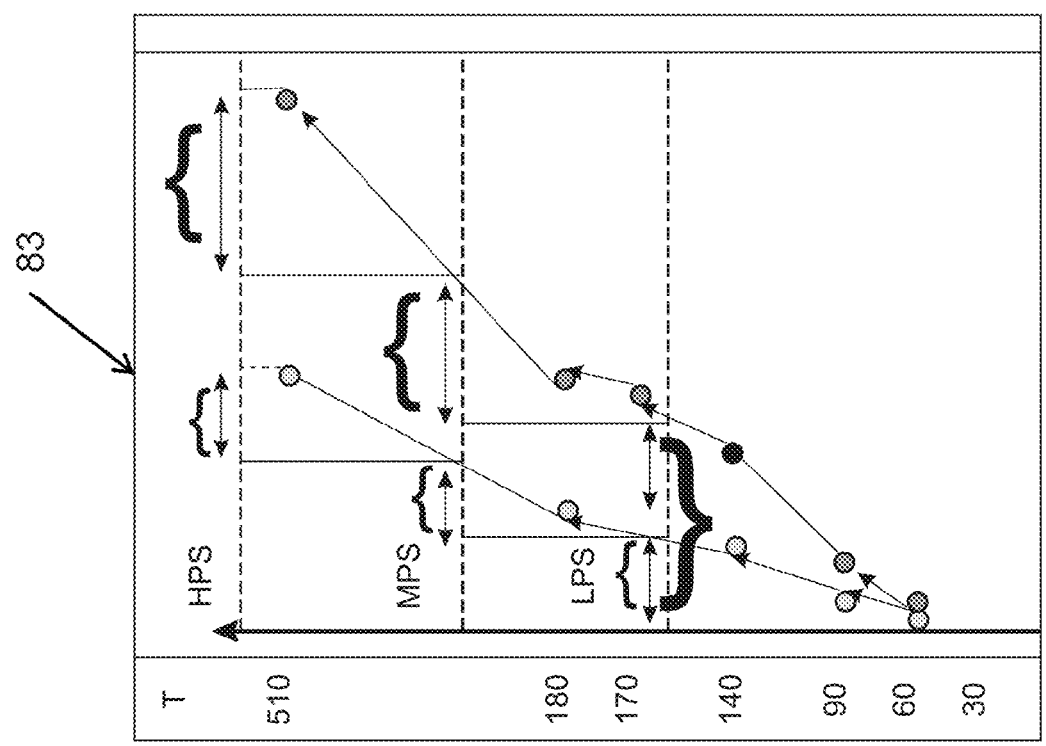

As shown in FIG. 6, the steps include listing the stream data in interval form for the problem to be solved in a data entry table 61. An interval-cascade diagram 71 as shown, for example, in FIG. 7 is then constructed using the problem data entered in the entry table 61. As illustrated in FIGS. 8A and 8B, the steps can include balancing the interval cascade diagram 71 (FIG. 8A) via adding a hot utility at 81 and drawing the residuals from each step versus the shown temperature (which is the average temperature of such step in the temperature interval diagram) on a T-Q diagram 83 (FIG. 8B) to produce the Interval-Grande-Composite-Curves shown therein.

Beneficially, the curves include all possible grand composite curves/process steam heating demands and steam generation due to process cooling tasks. Correspondingly, the diagram 83 renders the low-pressure steam interval [LPS], medium pressure steam interval [MPS], and high pressure steam interval [HPS] under all possible combinations of process design modifications.

Figure 9:
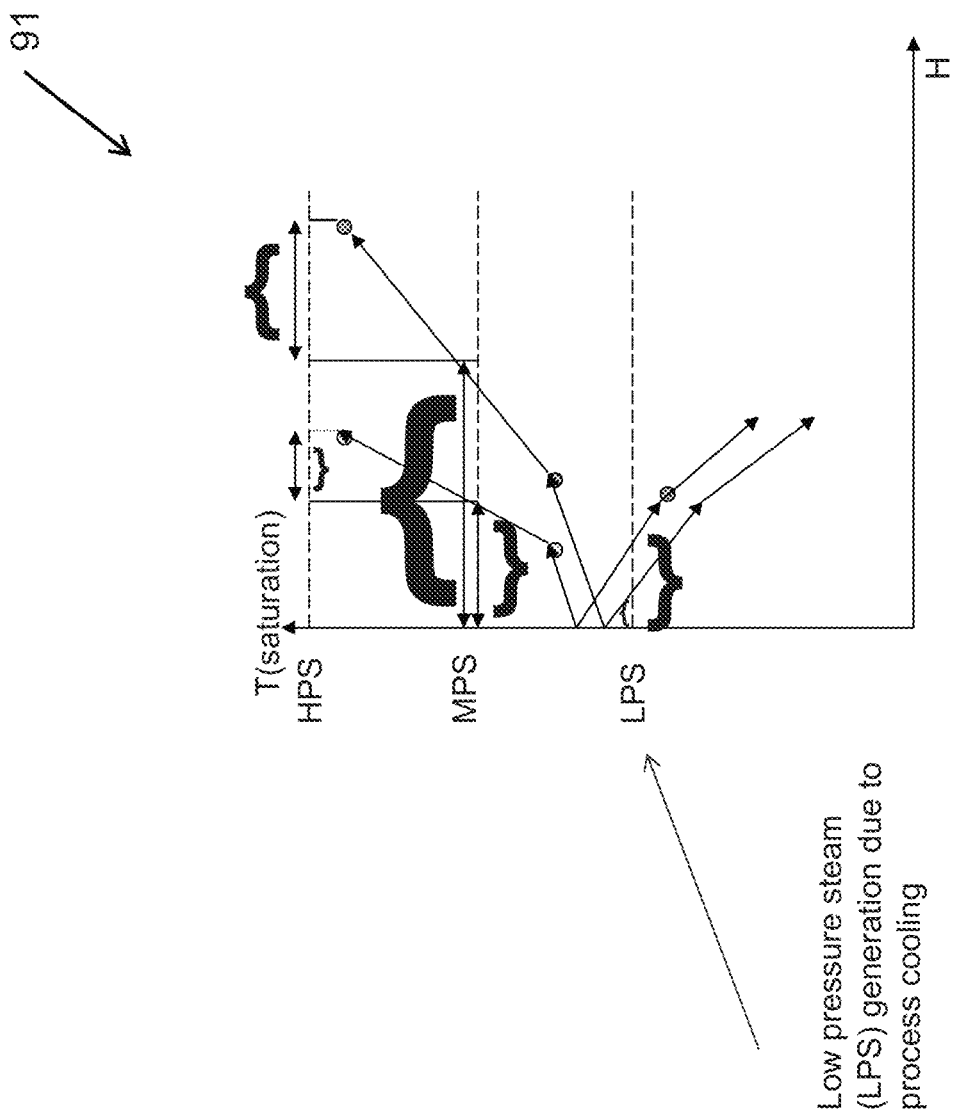
FIG. 9 is a graphical illustration of a combined set of grand composite curves according to an embodiment of the present invention.

As shown in FIG. 9, the steps further include combining the low-pressure steam interval [LPS], medium pressure steam interval [MPS], and high pressure steam interval [HPS] rendered by the Interval-Grand-Composite Curves to those produced from other process applications due to non-heating process applications to identify the total steam level interval values required by the problem.

Number of Steam Headers Loads Identification Algorithm

Figure 10:
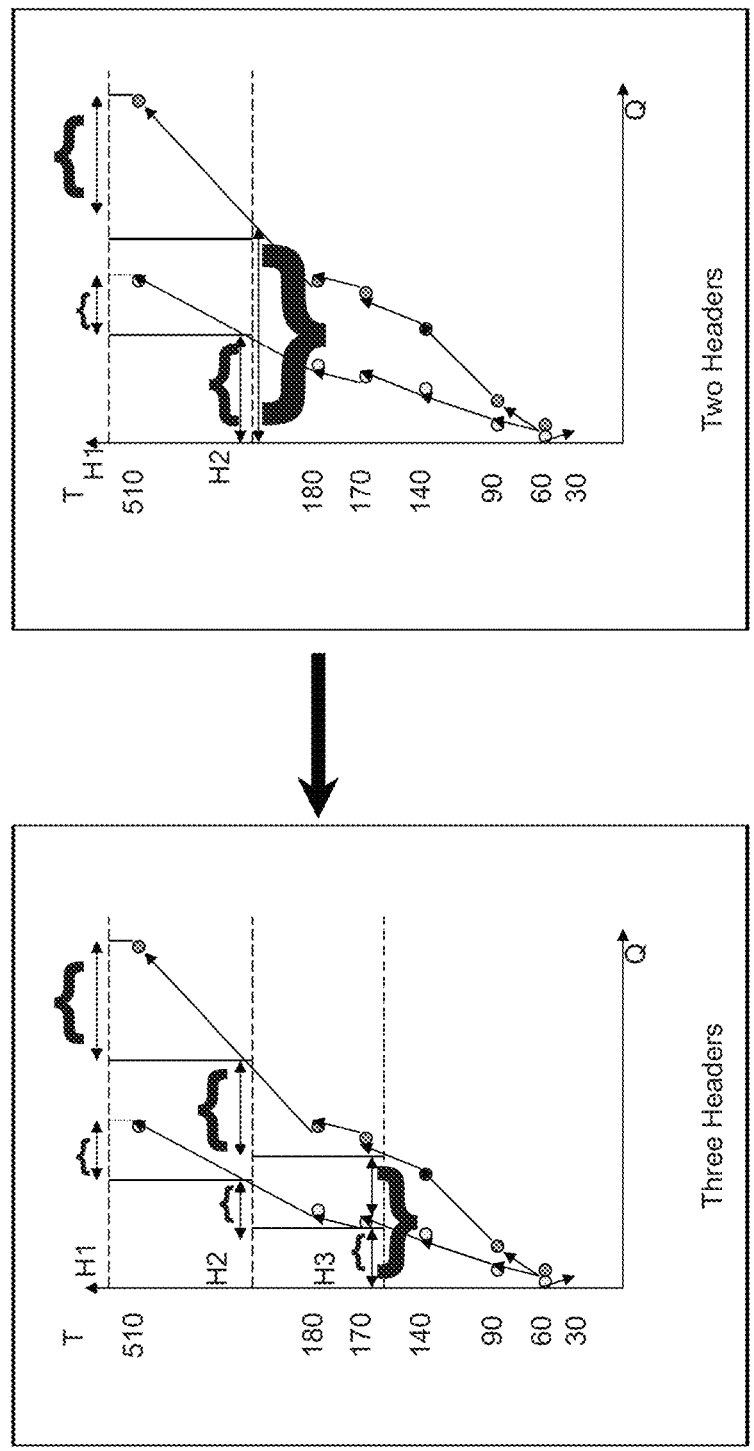
FIGS. 10A-10B are graphical illustrations of grand composite curves used for selecting an optimal number of steam headers according to an embodiment of the present invention.

According to an exemplary configuration, steam headers loads identification utilizes the CHP algorithm to calculate the utility system total annualized cost (USTAC) for 2, 3, 4, 5, 6 and 7 headers under all possible combinations of process design changes. For example, we find the USTAC for 2 headers (FIG. 10A) and then 3 headers (FIG. 10B) to identify the most economical number of steam headers.

Figure 11:
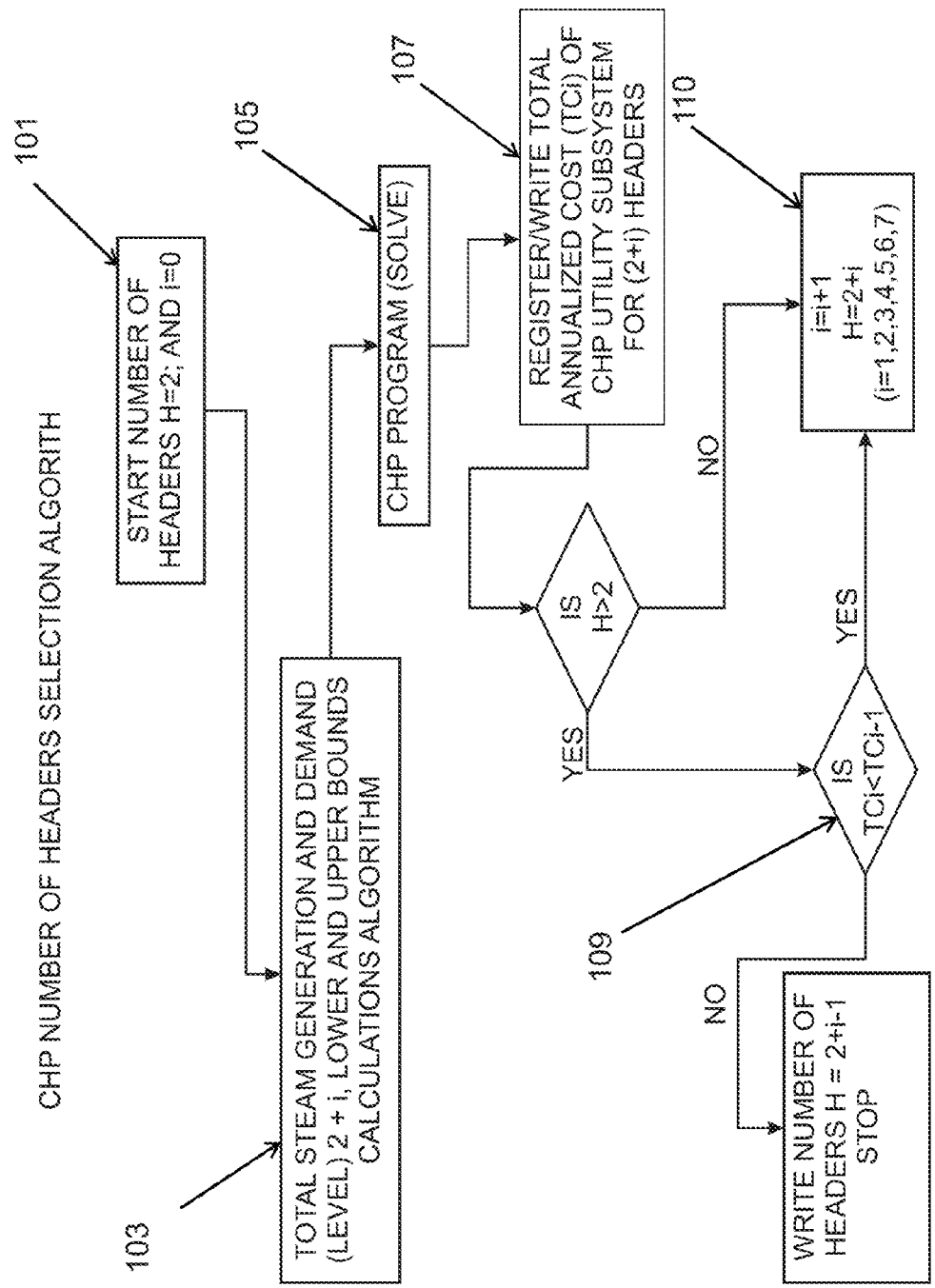
FIG. 11 is a block flow diagram illustrating a CHP number of headers selection algorithm according to an embodiment of the present invention.

As shown in FIG. 11, according to a preferred configuration, the process begins with two headers (block 101), employs the total stream generation and demand (level) 2+i lower and upper bounds calculation algorithm (block 103), determines the USTAC through use of the CHP program/algorithm (block 105), records the annualized cost data for the respective number of headers (block 107) and continues a loop, increasing the number of headers one-by-one (block 109) according to CHP calculation results until the increase in the number of steam headers no longer decreases the total cost (block 110).

Number of Steam Headers and Operating Conditions Enumeration Algorithm

Figure 12:
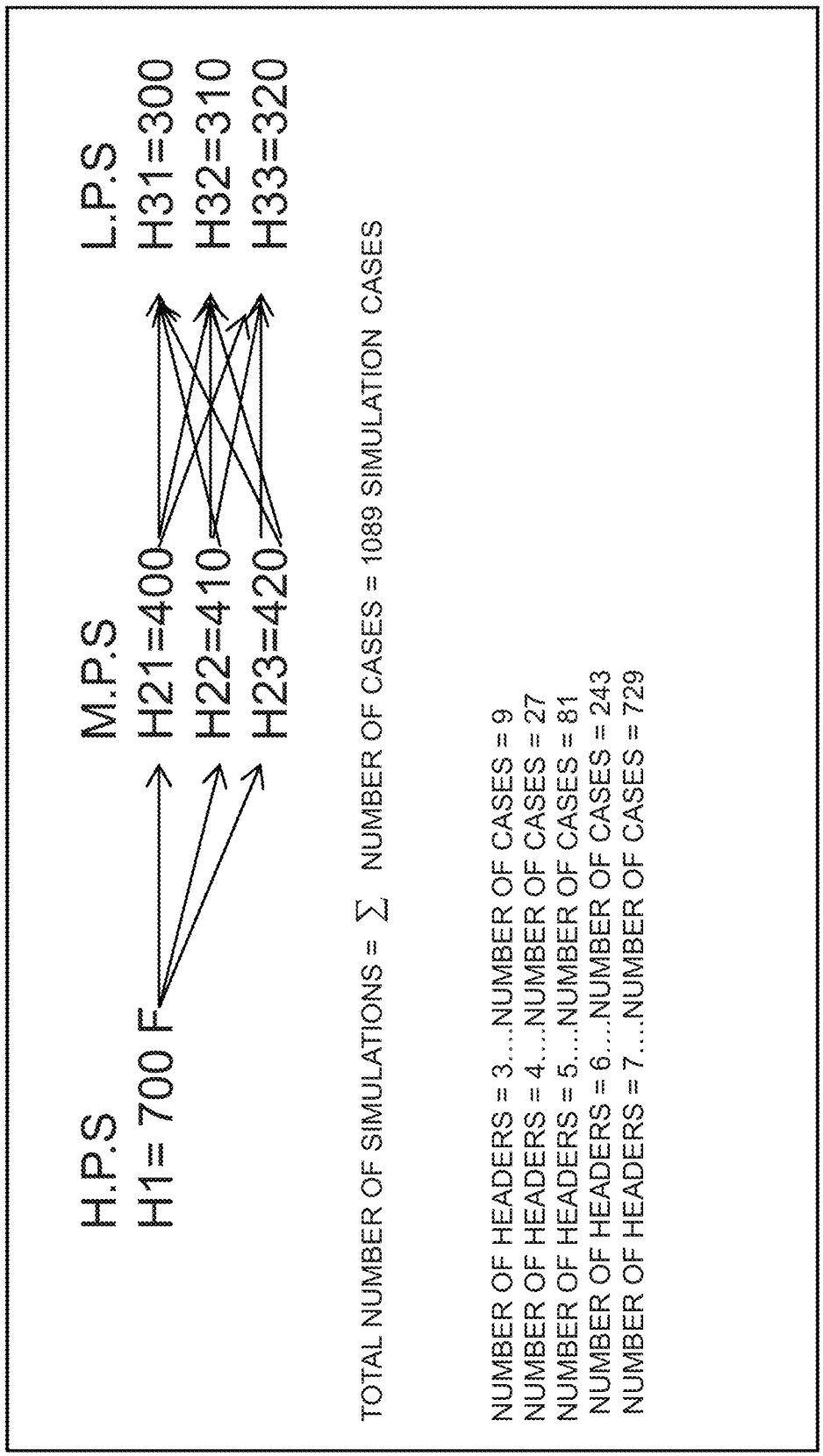
FIG. 12 is a graphical interconnection diagram showing the number of cases to be evaluated based upon headers selection according to an embodiment of the present invention.

FIG. 12 provides an illustrative example for the number of steam headers and operating conditions enumeration algorithm. The algorithm identifies the number of cases based on the number of steam headers selected by the user in conjunction with the number of operating conditions (i.e., hot, medium, and low steam pressures).

Number of Cases=Number of operating conditions^(number of headers−1).

For example, for a high steam temperature of header H1=700° F. and number of headers N=3, the Number of Cases=3^(3−1)=9.

Simultaneous Synthesis of Combined Heat and Power (CHP) Utility and Process Subsystems Through Employment of a Combined Heat and Power Mathematical Program According to various embodiments of the present invention, the simultaneous CHP and key process units syntheses alternatives can be broadly classified into two categories: process related options and utility related options. The process related options can include altering the amount of steam and power demand by the process and steam and power generated by the process due to the process' separation and HEN systems design. Note, according to the preferred configuration, the process related options do not include the process chemical reaction path, catalysts and reactors network as options for change for the sake of optimal utility; HEN; and separation systems' design. The utility/CHP related options normally concentrate on the optimal generation of heat and power (CHP) from the synthesized system to satisfy the process needs.

According to an exemplary configuration, the CHP mathematical program is a mixed integer linear program (MILP) employed to provide simultaneous synthesis of CHP utility and process subsystem. Although there exists commercial software available in the market that employs MILP, and although many of the academic models in public domain also use either MILP or mixed integer non-linear programs (MINLPs) due to nonlinearity in its model objective function and/or model constraints, various embodiments of the present invention beneficially employ a MILP in which the process steam demand and process steam generation is defined at different pressure levels, and in which process steam demand, process steam generation, power generation, and power export are defined as decision variables with rigorous range-type boundaries.

Further, beneficially, the optimal values for both process and utility subsystems syntheses are left to be decided by the CHP MILP model and not as input variables—which is the case in all other CHP MILP and MINLP in academia and industry, where such variables are specified/given ahead of the MILP solution. In contrast to the various embodiments of the present invention, such input data are conventionally normally fed to the utility system designer by the chemical process designer.

FIGS. 13-15 illustrates select examples of input data graphical user interface fields illustrating how the input data is loaded according to an exemplary configuration. The program input data includes major program sets, utility and process parameters, and utility and process variables.

Appendix 3 lists the various examples of the program sets, input parameters, and input variables according to the exemplary configuration. The major program sets can include: "original sets" and "derived sets." The parameters can include: "steam headers" parameters, "boilers" parameters, "cogeneration" parameters, "steam turbine generator" parameters, condensing steam turbine generator parameters, breakover station parameters, condenser parameters, process steam turbine parameters, switchable motors to process steam turbines parameters, process steam generator parameters, solar thermal unit parameters, condensate system parameters, deaerator parameters, power parameters, fuel parameters, and economics parameters. The variables can include steam headers variables, boilers variables, cogeneration variables, solar steam generator variables, steam turbine generator variables, condensing steam turbine generator variables, switchable motors to process steam turbines variables, break over station variables, condenser variables, condensate system variables, deaerator variables, process steam generator variables, boiler feed water system variables, and process cooling demand variables.

Select calculations directed to steam headers, cogeneration, boilers, steam turbine generators, condensing steam turbine generators, solar thermal steam generation/heating, steam demands, breakover stations, condenser, skim tank, deaerators, boiler feed water, power, constraints, fuel, steam reserves, and economics, according to the exemplary configuration, are provided below:

Steam Headers:

Header in Let Flow.

$$HDRIn[h] = \\ HDRRet[h] + HDRBFW[h] + \sum_{(b,h)\in BLRHDR} BLRSTM[b] \cdot BLRNo[b] + \\ \sum_{(so,h)\in SOLARHDR} SOLARSTM[so] \cdot SOLARNo[so] + \\ \sum_{(c,h)\in COGENHDR} COGENStm[c] \cdot COGENNo[c] + \\ \sum_{(s,h)\in STGOutHDR} STGStm[s] \cdot (1 - STGLoss[s]) \cdot STGNo[s] + \\ \sum_{(b,h)\in BOSOut} BOSStm[b] \cdot (1 - BOSLoss[b]) \cdot BOSNo[b] + \\ \sum_{(p,h)\in PSTOutHDR} PSTStm[p] \cdot (1 - PSTLoss[p]) + \\ \sum_{(p,h)\in PSGenHDR} PSGenProd[p]$$

$\forall\, h \in HDR$

Header Outlet Flow.

$$HDROut[h] = \\ \sum_{(s,h)\in SDemHDR} HDRDem[h] + \sum_{(s,h)\in STGInHDR} STGStm[s] \cdot STGNo[s] + \\ \sum_{(s,h)\in STGInHDR} PSTSwitchStm \cdot PSTNo[s] + \\ \sum_{(c,h)\in CSTGHDR} CSTGStm[c] \cdot CSTGNo[c] + \\ \sum_{(s,h)\in PSTInHDR} PSTStm[s] \cdot PSTNo[s] + \\ \sum_{(b,h)\in BOSIn} BOSStm[b] \cdot BOSNo[b] + \\ \sum_{(c,h)\in CONDHDR} CONDStm[c] \cdot CONDNo[c] + \\ \sum_{h\in DEAStmHDR} DEAStmFlow + \sum_{(p,h)\in PSTInHDR} PSTDem[p]$$

$\forall\, h \in HDR$

Material Balance.

$HDRIn[h] \cdot (1-HDRLoss[h]) = HDROut[h] \forall h \in HDR$

Energy Balance.

$$HDRIn[h] \cdot HDREnth[h] =$$
$$HDRRet[h] \cdot HDREnth[h] + HDRBFW[h] \cdot BFWEnth[h] +$$
$$HDREnth[h] \cdot \sum_{(so,h) \in SOLARHDR} SOLARSTM[so] \cdot SOLARNo[so] +$$
$$HDREnth[h] \cdot \sum_{(b,h) \in BLRHDR} BLRSTM[b] \cdot BLRNo[b] +$$
$$\sum_{(s,h) \in STGInHDR} PSTSwitchStm \cdot PSTNo[s] \cdot PSTEnthOut +$$
$$HDREnth[h] \cdot \sum_{(c,h) \in COGENHDR} COGENStm[c] \cdot COGENNo[c] +$$
$$\sum_{(s,h) \in STGOutHDR} STGStm[s] \cdot$$
$$(1 - STGLoss[s]) \cdot STGNo[s] \cdot STGEnthOut[s] +$$
$$\sum_{(b,h) \in BOSOut} BOSStm[b] \cdot (1 - BOSLoss[b]) \cdot BOSNo[b] \cdot BOSEnth[b] +$$
$$\sum_{(p,h) \in PSTOutHDR} PSTDem[p] \cdot (1 - PSTLoss[p]) \cdot PSSTEnth[p] +$$
$$\sum_{(p,h) \in PSGenHDR} PSGenProd[p] \cdot PSGenEnth[p]$$
$$\forall h \in HDR$$

Cogeneration:
Steam Production.

COGENStm[$c$]=COGENPwr[$c$]·
COGENStmRatio[$c$]$\forall c \in$COGEN

Material Balance.

COGENBFW[$c$]·(1−COGENLoss)=COGENStm[$c$]+
COGENBD[$c$]$\forall c \in$COGEN

Blow Down Calculation.

COGENBD[$c$]·(COGENCC[$c$]−1)=
COGENStm[$c$]$\forall c \in$COGEN

Cogeneration Fuel Use.

$$COGENFuel[c] = \begin{cases} COGENc0[c] + COGENc1[c] \cdot COGENPwr[c] + \\ \quad COGENc2[c] \cdot COGENPwr[c]^2 \\ 0, \end{cases}, \begin{array}{l} \text{if } COGENStm[c] > 0 \\ \\ \text{if } COGENStm[c] = 0 \end{array}$$

$\forall c \in COGEN$

Capacity Constraints.

COGENPwr[$c$]≥COGENMin[$c$]·
COGENOn[$c$]$\forall c \in$COGEN

COGENPwOr[$c$]≤COGENCap[$c$]·
COGENOn[$c$]$\forall c \in$COGEN

Boilers:
Material Balance.

BLRBFW[$b$]·(1−BLRLoss)=BLRStm[$b$]+
BLRBD[$b$]$\forall b \in$BLR

Boiler Blowdown Calculation.

BLRBD[$b$]·(BLRCC[$b$]−1)=BLRStm[$b$]$\forall b \in$BLR

Boiler Fuel Use Calculation.

BLRFuel[$b$]=BLR$c$0[$b$]+BLR$c$1[$b$]·BLRStm[$b$]+
BLR$c$2·BLRStm[$b$]$^2 \forall b \in$BLR Boiler Capacity Constraints.

BLRStm[$b$]≥BLRMin[$b$]·BLROn[$b$]$\forall b \in$BLR

BLRStm[$b$]≤BLRCap[$b$]·BLROn[$b$]$\forall b \in$BLR

Boiler Steam Reserves.

$$\sum_{b \in BLR} BLROn[b] \cdot (BLRCap[b] - BLRStm[b]) \cdot BLRNo[b]$$

Steam Turbine Generator:
Power Generation Calculation.

STGPwr[$s$]·3412=STGStm[$s$]·(STGEnthIn[$s$]−STG-
EnthOut[$s$])$\forall s \in$STG Capacity.

STGStm[$s$]≥0$\forall s \in$STG

STGStm[$s$]≤STGCap[$s$]$\forall s \in$STG

Condensing Steam Turbine Generator:
Power Generation Calculation.

CSTGPwr[$c$]·3412=CSTGStm[$c$]·(CSTGEnthIn[$c$]−
CSTGEnthOut[$c$])$\forall c \in$CSTG Capacity.

CSTGStm[$c$]≥0$\forall c \in$CSTG

CSTGStm[$c$]≤CSTGCap[$c$]$\forall c \in$CSTG

Solar Thermal Steam Generation/Heating:
Material Balance:

SOLARBFW[$s0$]·(1−SOLARLoss)=SOLARStm[$s0$]
$\forall s0 \in$SOLAR

Steam Production:

SOLARStm[$S0$]=SOLARon[$s0$]·
SOLAREff[$s0$]·SOLARRad$\forall s0 \in$SOLAR

Steam Demands:
Demand Ranges in a Header:

PSDem[$h$]≥HDRMinDmm$\forall h \in$HDR

PSDem[$h$]≤HDRMaxDem$\forall h \in$HDR

Break Over Stations:
Capacity.

BOSStm[$b$]≥0$\forall b \in$BOS

BOStm[$b$]≤BOSCap[$b$]$\forall b \in$BOS

Condenser:
Duty Calculation.

CONDDuty[$c$]·1000=CONDStm[$c$]·CONDEnthDuty
[$c$]$\forall c \in$COND

Capacity.

$$CONDStm[c] \geq 0 \quad \forall c \in COND$$

$$CONDStm[c] \leq CONDCap[c] \quad \forall c \in COND$$

Skim Tank:
Material Balance.

SkimTankInFlow·(1-SkimTankLoss)=SkimTankOut-FLow $$SkimTankInFlow = CondRetFlow + MUWtrFlow + \sum_{c \in CSTG} CSTGStm[c] \cdot (1 - CSTGLoss[c]) \cdot CSTGNo[c] + \sum_{c \in COND} CONDStm[c] \cdot (1 - CONDLoss[c]) \cdot CONDNo[c]$$

Energy balance.

$$SkimTankOutFlow \cdot SkimTankOutEnth = CondRetFlow \cdot CondRetTargEnth + MUWtrFlow \cdot MUWtrEnth + \sum_{c \in CSTG} CSTGStm[c] \cdot (1 - CSTGLoss[c]) \cdot CSTGWtrEnth[c] \cdot CSTGNo[c] + \sum_{c \in COND} CONDStm[c] \cdot (1 - CONDLoss[c]) \cdot CONDEnth[c] \cdot CONDNo[c]$$

Deaerator:
Material Balance.

(SkimTankOutFlow+DEAStmFlow)·(1−DEALoss)
=DEAVentFlow+DEAOutWtrFlow

Energy Balance.

SkimTankOutFlow·SkimTankOutEnth+
DEAStmFlow·DEAStmEnth=DEAVentFlow·
DEAVentEnth+DEAOutWtrFlow·
DEAOutWtrEnth Boiler Feed Water:
Material Balance.

$$BFWFow = \sum_{h \in HDR} HDRBFW[h] + \sum_{b \in BLR} BLRBFW[b] \cdot BLRNo[b] + \sum_{c \in COGEN} COGEN[c] \cdot COGENNo[c]$$

$$BFWFow = DEAOutWtrFlow \cdot (1 - BFWLoss)$$

Power:
Total Power Generation Calculation.

$$TotPwrGen = \sum_{c \in COGEN} COGENPwr[c] \cdot COGENNo[c] + \sum_{s \in STG} STGPwr[s] \cdot STGNo[s] +$$

-continued $$\sum_{ms \in STG} MSwitchMWToPST + \sum_{c \in CSTG} CSTGPwr[c] \cdot CSTGNo[c]$$

Satisfy Power Requirements.

TotPwrGen+TotPwrImp−TotPwrExp≥ProcPwrDem

Exported Power Calculation.

$$TotPwrExp = \begin{cases} TotPwrGen + TotPwrImp - ProcPwrDem, & \text{if } TotPwrGen + TotPwrImp > ProcPwrDem \\ 0, & \text{Otherwise} \end{cases}$$

Constraints:
Process Cooling Demand:

$$PCoolingDem = \sum_{(i,PC) \in PCoolingDem} AirCDuty[i] + \sum_{(i,PC) \in PCoolingDem} WtrCDuty[i] + \sum_{(i,PC) \in PCoolingDem} RefDutyR[i]$$

Fuel:
Total Fuel Use.

$$TotFuelUse = \sum_{b \in BLR} BLRFuel[b] \cdot BLRNo[b] + \sum_{c \in COGEN} COGENFuel[c] \cdot COGENNo[c]$$

Steam Reserves:
Maximum Steam Generation from a Boiler Unit.

$$MaxBlrStm = \max_{b \in BLR} \{BLRStm[b] \cdot BLRNo[b]\}$$

Maximum Steam Generation from a Cogeneration Unit.

$$MaxCogenStm = \max_{c \in COGEN} \{COGENStm[b] \cdot COGENNo[b]\}$$

Required Steam Reserves Calculation.

RequiredStmRes=max{MaxBlrStm,MaxCogenStm}

Condensate Steam Reserves Calculation.

$$CondStmRes = \sum_{c \in CSTG} CSTGStm[c] \cdot (1 - CSTGLoss[c]) \cdot CSTGNo[c] + \sum_{c \in COND} CONDStm[c] \cdot (1 - CONDLoss[c]) \cdot CONDNo[c]$$

Steam Reserves Calculation.

StmnRes=max{RequiredStmRes−CondStmRes,0}

Economics:
Total Cost Calculation.

$$TotCost = (TotFuelUse \cdot PriceFuel + MUWtrFlow \cdot PriceMUWtr +$$
$$TotPwrImp \cdot PriceImpPwr - TotPwrExp \cdot PriceExpPwr)/1000 +$$
$$\sum_{b \in BLR} BLRNo[b] \cdot BLRPrice[b] + \sum_{h \in hdr} Hdr[h] \cdot HdrPrice[h] +$$
$$\sum_{c \in COGEN} COGENNo[c] \cdot COGENPrice[c] +$$
$$\sum_{sO \in SOLAR} SOLARNo[s] \cdot SOLARPrice[s] +$$
$$\sum_{s \in STG} STGNo[s] \cdot STGPrice[s] + \sum_{c \in CSTG} CSTGNo[c] \cdot CSTGPrice[c] +$$
$$\sum_{b \in BOS} BOSNo[b] \cdot BOSPrice[b] + \sum_{c \in COND} CONDNo[c] \cdot CONDPrice[c] +$$
$$\sum_{(i,PC) \in PCoolingDem} AirCDuty[i] \cdot AirCPrice[i] +$$
$$\sum_{(i,PC) \in PCoolingDem} WtrCDuty[i] \cdot WtrCPrice[i] +$$
$$\sum_{(i,PC) \in PCoolingDem} RefDutyR[i] \cdot RefCPrice[i]$$

Figure 16:
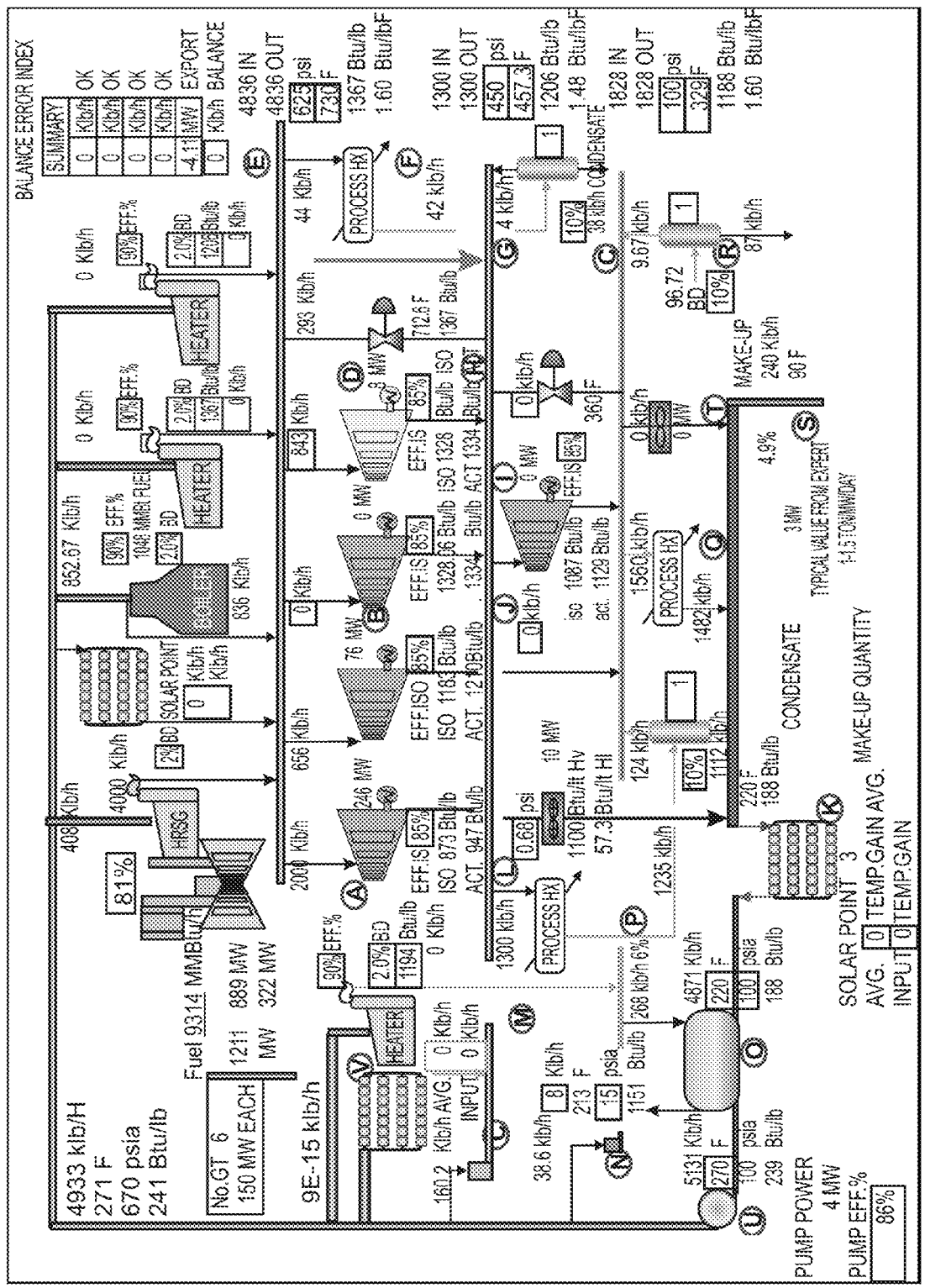
FIG. 16 is a graphical illustration of a CHP program output module according to an embodiment of the present invention.

Results provided by the CHP mathematical program output module, according to the exemplary configuration, include: the number of steam headers and operating conditions, the number of cogeneration units and its/their designated capacities, the number of boilers and its/their designated capacities, the number of steam turbine generators and its/their capacities, the number of electrical motors and steam turbines for process equipment driving and its/their size, the size and location of solar system, the CHP utility system steam and power generation and allocation, and the process plant process steam generation and demand loads and levels. FIG. 16 illustrates an output model diagram including the CHP utility system resulting from the entered input parameters/variables identified in FIGS. 13-15. FIG. 17 provides the respective abbreviations utilized to identify the various components in the output model.

Optimal Process Conditions and HEN Minimum Number of Units Identification.

As part of the above described methodology and mathematical model program, according to the exemplary configuration, the mathematical program can include a module for identifying the best pinch point resulting in or associated with the minimum number of heat exchange unit (HEN) units. The module includes program code which incorporates program code provided for/under all possible combinations of process changes and optimal driving force distribution in energy recovery systems described, for example, in U.S. Pat. No. 7,698,022. The steps/operations performed by the module, according to the exemplary configuration, are as follows:

Step 1: Perform energy utility targeting under all possible combinations of different process conditions using stream-specific minimum approach temperatures ($\Delta T_{min}^i$).
Step 2: Develop a temperature interval diagram for each possible pinch point temperature to enable the calculations of the associated number of HEN units.
Step 3: For each identified pinch point, estimate the minimum number of HEN units for both the region above and the region below the respective pinch point using a pinch heuristic (Nu = S – 1).
Step 4: Compare the results and define the pinch point temperature at which minimum number of units can be obtained.
Step 5: Use an interval collapsing algorithm to find the discrete process conditions rendering the desired pinch point temperature that results in the targeted minimum number of HEN units.

Step 1: This step includes performing an energy utility targeting operation under all possible combinations of different process conditions using, for example, stream-specific minimum approach temperatures ($\Delta T_{min}^i$). If the targeting step renders a pinch interval, rather than a single pinch point, then there is potential to explore best pinch point for minimum number of HENs. The Pinch points set includes all the streams possible start temperatures included in this set.

Step 2: This step includes developing a temperature interval diagram for each possible pinch point temperature to enable the calculations of the associated number of HEN units.

Step 3: This step includes estimating the minimum number of HEN units for both the region above and the region below the respective pinch point of each identified pinch point using a pinch heuristic: Nu=S−1, where Nu=Number of HEN units, and S=Number of process streams plus Number of utility levels.

Step 4: Compare the results and define the pinch point temperature at which the minimum number of units can be obtained.

Step 5: This step includes utilizing the interval collapsing algorithm described, for example, in U.S. Pat. No. 7,698,022, to find the discrete process conditions rendering the desired pinch point temperature that results in the targeted minimum number of HEN units.

Figure 18:
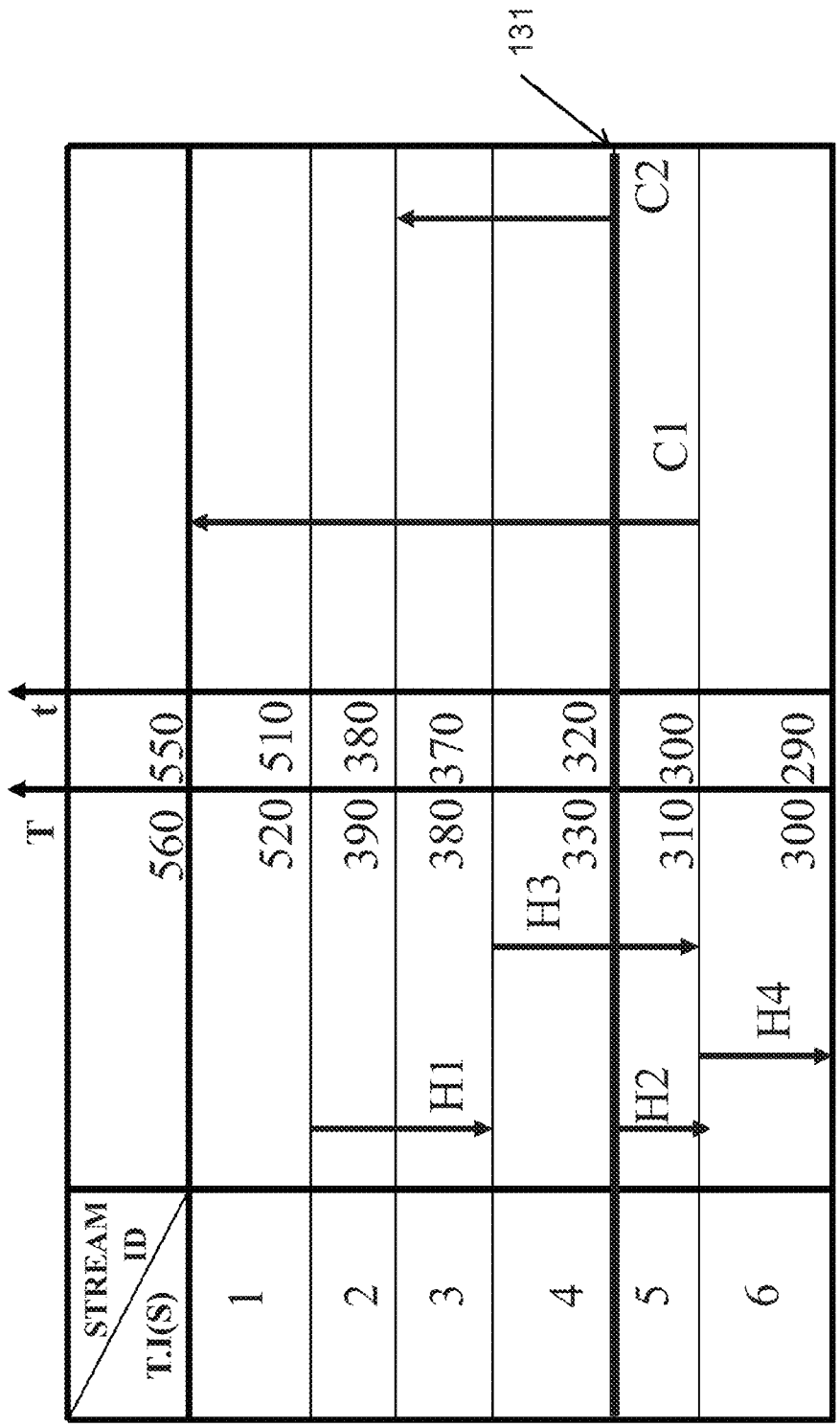
FIGS. 18-19 are temperature interval diagram illustrating selection of optimal process conditions and HEN minimum number of units identification according to an embodiment of the present invention.
Figure 19:
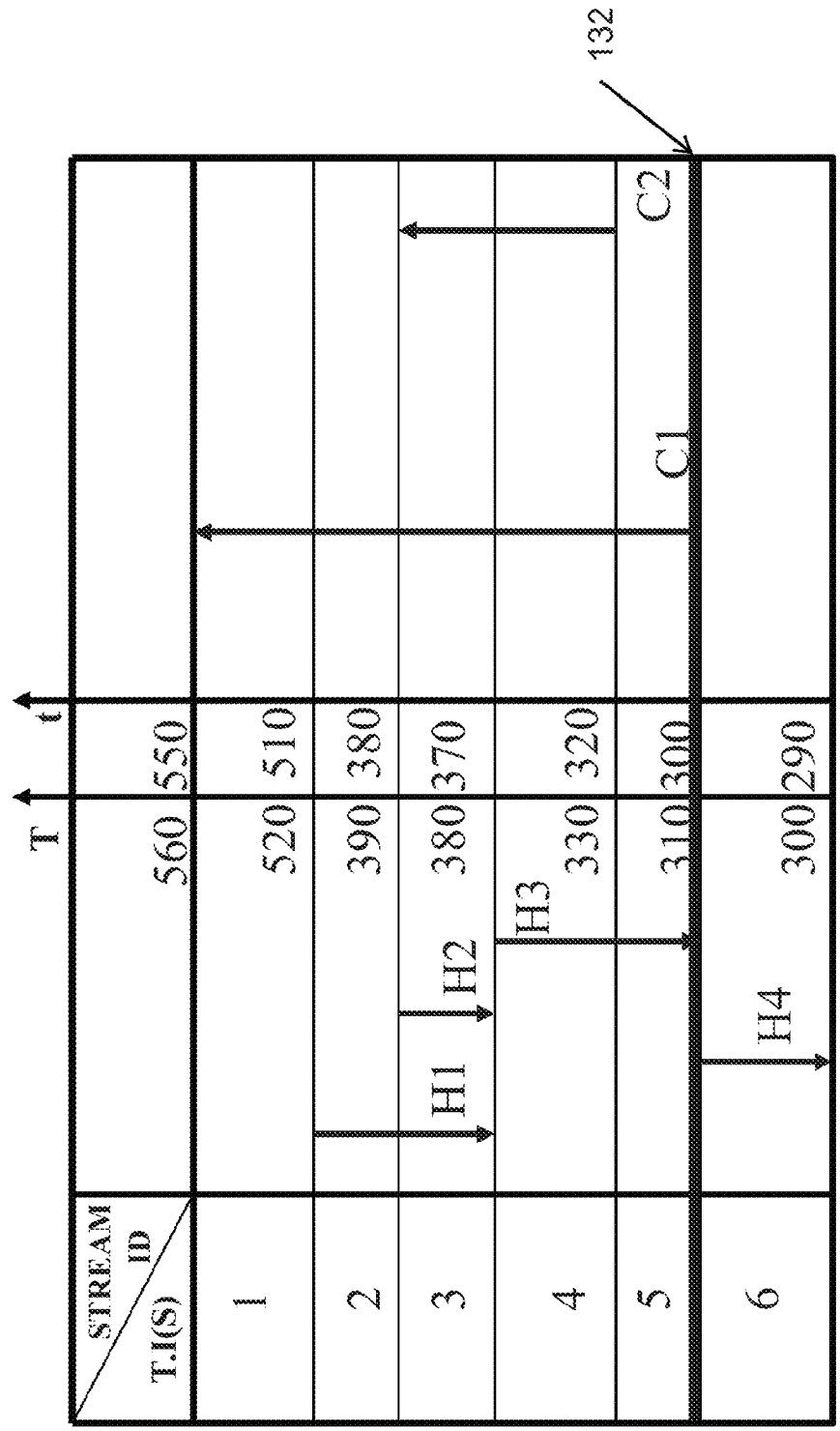
Figure 20:
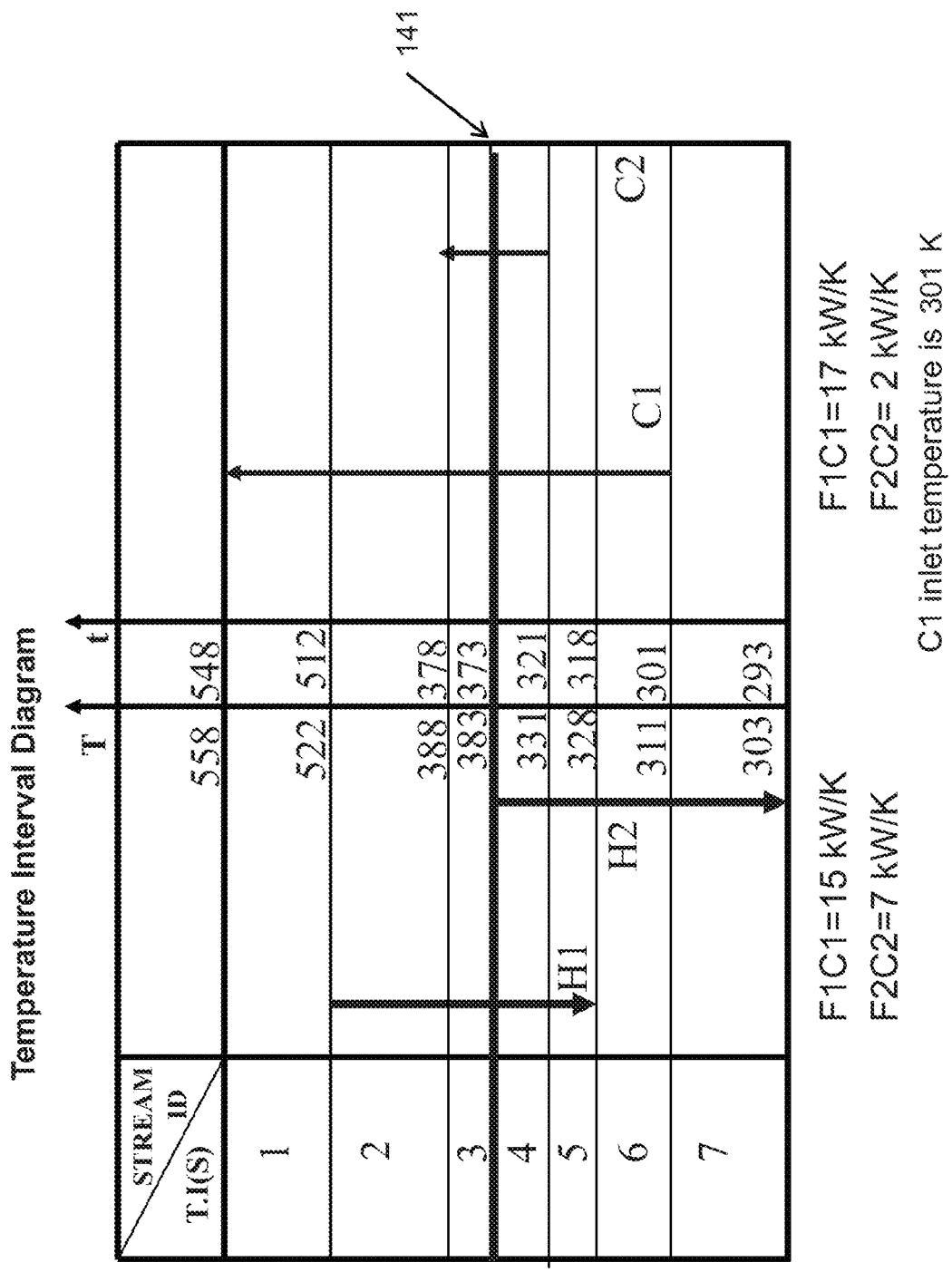
FIGS. 20-21 are temperature interval diagrams illustrating selection of optimal process conditions and HEN minimum number of units identification according to an embodiment of the present invention.
Figure 21:
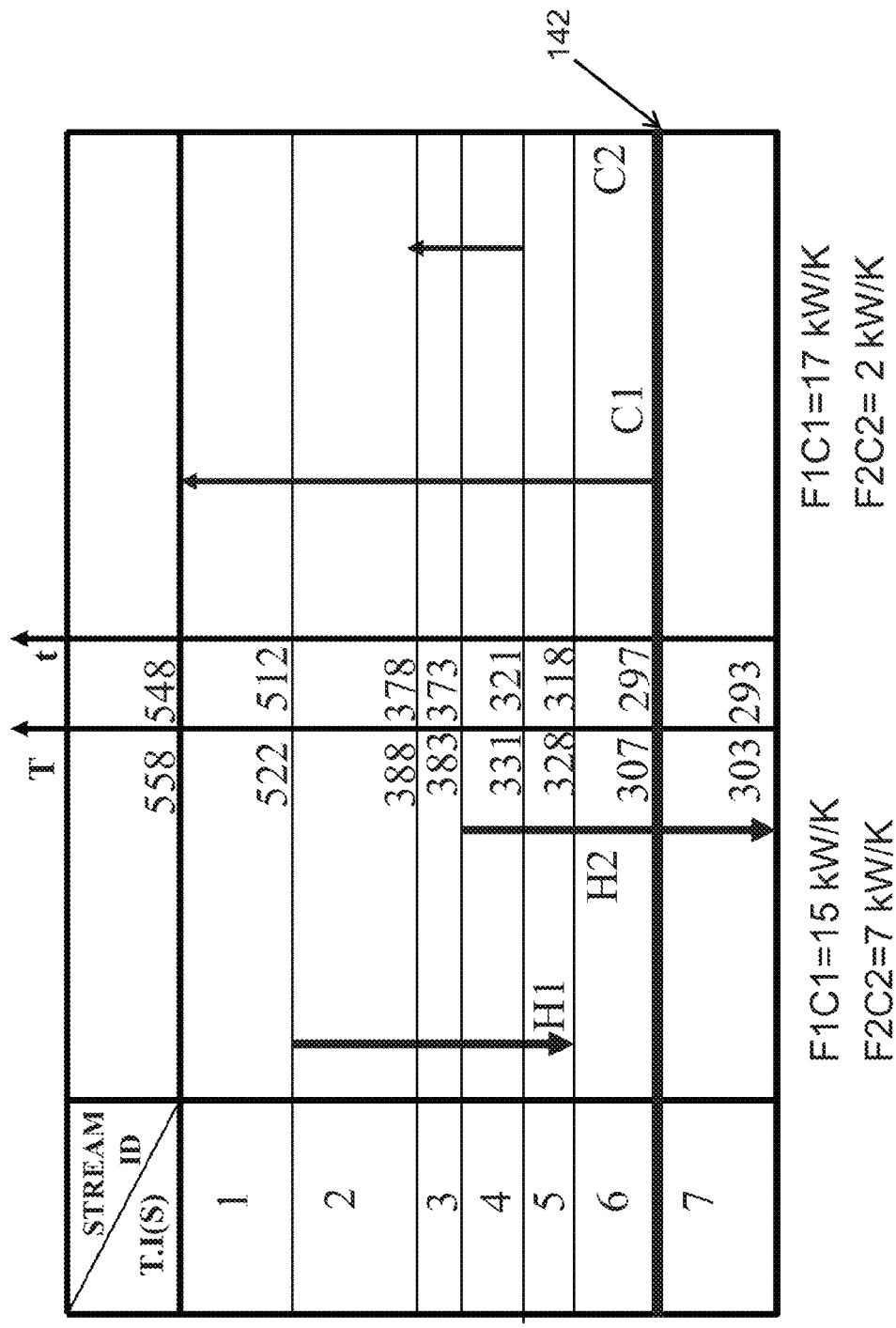

FIGS. 18-21 provide two examples of interval diagrams showing the location of the pinch point and corresponding process conditions leading to a reduced number of HEN units. FIG. 18 illustrates a first example which includes four hot streams H1-H4 and two cold streams C1-C2. In this example, hot stream H3 and cold stream C1 cross the pinch line located at 131. FIG. 19 illustrates how utilization of a pinch point located at 132 renders process conditions which provide for utilization of two less heat exchanger units. FIG. 20 similarly illustrates a second example, which includes two hot streams H1-H2 and two cold streams C1-C2 at their respective supply and target temperature process conditions. In this example, hot stream H1 and cold streams C1-C2 cross the pinch line located at 141. FIG. 21 illustrates how utilization of a pinch point located at 142 renders process conditions which provide for utilization of two less heat exchanger units.

Optimal Process Conditions and HEN Area Method and Mathematical Model Details ("LINGO" Solver Environment)

As part of the above described method and mathematical model program, the exemplary configuration includes steps for determining optimal process conditions, and the optimal heat exchanger network (HEN) surface area. The steps/operations performed by the module, according to the exemplary configuration, are as follows:

Step 0: Select new project or access previously saved project.
Step 1: Define heating and cooling utilities lower and upper bounds utilizing an energy utilities targeting methodology.
Step 2: Develop possible configurations for heat exchangers network under possible combinations of process conditions for a designated minimum temperature approach.
Step 3: Develop a non-linear program (NLP) model in which each stream supply temperature, target temperature and heat capacity flowrate (FCp), as well as the HEN heating and cooling duties are rigorously bounded variables.
Step 4: Solve the NLP to identify best process conditions associated with minimum total heat exchangers network surface area (i.e., the surface area of each heat exchanger in the network).
Step 5: Repeat steps 3 and 4 for each possible HEN configuration.
Step 6: Repeat procedures 3, 4 and 5 for each of one or more but more typically a plurality of desired or possible {ΔT_min_i} sets.

Figure 22:
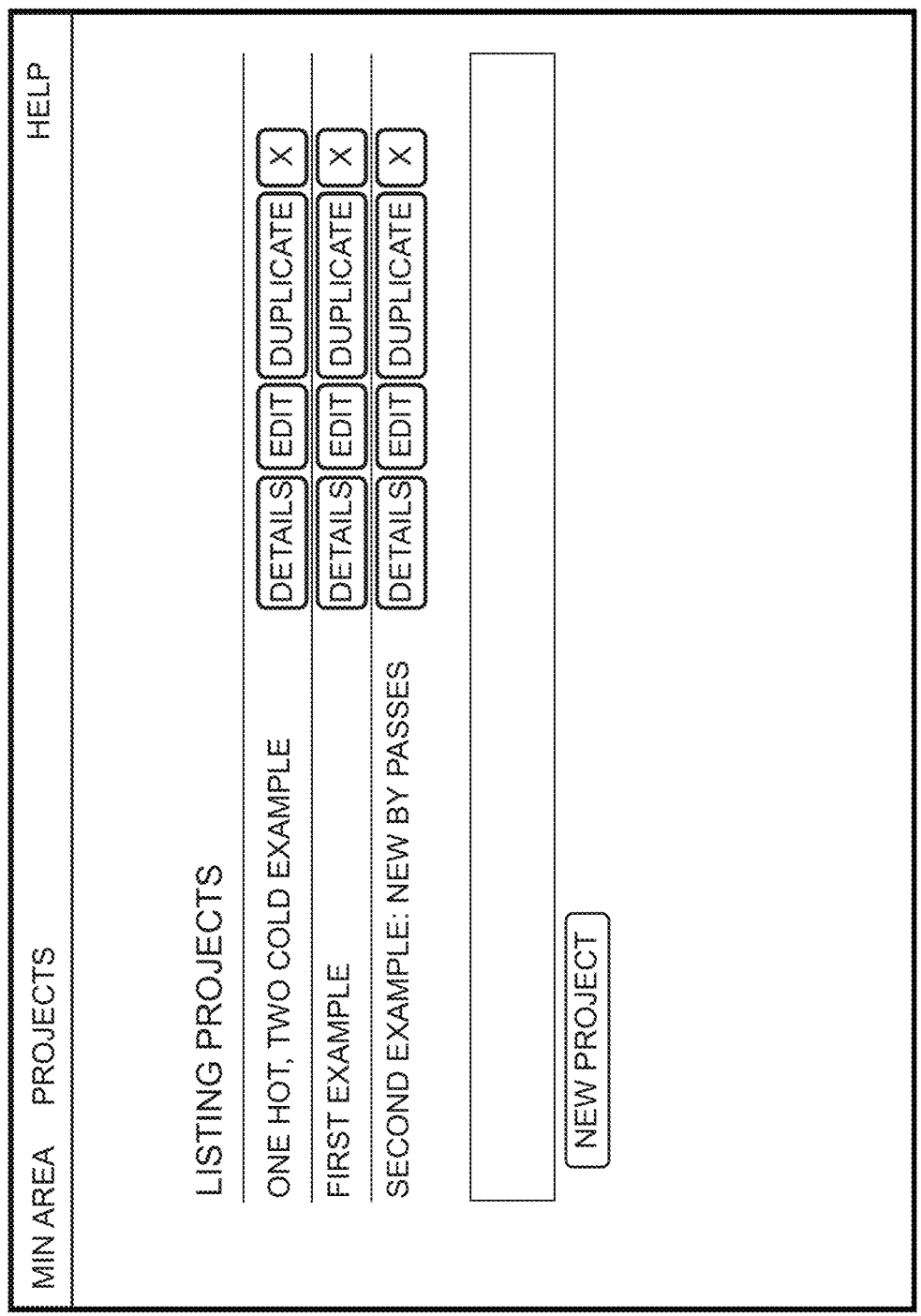
FIG. 22 is a graphical user interface illustrating an optimal process conditions and HEN area identification projects listing main page according to an embodiment of the present invention.
Figure 23:
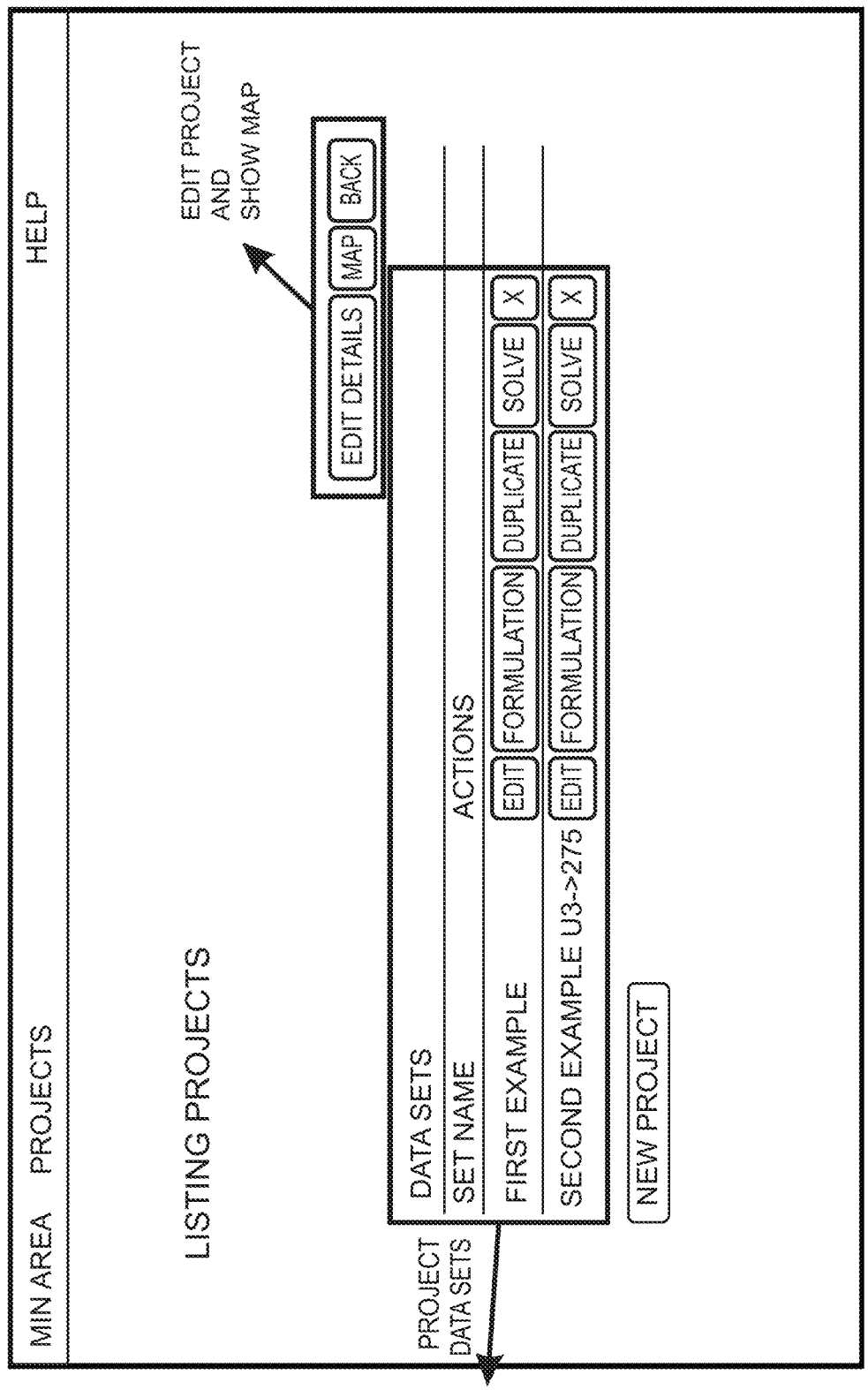
FIG. 23 is a graphical depiction illustrating an optimal process conditions and HEN area identification screen providing project details according to an embodiment of the present invention.

Step 0: This step includes accessing a "listing projects" webpage (see, e.g., FIG. 22). As shown in FIG. 23, selection of existing projects includes accessing project data sets. Selecting either an existing project or a new project provides access to edit/originate the project details (see, e.g., FIGS. 13-15) and show the project map.

Step 1: This step includes defining the heating and cooling utilities lower and upper bounds for the process utilizing an energy utilities targeting methodology such as, for example, that described in U.S. Pat. No. 7,698,022.

Step 2: This step includes developing possible configurations for the heat exchangers network under possible/probable combinations of process conditions for designated minimum temperature approach (e.g. {ΔT_min_i}=10) utilizing, for example, the methodology described, for example, in U.S. patent application Ser. Nos. 12/898,461 and/or 12/898,484.

Figure 25:
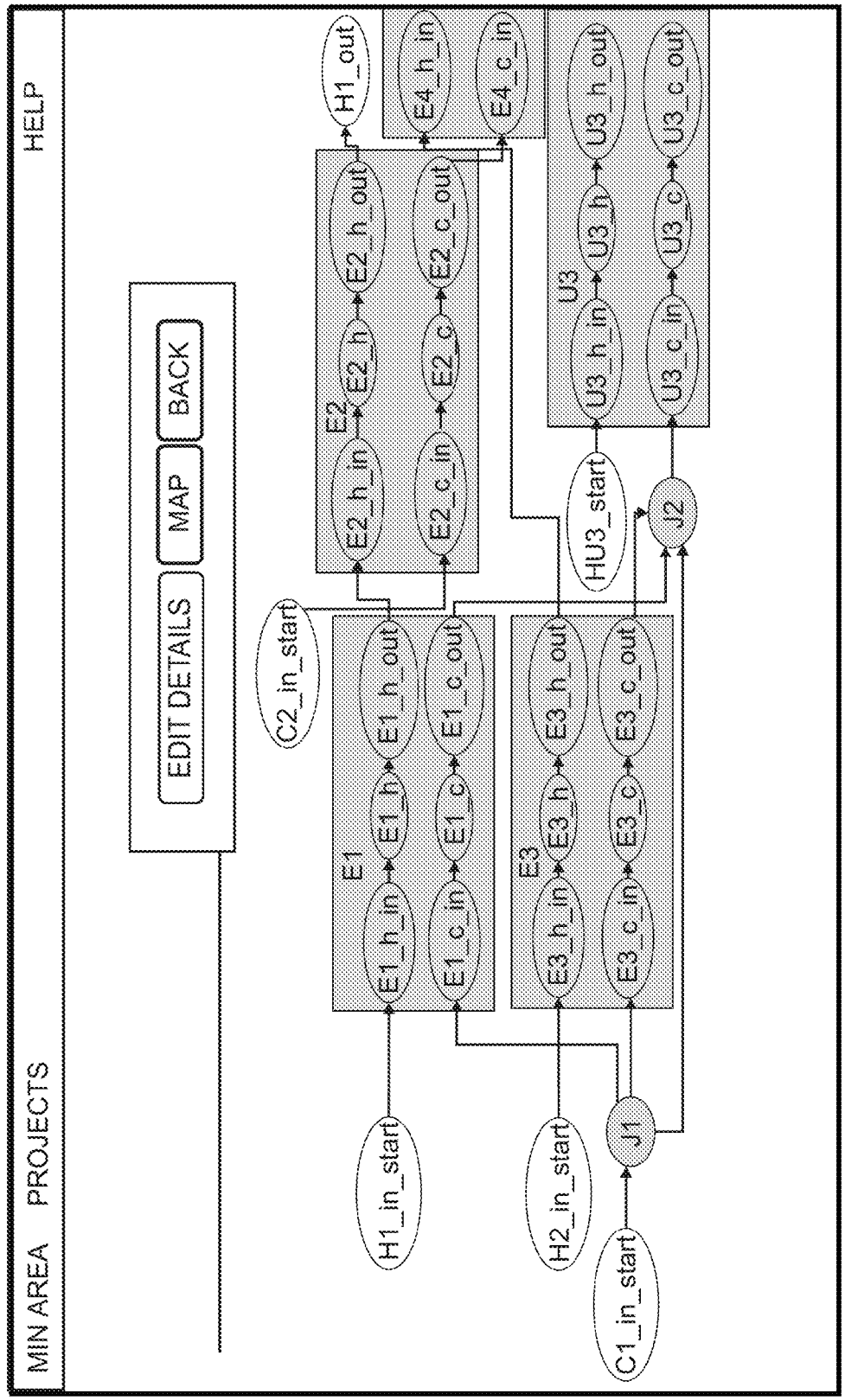
FIG. 25 is a graphical illustration of a network topology according to an embodiment of the present invention.

Step 3: This step includes developing a non-linear program (NLP) model in which each stream supply temperature, target temperature and heat capacity flowrate (FCp), as well as the HEN heating and cooling duties are rigorously bounded variables. An exemplary nonlinear program model is provided, for example, in Appendix 3 and in FIGS. 22-40. FIGS. 24A-B together illustrate a portion of the program code for entering the network topology. FIG. 25 illustrates a network schematic example. FIG. 26 illustrates an "enter data" snapshot. FIG. 27, for example, illustrates a model formulation view.

Step 4: This step includes solving the NLP to identify best process conditions associated with minimum total heat exchangers network surface area (i.e., the surface area of each heat exchanger in the network). FIG. 28 illustrates a solution results view.

Step 5: This step includes repeating steps 3 and 4 for each possible HEN configuration.

Step 6: This step includes repeating steps 3, 4 and 5 for each of one or more, but more typically a plurality of desired or possible {ΔT_min_i} sets.

Optimistic Solution

As described above, various embodiments of the present invention provide a bi-level programming solution philosophy which includes or otherwise provides for: a close to optimal CHP, distillation sequence, and HEN as well as the process conditions leading to it; a close to optimal CHP, distillation sequence and minimum number of heat exchangers units, as well as the process conditions leading to it; and a close to optimal CHP, distillation sequence and minimum heat exchangers units surface area, as well as the process conditions leading to it.

Figure 29:
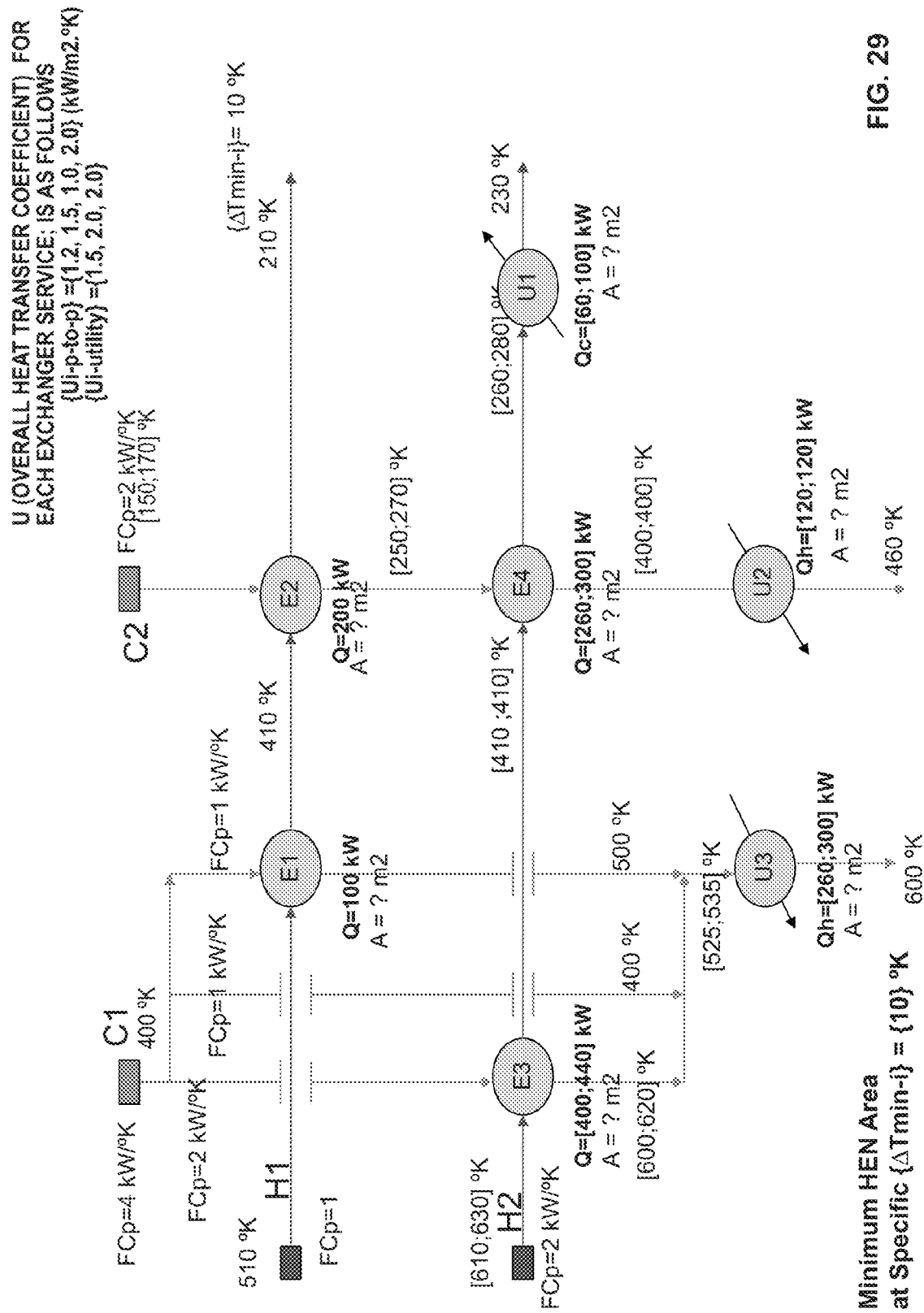
FIG. 29 is a graphical illustration of an exemplary configuration of a HEN solution example according to an embodiment of the present invention.
Figure 30:
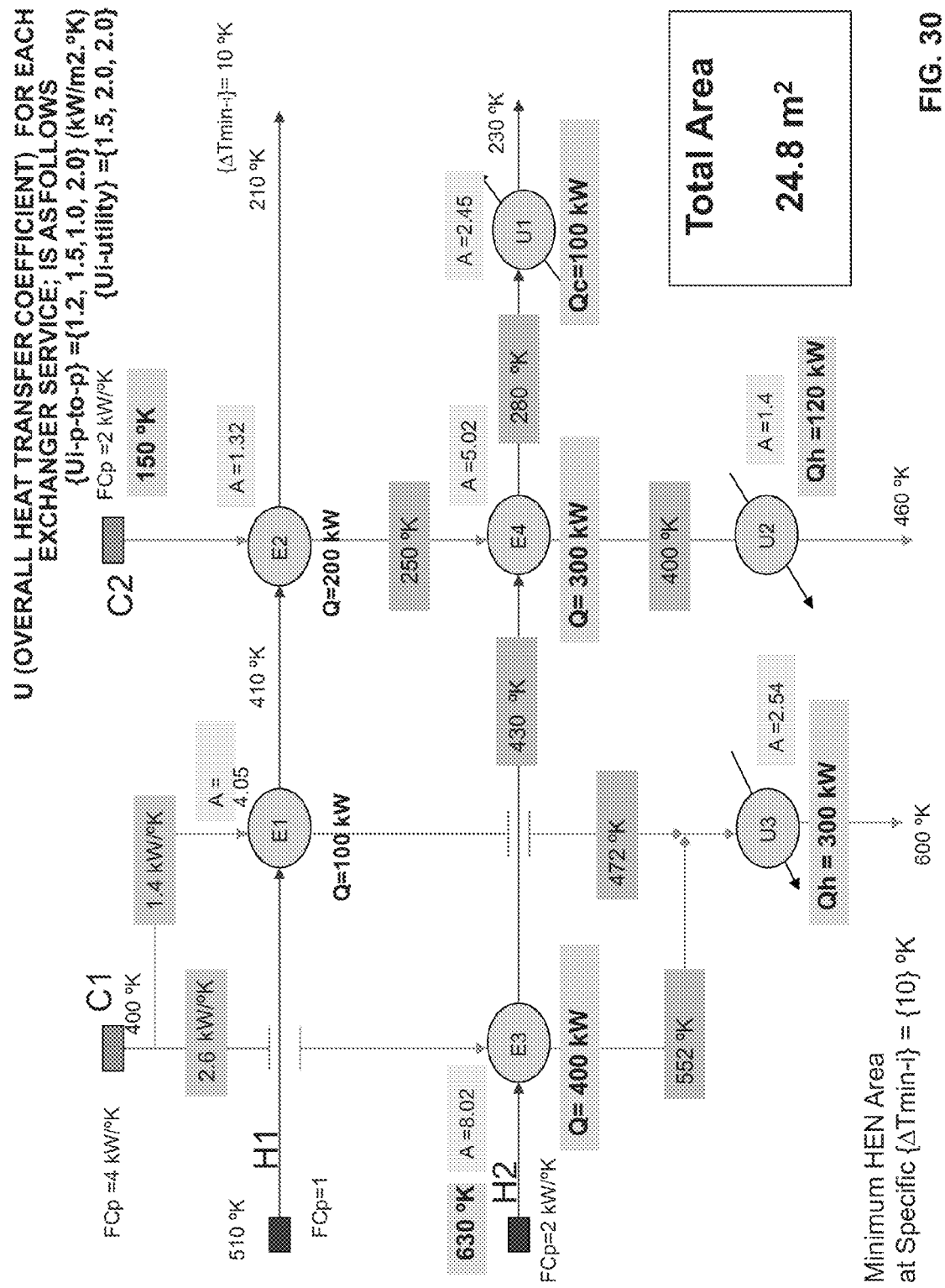
FIG. 30 is a graphical illustration of the HEN solution example of FIG. 29 having process conditions and HEN surface area solved employing the process as the "Leader" and the Utility as the "Follower" according to an embodiment of the present invention.
Figure 31:
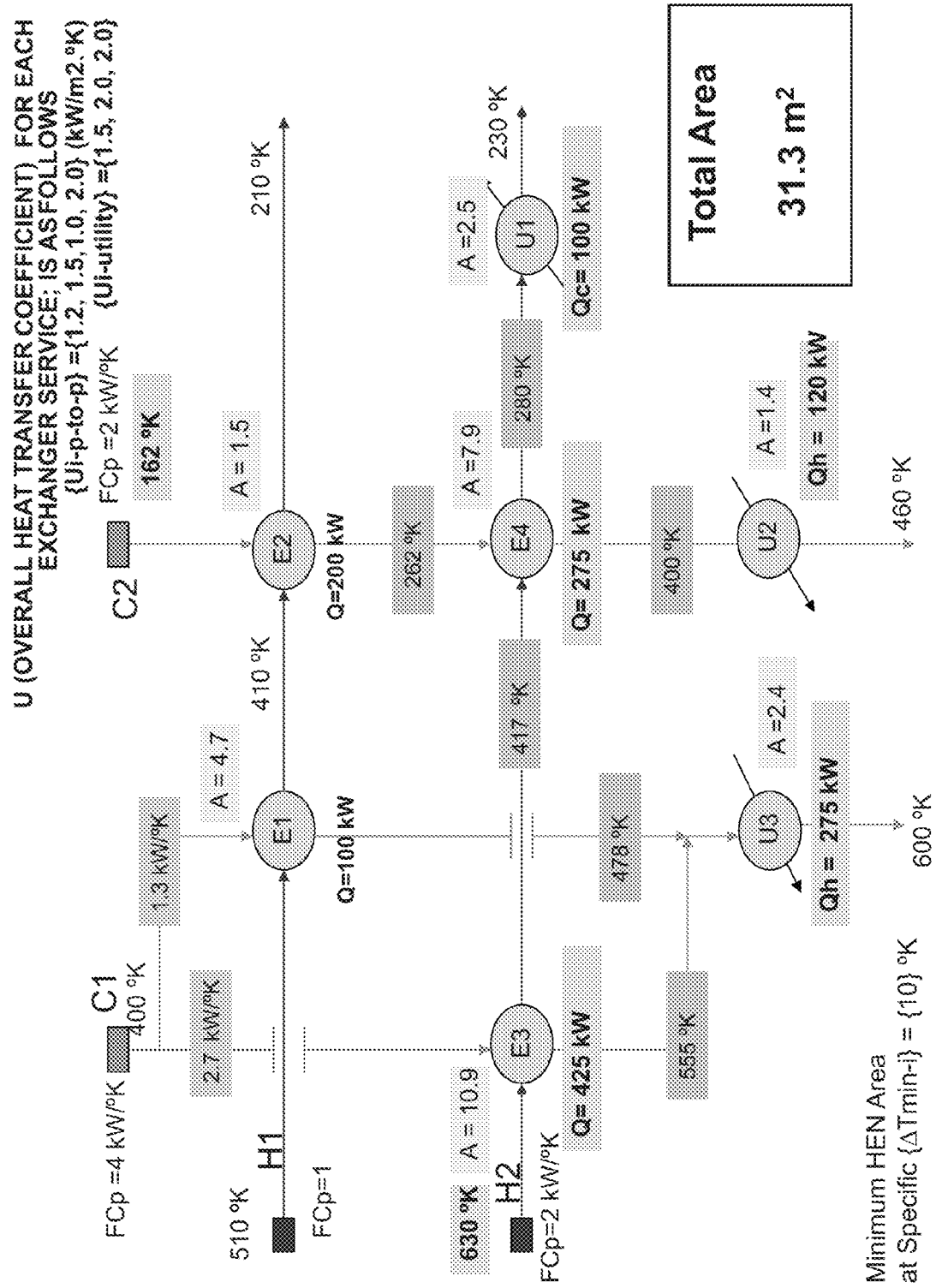
FIG. 31 is a graphical illustration of the HEN solution example of FIG. 29 having process conditions and HEN surface area solved employing utility as the "Leader" and the process is the "Follower" according to an embodiment of the present invention.

FIG. 29 illustrates a portion of a first exemplary HEN configuration illustrating a problem for solving for optimal process conditions and HEN surface area (A or SA) of each heat exchanger forming the HEN network. FIG. 30 illustrates the results of solving for optimal process conditions and corresponding HEN surface area configuration whereby the optimal process conditions solution was solved first and the at least semi-optimal utility system solution was solved second in view of the requirements of the optimal process configuration, i.e., the process units/system was the "leader" and the utility system was the "follower." FIG. 31 illustrates the reverse situation whereby the optimal utility system solution was solved first and the process conditions solution was solved second, i.e., the utility system was that "leader" and the process units/system was the "follower." In this configuration, the heating duty (Qh) of utility #3 (U3) provided with the other utilities, was given from the utility CHP solution to be 275 kW—a 25 kW reduction over that of the process condition leader configuration, but with a trade-off of a higher total heat exchanger surface area requirement.

Figure 33:
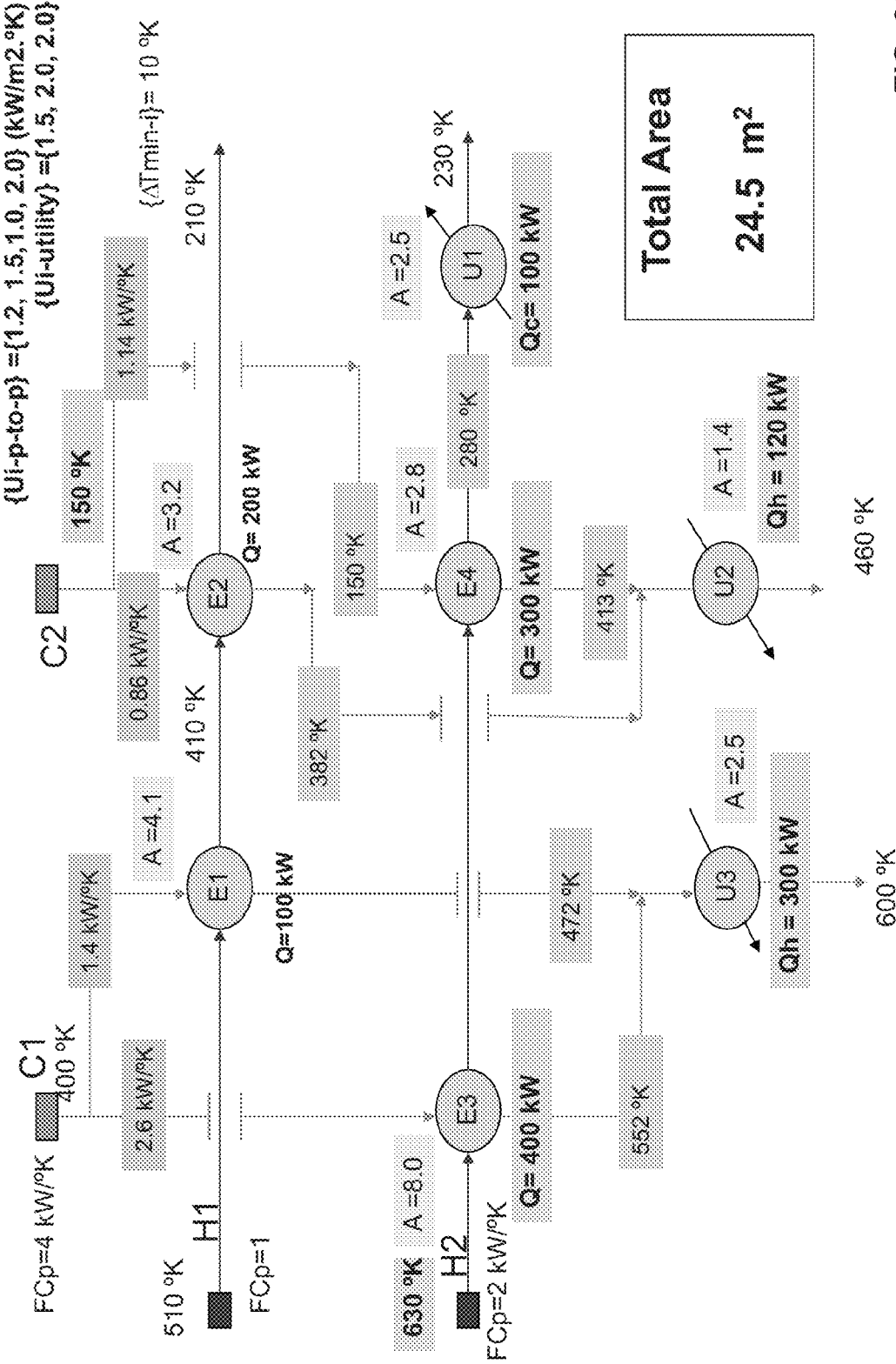
FIG. 33 is a graphical illustration of the HEN solution example of FIG. 32 having process conditions and HEN surface area solved employing the process as the "Leader" and the Utility as the "Follower" according to an embodiment of the present invention.
Figure 34:
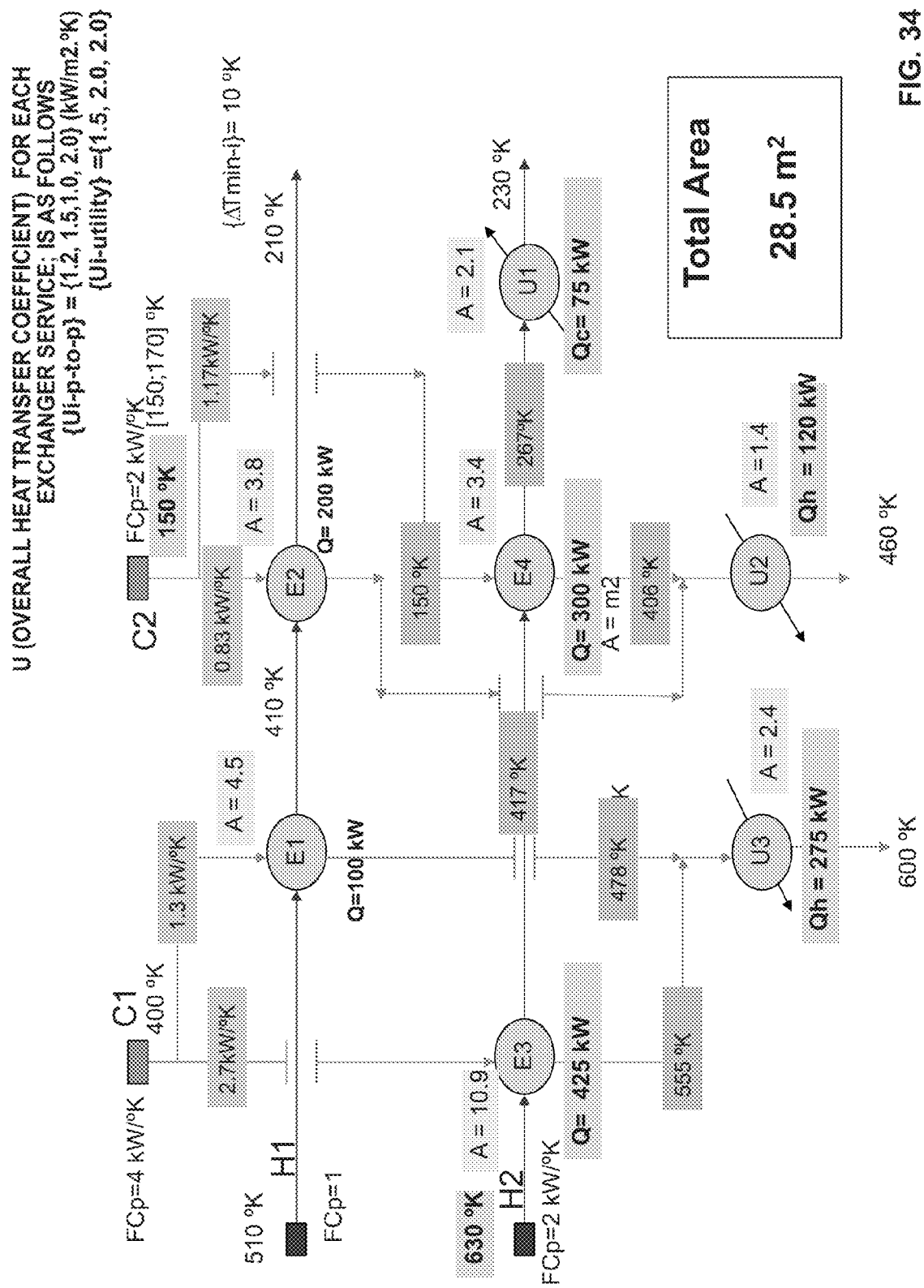
FIG. 34 is a graphical illustration of the HEN solution example of FIG. 32 having process conditions and HEN surface area solved employing utility as the "Leader" and the process is the "Follower" according to an embodiment of the present invention.

FIG. 32 illustrates a portion of a second exemplary HEN configuration illustrating a problem that includes solving for optimal process conditions and HEN surface area of each heat exchanger forming the HEN network. FIG. 33 illustrates the results of solving for optimal process conditions and corresponding HEN surface area configuration whereby the optimal process conditions solution was solved first and the utility system solution was solved second in view of the requirements of the optimal process configuration, i.e., the process units/system was the "leader" and the utility system was the "follower." FIG. 34 illustrates the reverse situation whereby the optimal utility system solution was solved first and the process conditions solution was solved second, i.e., the utility system was that "leader" and the process units/system was the "follower." In this configuration, the heating duty (Qh) of utility #3 (U3) and cooling duty (Qc) were given from the utility CHP solution to be Qh=275 kW and Qc=75 kW—a 25 kW reduction for each of the two utilities over that of the process condition leader configuration along with associated reductions in utility capital costs, but with a trade-off of a higher total heat exchanger surface area requirement and corresponding associated capital costs.

Figure 35:
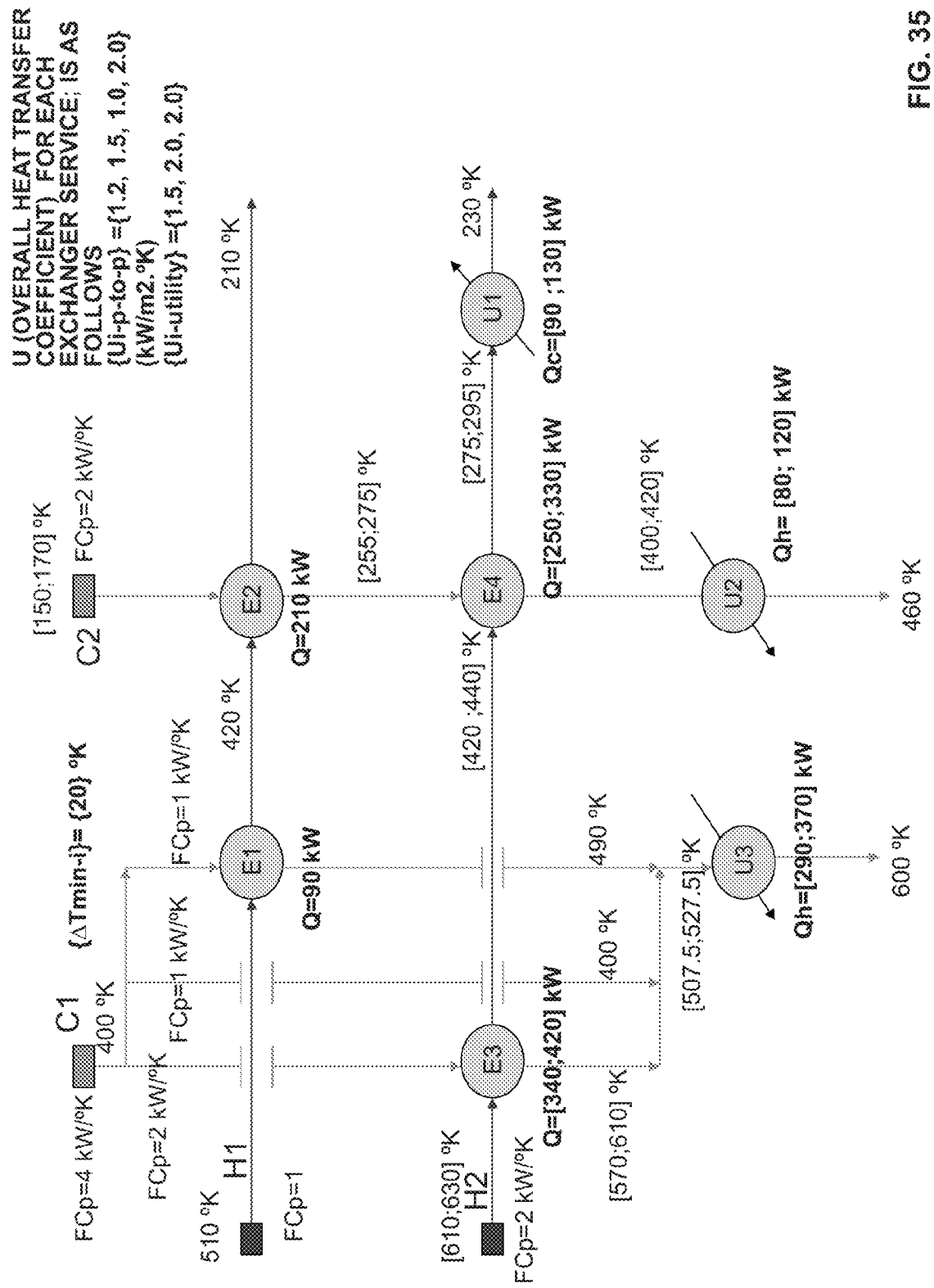
FIG. 35 is a graphical illustration of the exemplary HEN solution example of FIG. 29 having a larger $\Delta T\_min\_i$, larger resulting in larger utility requirements according to an embodiment of the present invention.
Figure 36:
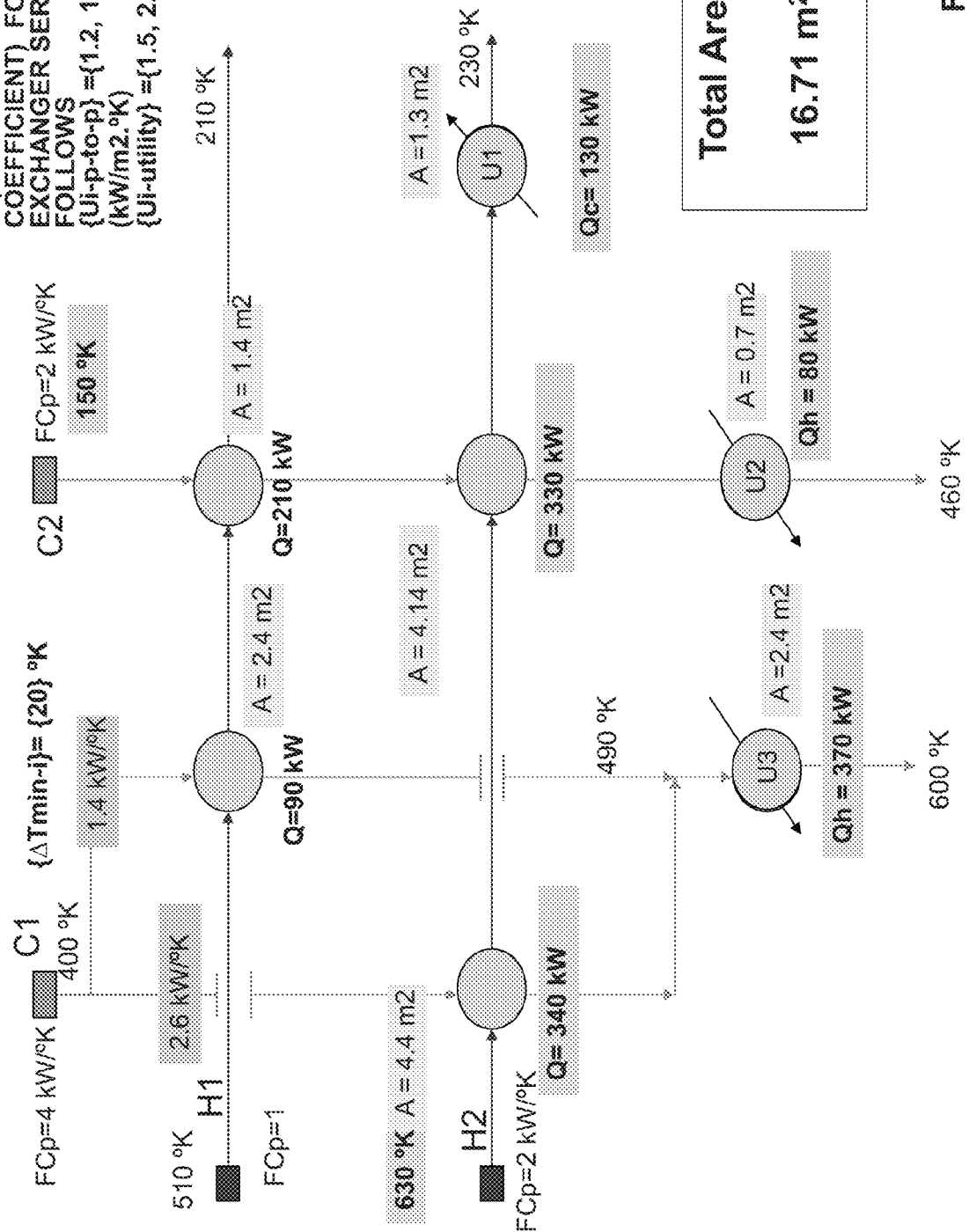
FIG. 36 is a graphical illustration of the HEN solution example of FIG. 35 having process conditions and HEN surface area solved employing the process as the "Leader" and the Utility as the "Follower" according to an embodiment of the present invention.

FIG. 35 illustrates a portion of a third exemplary HEN configuration illustrating a problem for solving for optimal process conditions and HEN surface area of each heat exchanger forming the HEN network of FIG. 29, but with a higher ΔTmin-i. FIG. 36 illustrates the results of solving for optimal process conditions and corresponding HEN surface area configuration whereby the optimal process conditions solution was solved first and the utility system solution was solved second in view of the requirements of the optimal process configuration, i.e., the process units/system was the "leader" and the utility system was the "follower." FIG. 37 illustrates the reverse situation whereby the optimal utility system solution was solved first and the process conditions solution was solved second, i.e., the utility system was that "leader" and the process units/system was the "follower." In this configuration, there is no appreciable change in total utility requirements, but the resultant configuration has a larger total heat exchanger surface area requirement, and thus, larger capital costs which would need to be more than offset by the reduction in utility system capital costs over that which would be required if the surface area was not increased over that of the previous problem for utility system leader configuration to be the optimal configuration.

Figure 37:
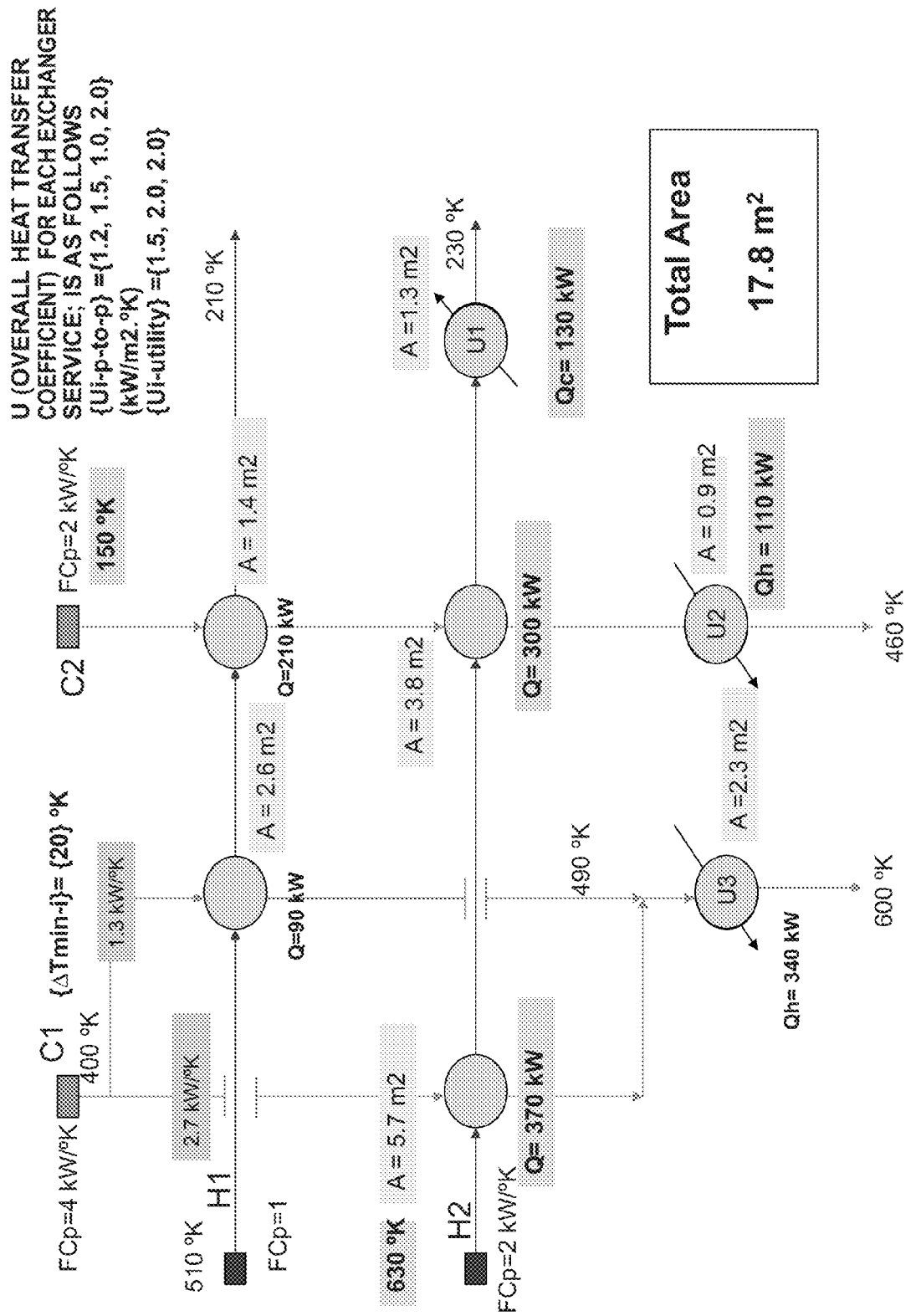
FIG. 37 is a graphical illustration of the HEN solution example of FIG. 35 having process conditions and HEN surface area solved employing utility as the "Leader" and the process is the "Follower" according to an embodiment of the present invention.
Figure 38:
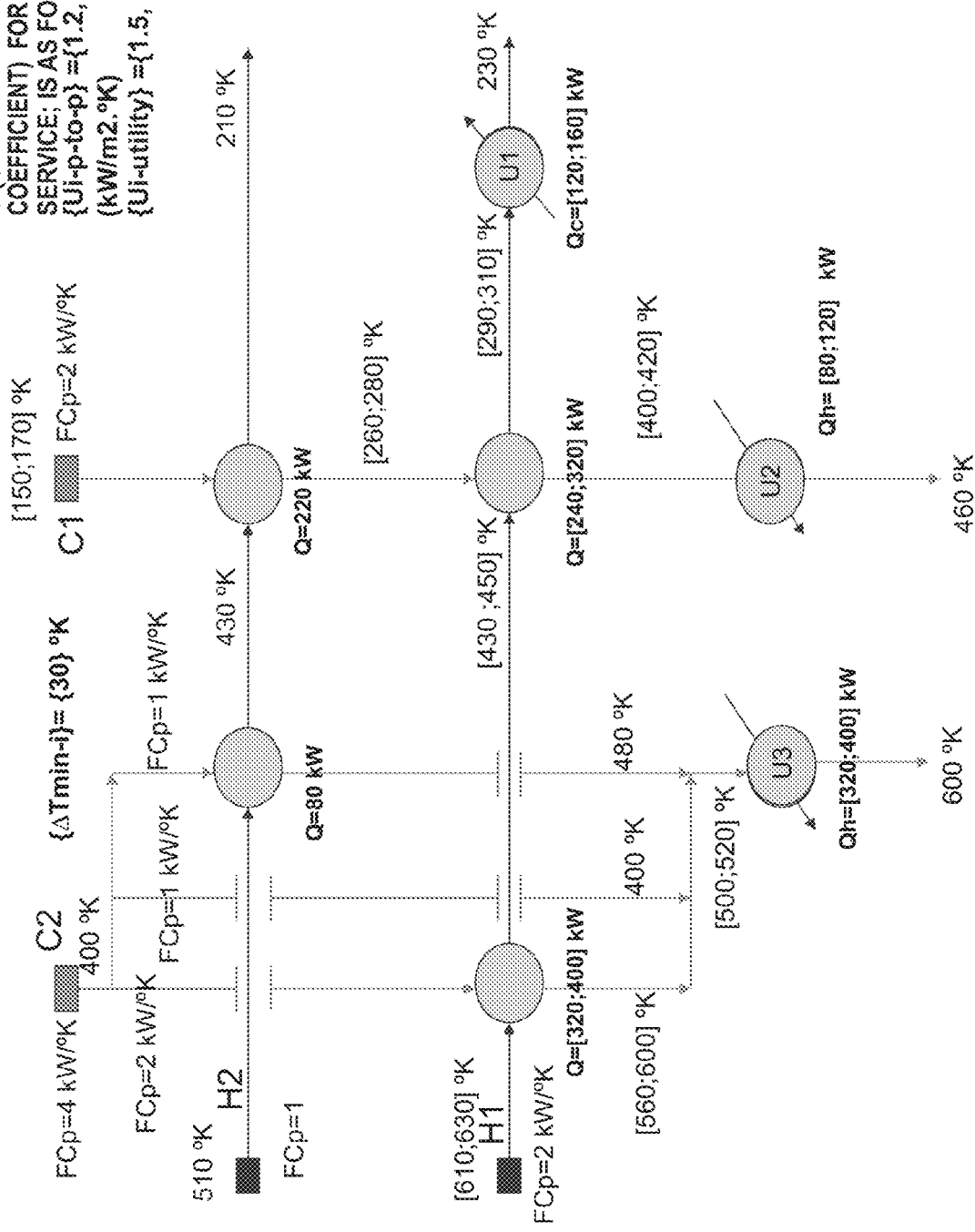
FIG. 38 is a graphical illustration of the exemplary HEN solution example of FIG. 29 having an even larger $\Delta T\_min\_i$, larger resulting in even larger utility requirements according to an embodiment of the present invention.
Figure 39:
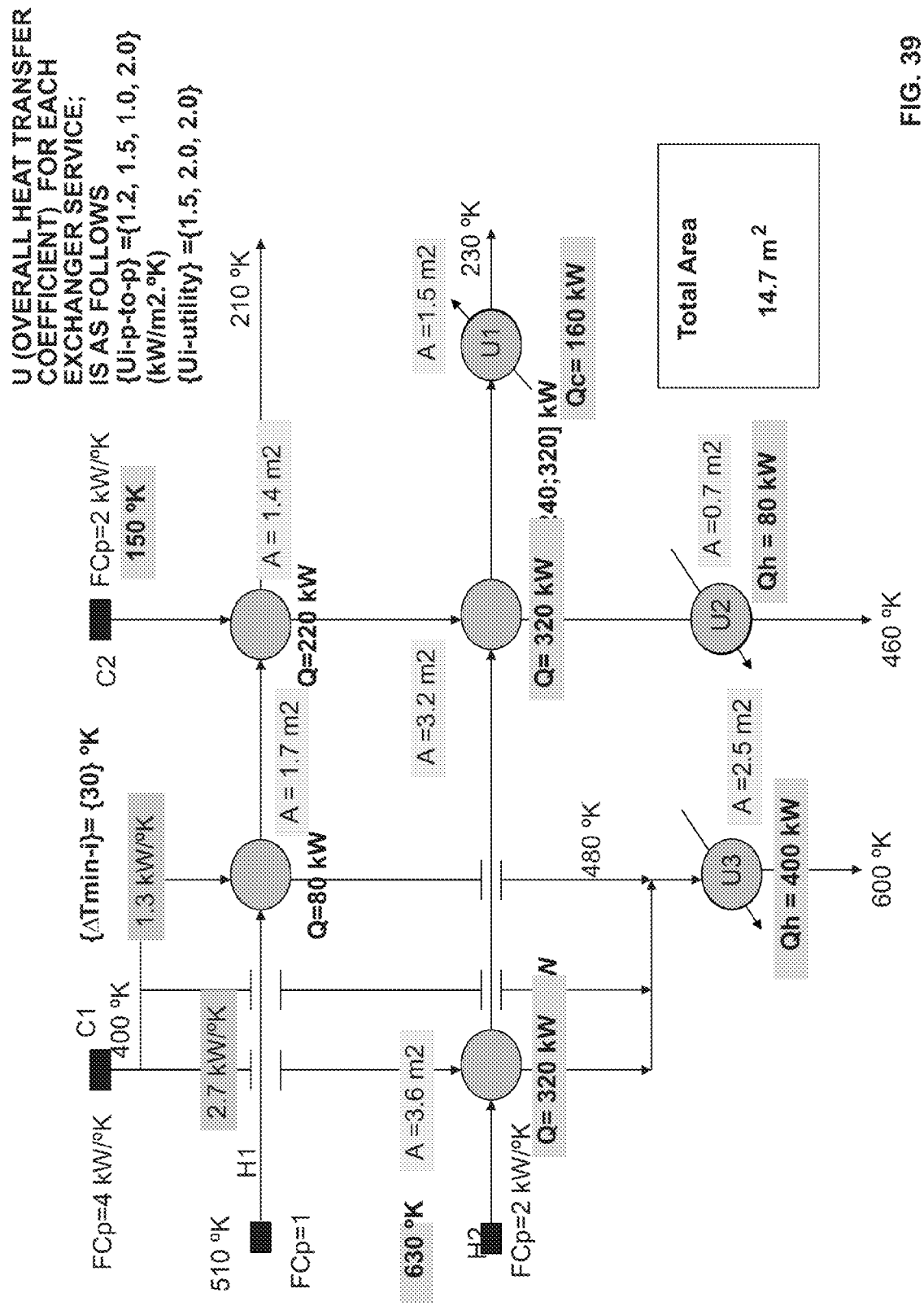
FIG. 39 is a graphical illustration of the HEN solution example of FIG. 38 having process conditions and HEN surface area solved employing the process as the "Leader" and the Utility as the "Follower" according to an embodiment of the present invention.
Figure 40:
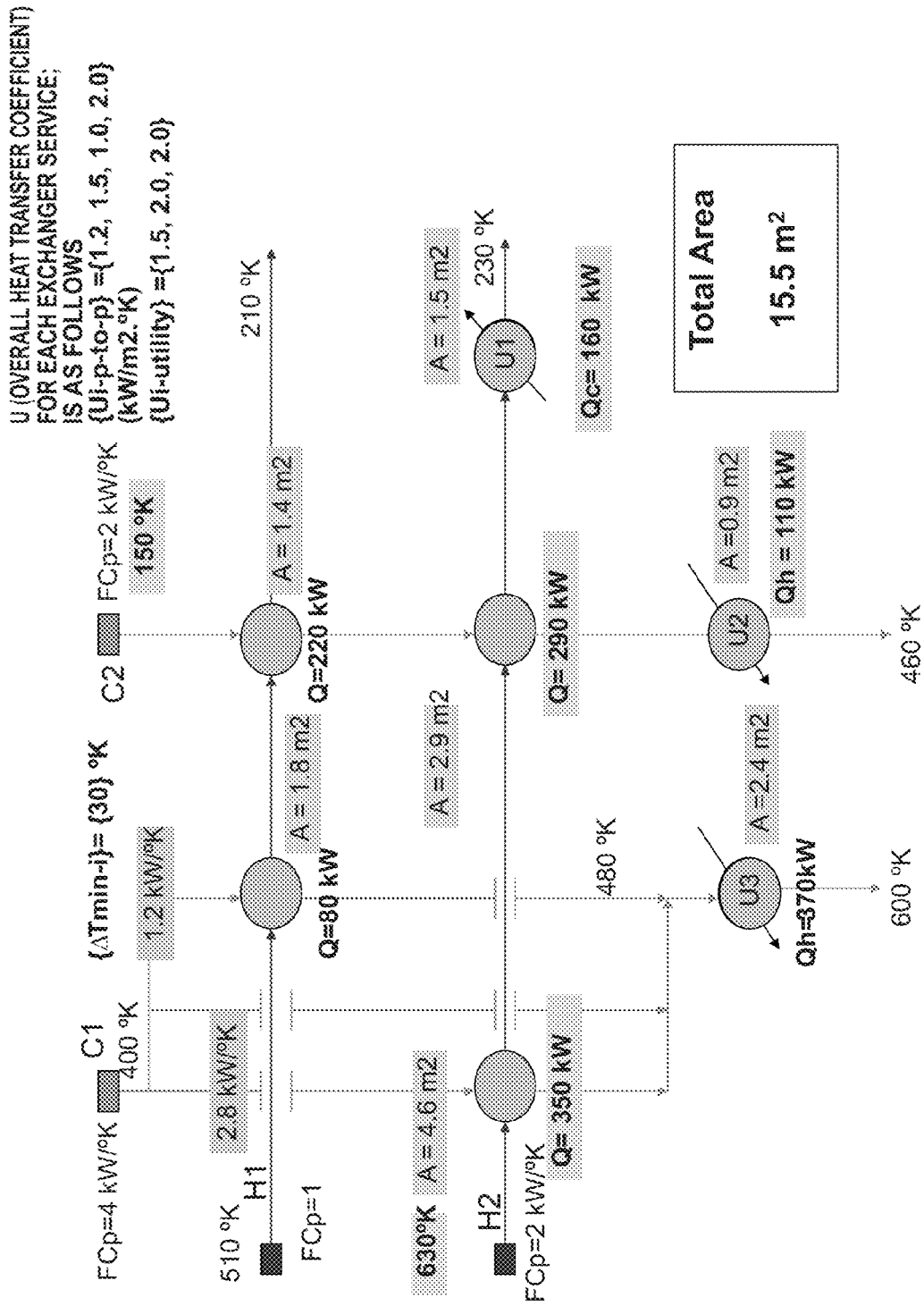
FIG. 40 is a graphical illustration of the HEN solution example of FIG. 38 having process conditions and HEN surface area solved employing utility as the "Leader" and the process is the "Follower" according to an embodiment of the present invention.

FIG. 38 illustrates a portion of a third exemplary HEN configuration illustrating a problem for solving for optimal process conditions and HEN surface area of each heat exchanger forming the HEN network of FIGS. 29 and 37, but with an even higher ΔTmin-i. FIG. 39 illustrates the results of solving for optimal process conditions and corresponding HEN surface area configuration whereby the optimal process conditions solution was solved first and the utility system solution was solved second in view of the requirements of the optimal process configuration, i.e., the process units/system was the "leader" and the utility system was the "follower." FIG. 40 illustrates the reverse situation whereby the optimal utility system solution was solved first and the process conditions solution was solved second, i.e., the utility system was that "leader" and the process units/system was the "follower." In this configuration, there is no appreciable change in total utility requirements, but the resultant configuration has a larger total heat exchanger surface area requirement, and thus, larger capital costs which would need to be more than offset by the reduction in utility system capital costs over that which would be required if the surface area was not increased over that of the previous problem for utility system leader configuration to be the optimal configuration.

Bi-Level Programming Solution Philosophy

Not only do various embodiments of the present invention beneficially provide the above-described optimistic solution and the pessimistic solution (currently adapted, whereby the CHP decision-maker finds its optimum under process giving conditions from the process engineering department), such embodiments can provide a "tie-cooperation approach" which can provide: information to consider the least capital intensive distillation sequence and/or HEN versus best CHP utility cost during the decision-making of the CHP (e.g., through simple iterations between departments); a Pareto diagram for a partially decentralized company for company-Y best decision-making using {ΔTmin-i} as a marching variable; and a Pareto diagram for both, e.g., chemical company and third-party utility/CHP company having a limited budget/investment proposal, for mutual decision-making.

Computer Readable Medium Implementation

It is important to note that while embodiments of the present invention have been described in the context of a fully functional system/apparatus, those skilled in the art will appreciate that the mechanism of at least portions of the present invention and/or aspects thereof are capable of being distributed in the form of a non-transitory computer readable medium storing/containing or otherwise embodying instructions in a variety of forms for execution on one or more processors, or the like, and that embodiments of the present invention apply equally regardless of the particular type of media used to actually carry out the distribution. Non-transitory computer readable medium or media which is understood to mean includes all forms of computer readable storage media that do not fall under the category of being non-statutory subject matter, in general, or take the form of a propagating signal per se, in particular. Examples of the non-transitory computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and in certain circumstances, transmission type media such as digital and analog communication links capable of storing/containing or otherwise embodying the instructions, to the exclusion of a propagating signal per se. For example, such media can store or otherwise contain both operating instructions and operations instructions related to the various program code 51 and the method steps, described above.

This non-provisional patent application claims priority to and the benefit of U.S. Provisional Patent Application No. 61/612,470, filed on Mar. 19, 2012, titled "System, Method, and Computer Program For Simultaneous Processing Utility Systems Synthesis in Partially and Fully Decentralized Environments," and is related to U.S. Non-Provisional application titled "Systems and Computer Programs For Simultaneous Process and Utility Systems Synthesis in Partially Fully Decentralized Environments," filed on Feb. 1, 2013, as U.S. application Ser. No. 13/757,491, each incorporated by reference in its entirety. See Appendix 1 for a list of additional related applications.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

Appendix 1

Related Applications

The following applications and patents are each Incorporated by reference in their entirety:

U.S. Application No. 12/767,217, filed April 26, 2010, now U.S. Patent 8,032,262 titled System, Method, and Program Product for Synthesizing Non-Constrained and Constrained Heat Exchanger Networks, is a continuation-in-part of U.S. Application No. 12/575,743 filed on October 8, 2009, which claims priority to and the benefit of U.S. Provisional Application No. 61/256,754 filed on October 30, 2009;

U.S. Patent Application No. 12/575,743, filed October 8, 2009, now U.S. Patent 7,729,809, titled "System, Method, and Program Product for Targeting and Identification of Optimal Process Variables in Constrained Energy Recovery Systems";

U.S. Patent Application No. 11/768,084, filed June 25, 2007, titled "System, Method, and Program Product for Targeting an Optimal Driving Force Distribution in Energy Recovery Systems", now U.S. Patent No. 7,698,022, which claims priority to and the benefit of U.S. Provisional Application No. 60/816,234, filed June 23, 2006, titled "Method and Program Product for Targeting and Optimal Driving Force Distribution in Energy Recovery Systems," each incorporated herein by reference in its entirety.

U.S. Patent Application No. 12/715,255, filed March 1, 2010, now U.S. Patent 7,873,443 titled System, Method and Program Product for Targeting and Optimal Driving Force Distribution in Energy Recovery Systems, which claims priority to and the benefit of U.S. Application No. 11/768,084 filed on June 25, 2007;

U.S. Application No. 12/480,415 filed June 8, 2009, titled Method and Software for Global Targeting of Process Utilities under Varying Conditions, which claims priority to and the benefit of U.S. Provisional Application 61/208,874 filed on June 6, 2008, U.S. Provisional Application No. 61/171,030, filed on April 20, 2009; and U.S. Provisional Application 61/172,698 filed on April 24, 2009.

U.S. Application No. 12/898,461, filed October 5, 2010, titled Systems, Program Product, and Methods for Synthesizing Heat Exchanger Networks that Exhibit Life-Cycle Switchability and Flexibility under all Possible Combinations of Process Variations; which claims priority to and the benefit of U.S. Provisional Application No. 61/356,900, filed on June 21, 2010;

U.S. Application No. 12/767,275, filed April 26,2010, titled System, Method, and Program Product For Synthesizing Non-Thermodynamically Constrained Heat Exchanger Networks, which claims priority to and the benefit of U.S. Provisional Application No. 61/256,754, filed on October 30, 2009;

U.S. Application No. 12/767,315, filed April 26,2010, tiled System, Method, and Program Product for Synthesizing Heat Exchanger Networks and Identifying Optimal Topography for Future Retrofit, which claims priority to and the benefit of U.S. Provisional Application No. 61/256,754:

U.S. Application No. 12/898,484 filed October 5, 2010, titled Systems, Program Product, and Methods for Targeting Optimal Process Conditions that Render an Optimal Heat Exchanger Network Design Under Varying Conditions, which claims priority to and the benefit of U.S. Provisional Application No. 61/356,900, filed on June 21, 2010;

U.S. Application No. 12/898,475,filed October 5, 2010, titled Systems, Program Product, and Methods for Synthesizing Heat Exchanger Networks that Account for Future Higher Levels of Disturbances and Uncertainty, and Identifying Optimal Topology for Future Retrofit, which claims priority to and benefit of U.S. Provisional Patent Application 61/356,900 filed on June 21, 2010.

U.S. Application No. 13/041,057, filed March 4, 2011, titled "Systems and Program Product For Heat Exchanger Network Energy Efficiency Assessment and Lifetime Retrofit", which is a continuation-in-part of and claims priority to and the benefit of U.S. Application No. 12/767,315 filed on April 26, 2010.

U.S. Application No. 13/041,087, filed March 4, 2011, titled "Methods For Heat Exchanger Network Energy Efficiency Assessment and Lifetime Retrofit", which is a continuation-in-part of and claims priority to and the benefit of U.S. Application Nos. 12/767,315, 12/767,275, 12/767,217, filed on April 26, 2010.

Appendix 2

Original Sets:

HDR : Steam headers.

BLR : Boilers.

COGEN : Cogeneration Units.

SOLAR: Solar thermal units

STG: Steam turbine generator units.

CSTG : Condensing steam turbine generator units.

BOS: Break over stations.

COND : Condensers

PST : Process steam turbines.

MSwitch: Motors switchable to process steam turbines

PSGen: Process steam generators.

PCDem: Process cooling demand

FUEL: Fuel types

Derived Sets:

BLRHDR[$BLR \times HDR$] : Matching between each boiler and the header it is connected to.

COGENHDR[$COGEN \times HDR$] : Matching between each cogen and the header connected to.

SOLARHDR[$SOLAR \times HDR$] : Matching between each Solar thermal unit and the header connected to.

STGInHDR[$STG \times HDR$] : Input steam header to the STG.

STGOutHDR[$STG \times HDR$] : Output steam header from the STG.

CSTGHDR[$CSTG \times HDR$] : Input steam header to the CSTG.

BOSIn[$BOS \times HDR$] : Input steam header to the breakover station.

BOSOut[$BOS \times HDR$] : Output steam header of the breakover station.

CONDHDR[$COND \times HDR$] : Condenser Input steam header.

DEAStmHDR[$HDR$] : Deaerator steam header.

PSTInHDR[$PST \times HDR$] : Inlet steam header to process steam turbine.

PSTOutHDR[$PST \times HDR$] : Outlet header from process steam turbine.

PSGenHDR[$PSGen \times HDR$] : Outlet header from process steam generator.

Parameters

Seam Headers:

$HDRPres[i \in HDR]$: Header Pressure.

$HDRTemp[i \in HDR]$: Header Temperature.

$HDRLoss[i \in HDR]$: % loss of steam from header.

$HDRRet[i \in HDR]$: Steam returning from process to header (flash recovery).

$HDRBfw[i \in HDR]$: BFW to a steam header $HDRMaxDem[i \in HDR]$: Maximum process steam demand on a header $HDRMinDem[i \in HDR]$: Minimum process steam demand on a header $HDREnth[i \in HDR]$: Enthalpy of a steam header.

$HDRCost[i \in HDR]$: Cost of header

Boilers:

$BLRCap[i \in BLR]$: Steam generation capacity of boiler.

$BLRMin[i \in BLR]$: Minimum allowable steam generation rate for an operating boiler.

$BLRc0[i \in BLR]$: Boiler fuel consumption constant coefficient.

$BLRc1[i \in BLR]$: Boiler fuel consumption linear coefficient.

$BLRc2[i \in BLR]$: Boiler fuel consumption quadratic coefficient.

$BLRCC[i \in BLR]$: Boiler's cycle of concentration.

$BLRLoss[i \in BLR]$: Boiler's % loss of boiler feed water.

$BLRPrice[i \in BLR]$: Annualized capital cost of boiler of the given specs.

Cogeneration:

$COGENCap[i \in COGEN]$: Power generation capacity of the cogen unit.

$COGENMin[i \in COGEN]$: Minimum power generation of an operational cogen unit.

$COGENStmRatio[i \in COGEN]$: Steam to power ratio of the cogen unit.

$COGENc0[i \in COGEN]$: Fuel consumption constant coefficient.

$COGENc1[i \in COGEN]$: Fuel consumption linear coefficient.

$COGENc2[i \in COGEN]$: Fuel consumption quadratic coefficient.

COGENCC[i ∈ COGEN]: Cogen's cycle of concentration parameter for the HRSG.

COGENLoss[i ∈ COGEN]: Water loss from cogen unit as a % of BFW.

COGENPrice[i ∈ COGEN]: Annualized capital cost of a cogen units of the given specs.

Steam Turbine Generator:

STGEff[i ∈ STG]: Isentropic efficiency of the steam turbine generator.

STGCap[i ∈ STG]: Steam capacity of STG.

STGLoss[i ∈ STG]: % of steam loss from STG.

STGEnthIn[i ∈ STG]: STG input steam enthalpy from input steam header.

STGEnthOut[i ∈ STG]: STG output steam enthalpy.

STGPrice[i ∈ STG]: Annualized capital cost of an STG unit of the given specs.

Condensing Steam Turbine Generator:

CSTGEff[i ∈ CSTG]: Isentropic efficiency of the condensing steam turbine generator.

CSTG[i ∈ CSTG]: Steam flow capacity through the CSTG.

CSTGLoss[i ∈ CSTG]: % of steam loss from CSTG.

CSTGStmEnthIn[i ∈ CSTG]: Enthalpy of input steam to the CSTG.

CSTGStmEnthOut[i ∈ CSTG]: Enthalpy specs of the steam out of the CSTG (out of the STG stage).

CSTGWtrEnth[i ∈ CSTG]: Enthalpy specs of condensate water of CSTG.

CSTGDutyEnth[i ∈ CSTG]: Enthalpy of duty of condensed water of CSTG.

CSTGPrice[i ∈ CSTG]: Annualized capital cost of CSTG.

Breakover Station:

BOSCap[i ∈ BOS]: Seam capacity of the breakover station.

BOSLoss[i ∈ BOS]: % of steam loss from the BOS.

BOSStm[i ∈ BOS]: Steam flow to BOS

BOSEnth[i ∈ BOS]: Enthalpy of BOS steam.

BOSPrice[i ∈ BOS]: Annualized capital cost of a BOSS of the given specs.

Condenser:

$CONDCap[i \in COND]$: Capacity of steam flow through the condenser.

$CONDLoss[i \in COND]$: % loss of steam flow through the condenser.

$CONDStm_{x[i \in COND]}$: Steam quality at the condenser output.

$CONDEnth[i \in COND]$: Enthalpy of condenser output.

$CONDEnthDuty[i \in COND]$: Enthalpy of condenser duty.

$CONDPrice[i \in COND]$: Annualized capital cost of a condenser unit with the given specs.

Process Steam Turbine:

$PSTLoss[i \in PST]$: % loss of steam flow through PST.

$PSTDem[i \in PST]$: Steam demand for the PST.

$PSTEnth[i \in PST]$: Enthalpy of the outlet steam from the PST.

Switchable Motors to Process Steam Turbines:

$MSwitchHp[i \in MSwitch]$: HP required by process driven by switchable motors $MSwitchEff[i \in MSwitch]$: Efficiency of switchable motors $MSwitchMWToPST[i \in MSwitch]$: Power demand in motors switchable to Process Steam Turbines $MSwitchStmToPST[i \in MSwitch]$: Steam flow to process steam turbines switchable with motor

Process Steam Generator:

$PSGenEnth[i \in PST]$: Enthalpy of outlet steam from process steam generator.

$PSGenMaxProd[i \in HDR]$: Maximum Steam production rate of process steam generator.

$PSGenMinProd[i \in HDR]$: Minimum Steam production rate of process steam generator.

Solar Thermal Unit:

$SOLARBfwEnth[i \in SOLAR]$: BFW Enthalpy to solar thermal unit $SOLAROutEnth[i \in SOLAR]$: Enthalpy of Hot water or steam generated from solar thermal unit $SOLARStm_{x[i \in SOLAR]}$: Quality of steam generated from solar thermal unit $SOLAREff[i \in SOLAR]$: Efficiency of Solar thermal unit $SOLARRad[i \in SOLAR]$: Avg. Daily heat radiation from sun (kwh)

$SOLARCost[i \in SOLAR]$: Annualized cost of Solar thermal unit

Condensate System:

$SkimTankLoss$ : % losses from skim tank.

$MWWtrEnth$ : Enthalpy of the makeup water.

$CondRetFlow$ : Flow rate of the return condensate.

$CondCoolerLoss$ : % loss of condensate from condensate coolers.

$CondRetTargEnth$ : The target enthalpy of the return condensate.

Deaerator:

$DEAStm$ : Steam flow to the deaerator.

$DEAStmEnth$ : Enthalpy of the steam used in the deaerator.

$DEAOutWtrEnth$ : Enthalpy of the water leaving the deaerator.

$DEALoss$ : % loss of water from dearator.

$DEAVentFlow$ : Flow rate of steam vented from the deaerator.

$DEAVentEnth$ : Enthalpy of the steam vented from the deaerator.

Power:

$ProcPwrDem$ : Power demand from the process (fixed and variable loads).

$FixedPwrDem$ : Power demand for other than process (buildings, etc).

Fuel:

$FuelType[i \in Fuel]$ : Type of fuels $FuelMaxAv[i \in Fuel]$ : Maximum quantity of a fuel type $FuelHV[i \in Fuel]$ : Heating value of a fuel type $FuelPrice[i \in Fuel]$ : Price of a fuel type

Economics:

PriceImp$Pwr$ : Imported power price.

PriceExpPwr : Exported power price.

PriceMUWtr : Makeup water price.

Variables:

Steam Headers:

HDRIn[i ∈ HDR] : Steam flow into header.

HDROut[$i$ ∈ $HDR$] : Steam flow out of header.

HDRBFW[$i$ ∈ $HDR$] : Boiler feed water injected into header to maintain header enthalpy specs.

HDRDem[$i$ ∈ $HDR$] : Process steam demand on a header; Determine optimal values of Steam for heating demand at different headers within a given intervals Boilers:

BLROn[i ∈ BLR] : Binary variable to determine whether the boiler is on or off (Binary).

BLRBFW[$i$ ∈ $BLR$] : Boiler feed water into boiler.

BLRSTM[$i$ ∈ $BLR$] : Boiler steam generation rate.

BLRBD[i ∈ BLR] : Blowdown from boiler.

BLRFuel[$i$ ∈ $BLR$] : Boiler's fuel consumption rate.

BLRNo[i ∈ BLR] : Number of installed units of the boiler (Nonnegative integer).

Cogeneration:

COGENOn[i ∈ COGEN] : Binary variable to determine whether a cogen unit is on or off (Binary).

COGENPwr[i ∈ COGEN] : Power generation rate from cogen unit.

COGENBFW[i ∈ COGEN] : Boiler feed water to cogen unit.

COGENStm[i ∈ COGEN] : Steam generation rate from cogen unit.

COGENBD[i ∈ COGEN] : Water blowdown rate from cogen unit.

COGENFuel[i ∈ COGEN] : Fuel consumption rate of cogen unit.

COGENNo[i ∈ COGEN] : Number of installed cogen units (Nonnegative integer)

Solar Steam Generator:

SOLARStm[$so$] : Steam flow from solar thermal unit

SOLARNo[$so$] : Binary variable of solar thermal unit

Steam Turbine Generator:

STGStm[$i \in STG$] : Steam flow through the STG.

STGPwr[$i \in STG$] : Power generation from the STG.

STGNo[$i \in STG$] : Number of installations of the STG.

Condensing Steam Turbine Generator:

CSTGStm[$i \in CSTG$] : Steam flow rate through CSTG.

CSTGPwr[$i \in CSTG$] : Power generated from CSTG.

CSTGDuty[$i \in CSTG$] : Duty of CSTG condenser.

CSTGNo[$i \in CSTG$] : Number of installed units of CSTG of the given specs.

Switchable Motors to Process Steam Turbines:

MSwitchOnOff[$i \in MSwitch$] : binary variable (0/1) of a switchable motor

PSTSwitchStm[$i \in MSwitch$] : steam flow to process steam turbines switchable with motors

Break over Station:

BOSStm[$i \in BOS$] : Steam flow through the BOS.

BOSNo[$i \in BOS$] : Number of installed BOS units.

Condenser:

CONDStm[$i \in COND$] : Steam flowrate through the condenser.

CONDDuty[$i \in COND$] : Duty of the condenser.

CONDNo[$i \in COND$] : Number of installed condenser units.

Condensate System:

SkimTankInFlow : Input flowrate to skim tank.

SkimTankOutFlow : Output flowrate from skim tank.

SkimTankOutEnth : Enthalpy of skim tank outlet.

MUWtrFlow : Flow rate of makeup water to the system.

Deaerator:

DEAStmFlow : Dearator steam flow rate.

DEAOutWtrFlow : Dearator output water flow rate.

Process Steam Generator:

PSGenProd[$i \in PST$] : Steam production rate of process steam generator.

Boiler Feed water System:

BFWFlow : Boiler feedwater flow rate.

Process Cooling Demand:

PCoolingDem[$i \in PCDem$] : Determine optimal values of: steam for cooling demand, water cooling, air-cooling and refrigeration cooling demands

Appendix 3

Model:

H1_in_temp = 510.0 ;

H1_in_fcb = 1.0 ;

H2_in_temp >= 610.0 ; H2_in_temp <= 630.0 ;

H2_in_fcb = 2.0 ;

H1_out_temp = 210.0 ;

H1_out_fcb = 1.0 ;

H2_out_temp = 230.0 ;

H2_out_fcb = 2.0 ;

C1_in_temp = 400.0 ;

C1_in_fcb = 4.0 ;

C2_in_temp >= 0.0 ; C2_in_temp <= 170.0 ;

C2_in_fcb = 2.0 ;

C1_out_temp = 600.0 ;

C1_out_fcb = 4.0 ;

C2_out_temp = 460.0 ;

C2_out_fcb = 2.0 ;

CU1_temp = 220.0 ;

CU1_fcb >= 60.0 ; CU1_fcb <= 100.0 ;

HU2_temp = 480.0 ;

HU2_fcb = 120.0 ;

HU3_temp = 630.0 ;

HU3_fcb >= 260.0 ; HU3_fcb <= 300.0 ;

CU1_exiting_temp = 221.0 ;

CU1_exiting_fcb >= 60.0 ; CU1_exiting_fcb <= 100.0 ;

HU2_exiting_temp = 479.0 ;

HU2_exiting_fcb = 120.0 ;

HU3_exiting_temp = 629.0 ;

HU3_exiting_fcb >= 260.0 ; HU3_exiting_fcb <= 300.0 ;

E1_q = 100.0 ;

```
E1_theta_1 >= 10.0 ;
E1_theta_2 >= 10.0 ;
E1_u = 1.2 ;
E2_q = 200.0 ;
E2_theta_1 >= 10.0 ;
E2_theta_2 >= 10.0 ;
E2_u = 1.5 ;
E3_q >= 400.0 ; E3_q <= 440.0 ;
E3_theta_1 >= 10.0 ;
E3_theta_2 >= 10.0 ;
E3_u = 1.0 ;
E4_q >= 260.0 ; E4_q <= 300.0 ;
E4_theta_1 >= 10.0 ;
E4_theta_2 >= 10.0 ;
E4_u = 2.0 ;
U1_q >= 60.0 ; U1_q <= 100.0 ;
U1_theta_1 >= 10.0 ;
U1_theta_2 >= 10.0 ;
U1_u = 1.5 ;
U2_q = 120.0 ;
U2_theta_1 >= 10.0 ;
U2_theta_2 >= 10.0 ;
U2_u = 2.0 ;
U3_q >= 260.0 ; U3_q <= 300.0 ;
U3_theta_1 >= 10.0 ;
U3_theta_2 >= 10.0 ;
U3_u = 2.0 ;

! J1 ;
C1_in_fcb = J1_to_E3_c_in_fcb + J1_to_J2_fcb + J1_to_E1_c_in_fcb
;
```

```
J1_to_E3_c_in_temp = C1_in_temp;J1_to_J2_temp =
C1_in_temp;J1_to_E1_c_in_temp = C1_in_temp ;

! J2 ;
E3_c_out_to_J2_fcb + J1_to_J2_fcb + E1_c_out_to_J2_fcb =
J2_to_U3_c_in_fcb ;
E3_c_out_to_J2_fcb * E3_c_out_to_J2_temp + J1_to_J2_fcb *
J1_to_J2_temp + E1_c_out_to_J2_fcb * E1_c_out_to_J2_temp =
J2_to_U3_c_in_fcb * J2_to_U3_c_in_temp ;

! J3 ;
C2_in_fcb = J3_to_E2_c_in_fcb + J3_to_E4_c_in_fcb ;
J3_to_E2_c_in_temp = C2_in_temp;J3_to_E4_c_in_temp = C2_in_temp
;

! J4 ;
E2_c_out_to_J4_fcb + E4_c_out_to_J4_fcb = J4_to_U2_c_in_fcb ;
E2_c_out_to_J4_fcb * E2_c_out_to_J4_temp + E4_c_out_to_J4_fcb *
E4_c_out_to_J4_temp = J4_to_U2_c_in_fcb * J4_to_U2_c_in_temp ;

! E1_h_in ;
H1_in_fcb = E1_h_in_to_h_fcb ;
E1_h_in_to_h_temp = H1_in_temp ;

! E1_h_out ;
E1_h_to_h_out_fcb = E1_h_out_to_E2_h_in_fcb ;
E1_h_out_to_E2_h_in_temp = E1_h_to_h_out_temp ;

! E1_c_in ;
J1_to_E1_c_in_fcb = E1_c_in_to_c_fcb ;
E1_c_in_to_c_temp = J1_to_E1_c_in_temp ;
```

```
! E1_c_out ;
E1_c_to_c_out_fcb = E1_c_out_to_J2_fcb ;
E1_c_out_to_J2_temp = E1_c_to_c_out_temp ;

! E2_h_in ;
E1_h_out_to_E2_h_in_fcb = E2_h_in_to_h_fcb ;
E2_h_in_to_h_temp = E1_h_out_to_E2_h_in_temp ;

! E2_h_out ;
E2_h_to_h_out_fcb = H1_out_fcb ;
H1_out_temp = E2_h_to_h_out_temp ;

! E2_c_in ;
J3_to_E2_c_in_fcb = E2_c_in_to_c_fcb ;
E2_c_in_to_c_temp = J3_to_E2_c_in_temp ;

! E2_c_out ;
E2_c_to_c_out_fcb = E2_c_out_to_J4_fcb ;
E2_c_out_to_J4_temp = E2_c_to_c_out_temp ;

! E3_h_in ;
H2_in_fcb = E3_h_in_to_h_fcb ;
E3_h_in_to_h_temp = H2_in_temp ;

! E3_h_out ;
E3_h_to_h_out_fcb = E3_h_out_to_E4_h_in_fcb ;
E3_h_out_to_E4_h_in_temp = E3_h_to_h_out_temp ;

! E3_c_in ;
J1_to_E3_c_in_fcb = E3_c_in_to_c_fcb ;
E3_c_in_to_c_temp = J1_to_E3_c_in_temp ;
```

```
! E3_c_out ;
E3_c_to_c_out_fcb = E3_c_out_to_J2_fcb ;
E3_c_out_to_J2_temp = E3_c_to_c_out_temp ;

! E4_h_in ;
E3_h_out_to_E4_h_in_fcb = E4_h_in_to_h_fcb ;
E4_h_in_to_h_temp = E3_h_out_to_E4_h_in_temp ;

! E4_h_out ;
E4_h_to_h_out_fcb = E4_h_out_to_U1_h_in_fcb ;
E4_h_out_to_U1_h_in_temp = E4_h_to_h_out_temp ;

! E4_c_in ;
J3_to_E4_c_in_fcb = E4_c_in_to_c_fcb ;
E4_c_in_to_c_temp = J3_to_E4_c_in_temp ;

! E4_c_out ;
E4_c_to_c_out_fcb = E4_c_out_to_J4_fcb ;
E4_c_out_to_J4_temp = E4_c_to_c_out_temp ;

! U1_h_in ;
E4_h_out_to_U1_h_in_fcb = U1_h_in_to_h_fcb ;
U1_h_in_to_h_temp = E4_h_out_to_U1_h_in_temp ;

! U1_h_out ;
U1_h_to_h_out_fcb = H2_out_fcb ;
H2_out_temp = U1_h_to_h_out_temp ;

! U1_c_in ;
CU1_fcb = U1_c_in_to_c_fcb ;
U1_c_in_to_c_temp = CU1_temp ;
```

```
! U1_c_out ;
U1_c_to_c_out_fcb = CU1_exiting_fcb ;
CU1_exiting_temp = U1_c_to_c_out_temp ;

! U2_h_in ;
HU2_fcb = U2_h_in_to_h_fcb ;
U2_h_in_to_h_temp = HU2_temp ;

! U2_h_out ;
U2_h_to_h_out_fcb = HU2_exiting_fcb ;
HU2_exiting_temp = U2_h_to_h_out_temp ;

! U2_c_in ;
J4_to_U2_c_in_fcb = U2_c_in_to_c_fcb ;
U2_c_in_to_c_temp = J4_to_U2_c_in_temp ;

! U2_c_out ;
U2_c_to_c_out_fcb = C2_out_fcb ;
C2_out_temp = U2_c_to_c_out_temp ;

! U3_h_in ;
HU3_fcb = U3_h_in_to_h_fcb ;
U3_h_in_to_h_temp = HU3_temp ;

! U3_h_out ;
U3_h_to_h_out_fcb = HU3_exiting_fcb ;
HU3_exiting_temp = U3_h_to_h_out_temp ;

! U3_c_in ;
J2_to_U3_c_in_fcb = U3_c_in_to_c_fcb ;
U3_c_in_to_c_temp = J2_to_U3_c_in_temp ;
```

```
! U3_c_out ;
U3_c_to_c_out_fcb = C1_out_fcb ;
C1_out_temp = U3_c_to_c_out_temp ;

! E1 inner Junctions   ;
E1_h_in_to_h_fcb = E1_h_to_h_out_fcb ;
E1_c_in_to_c_fcb = E1_c_to_c_out_fcb ;

! E2 inner Junctions   ;
E2_h_in_to_h_fcb = E2_h_to_h_out_fcb ;
E2_c_in_to_c_fcb = E2_c_to_c_out_fcb ;

! E3 inner Junctions   ;
E3_h_in_to_h_fcb = E3_h_to_h_out_fcb ;
E3_c_in_to_c_fcb = E3_c_to_c_out_fcb ;

! E4 inner Junctions   ;
E4_h_in_to_h_fcb = E4_h_to_h_out_fcb ;
E4_c_in_to_c_fcb = E4_c_to_c_out_fcb ;

! U1 inner Junctions   ;
U1_h_in_to_h_fcb = U1_h_to_h_out_fcb ;
U1_c_in_to_c_fcb = U1_c_to_c_out_fcb ;

! U2 inner Junctions   ;
U2_h_in_to_h_fcb = U2_h_to_h_out_fcb ;
U2_c_in_to_c_fcb = U2_c_to_c_out_fcb ;

! U3 inner Junctions   ;
U3_h_in_to_h_fcb = U3_h_to_h_out_fcb ;
U3_c_in_to_c_fcb = U3_c_to_c_out_fcb ;
```

```
! Heat Exchangers ;

! E1 ;
E1_q = (E1_h_in_to_h_temp - E1_h_to_h_out_temp) *
E1_h_in_to_h_fcb ;
E1_q = (E1_c_to_c_out_temp - E1_c_in_to_c_temp) *
E1_c_in_to_c_fcb ;
E1_theta_1 = E1_h_to_h_out_temp - E1_c_in_to_c_temp ;
E1_theta_2 = E1_h_in_to_h_temp - E1_c_to_c_out_temp ;
E1_lmtd = ((E1_theta_1 * E1_theta_2) * (E1_theta_1 + E1_theta_2)
/ 2) ^ 0.333 ;
E1_area = E1_q / (E1_u * E1_lmtd) ;

! E2 ;
E2_q = (E2_h_in_to_h_temp - E2_h_to_h_out_temp) *
E2_h_in_to_h_fcb ;
E2_q = (E2_c_to_c_out_temp - E2_c_in_to_c_temp) *
E2_c_in_to_c_fcb ;
E2_theta_1 = E2_h_to_h_out_temp - E2_c_in_to_c_temp ;
E2_theta_2 = E2_h_in_to_h_temp - E2_c_to_c_out_temp ;
E2_lmtd = ((E2_theta_1 * E2_theta_2) * (E2_theta_1 + E2_theta_2)
/ 2) ^ 0.333 ;
E2_area = E2_q / (E2_u * E2_lmtd) ;

! E3 ;
E3_q = (E3_h_in_to_h_temp - E3_h_to_h_out_temp) *
E3_h_in_to_h_fcb ;
E3_q = (E3_c_to_c_out_temp - E3_c_in_to_c_temp) *
E3_c_in_to_c_fcb ;
E3_theta_1 = E3_h_to_h_out_temp - E3_c_in_to_c_temp ;
E3_theta_2 = E3_h_in_to_h_temp - E3_c_to_c_out_temp ;
```

```
E3_lmtd = ((E3_theta_1 * E3_theta_2) * (E3_theta_1 + E3_theta_2)
/ 2) ^ 0.333 ;
E3_area = E3_q / (E3_u * E3_lmtd) ;

! E4 ;
E4_q = (E4_h_in_to_h_temp - E4_h_to_h_out_temp) *
E4_h_in_to_h_fcb ;
E4_q = (E4_c_to_c_out_temp - E4_c_in_to_c_temp) *
E4_c_in_to_c_fcb ;
E4_theta_1 = E4_h_to_h_out_temp - E4_c_in_to_c_temp ;
E4_theta_2 = E4_h_in_to_h_temp - E4_c_to_c_out_temp ;
E4_lmtd = ((E4_theta_1 * E4_theta_2) * (E4_theta_1 + E4_theta_2)
/ 2) ^ 0.333 ;
E4_area = E4_q / (E4_u * E4_lmtd) ;

! U1 ;
U1_q = (U1_h_in_to_h_temp - U1_h_to_h_out_temp) *
U1_h_in_to_h_fcb ;
U1_q = (U1_c_to_c_out_temp - U1_c_in_to_c_temp) *
U1_c_in_to_c_fcb ;
U1_theta_1 = U1_h_to_h_out_temp - U1_c_in_to_c_temp ;
U1_theta_2 = U1_h_in_to_h_temp - U1_c_to_c_out_temp ;
U1_lmtd = ((U1_theta_1 * U1_theta_2) * (U1_theta_1 + U1_theta_2)
/ 2) ^ 0.333 ;
U1_area = U1_q / (U1_u * U1_lmtd) ;

! U2 ;
U2_q = (U2_h_in_to_h_temp - U2_h_to_h_out_temp) *
U2_h_in_to_h_fcb ;
U2_q = (U2_c_to_c_out_temp - U2_c_in_to_c_temp) *
U2_c_in_to_c_fcb ;
U2_theta_1 = U2_h_to_h_out_temp - U2_c_in_to_c_temp ;
```

```
U2_theta_2 = U2_h_in_to_h_temp - U2_c_to_c_out_temp ;
U2_lmtd = ((U2_theta_1 * U2_theta_2) * (U2_theta_1 + U2_theta_2)
/ 2) ^ 0.333 ;
U2_area = U2_q / (U2_u * U2_lmtd) ;

! U3 ;
U3_q = (U3_h_in_to_h_temp - U3_h_to_h_out_temp) *
U3_h_in_to_h_fcb ;
U3_q = (U3_c_to_c_out_temp - U3_c_in_to_c_temp) *
U3_c_in_to_c_fcb ;
U3_theta_1 = U3_h_to_h_out_temp - U3_c_in_to_c_temp ;
U3_theta_2 = U3_h_in_to_h_temp - U3_c_to_c_out_temp ;
U3_lmtd = ((U3_theta_1 * U3_theta_2) * (U3_theta_1 + U3_theta_2)
/ 2) ^ 0.333 ;
U3_area = U3_q / (U3_u * U3_lmtd) ;
! Objective     ;
MIN = E1_area + E2_area + E3_area + E4_area + U1_area + U2_area
+ U3_area ;
calc:
 @SET('GLOBAL',1);
endcalc
end
Go
DIVERT solution.txt
SOLUTION
RVRT
QUIT ;
```

The invention claimed is:

1. A method for simultaneous synthesis of combined heat and power utility and process subsystems for a process facility, the method comprising the steps of:
    defining model input data for a combined heat and power utility and process subsystem mathematical program model, the model comprising a cost function configured to minimize a total cost of combined heat and power utility and process subsystems of a process facility, the combined heat and power utility and process subsystems comprising a utility subsystem configured to generate steam and a process subsystem configured to consume steam generated by the utility subsystem, and the model input data comprising a plurality of rigorously bounded process variables for one or more key process of the process facility, the plurality of rigorously bounded process variables comprising, for each of the one or more key processes:
        process steam demand intervals for the key process, the process steam demand intervals comprising a process steam demand interval for each of a plurality of different steam pressure levels, wherein each process steam demand interval for a steam pressure level comprises an upper bound and a lower bound of process steam demand for the key process at the steam pressure level; and
        a process power generation interval for the key process, the process power generation interval comprising an upper bound and a lower bound of power generation for the key process; and
    processing, by a computer, the model input data through application of the combined heat and power utility and process subsystem mathematical program model to determine model output data comprising process subsystem conditions and utility subsystem conditions, the process subsystem conditions comprising, for each of the one or more key processes:
        process steam demand load values corresponding to the process steam demand intervals for the key process, the process steam demand load values comprising a process steam demand load value for each of the plurality of different steam pressure levels; and
        a process power generation value corresponding to the process power generation interval.

2. A method as defined in claim 1,
    wherein the process subsystem conditions and the utility subsystem conditions are determined simultaneously through application of the combined heat and power utility and process subsystem mathematical program model; and
    wherein the utility subsystem conditions include combined heat and power utility subsystem steam and power generation and allocation values.

3. A method as defined in claim 1, wherein the utility subsystem conditions comprise a number of steam headers for the utility subsystem and operating conditions of each steam header.

4. A method as defined in claim 1, wherein the utility subsystem conditions comprise a number of boilers for the modeled utility subsystem and designated capacities of each boiler.

5. A method as defined in claim 1, wherein the utility subsystem conditions comprise a number of steam turbine generators for the utility subsystem and capacity of each steam turbine generator.

6. A method as defined in claim 1, wherein the utility subsystem conditions comprise a number of cogeneration units for the utility subsystem and designated capacities of each cogeneration unit.

7. A method as defined in claim 1, wherein the process subsystem conditions comprise a number of electrical motors and steam turbines for process equipment driving and size of each.

8. A method as defined in claim 1, wherein the utility subsystem conditions comprise a size and location of solar power system for the modeled utility subsystem.

9. A method as defined in claim 1, further comprising:
    determining a first cost associated with the utility subsystem;
    determining a second cost associated with the process subsystem;
    determining a greater of the first cost associated with the utility subsystem and the second cost second cost associated with the process subsystem;
    in response to determining that the first cost associated with the utility subsystem is greater than the second cost associated with the process subsystem, determining the utility subsystem conditions; and
    determining the process subsystem conditions based on the utility subsystem conditions determined.

10. A method as defined in claim 1, further comprising one or more of the following steps:
    defining a number of steam headers and conditions thereof of the utility subsystem; and
    determining a shaft work network configuration of the utility subsystem, wherein the shaft work network configuration is indicative of a configuration of physical equipment.

11. A method as defined in claim 1, wherein determining the process subsystem conditions and the utility subsystem conditions comprises determining main design and operating conditions of a heat exchanger network (HEN) design and distillation network sequence for the process facility for possible combinations of process operation parametric changes for fully decentralized, partially decentralized, or both fully and partially decentralized process and utility systems design environments.

12. A method as defined in claim 11,
    wherein the main design and operating conditions of a HEN network design and distillation network sequence is determined using sources of fuel or energy available to a provider of the utility subsystem; and
    wherein the main design and operating conditions of a HEN network design and distillation network sequence is determined responsive to receiving, determining, or receiving and determining a plurality of sets of values each defining a potential range of attribute values of a separate one of a corresponding plurality of process operation parametric changes.

13. A method as defined in claim 1, wherein the process subsystem conditions render a minimum number of heat exchanger network (HEN) units for the process facility for possible distillation columns sequences.

14. A method as defined in claim 1, wherein the process subsystem conditions render a minimum total heat exchanger surface area of a heat exchanger network (HEN) design for the process facility and define the surface area of each heat exchanger unit in the HEN.

15. A method as defined in claim 14, wherein determining the process subsystem conditions which render the minimum total heat exchanger surface area comprises determining process subsystem conditions for:

one or more possible combinations of steam generation and demand loads' levels; and one or more combinations of steam generation and demand loads' levels.

16. A method as defined in claim 14, wherein determining the process subsystem conditions which render the minimum total heat exchanger surface area comprises determining process subsystem conditions for:
    one or more possible distillation columns sequences;
    one or more possible distillation columns sequences in conjunction with one or more possible combinations of steam generation and demand loads' levels; and
    one or more possible distillation columns sequences and one or more combinations of steam generation and demand loads' levels.

17. A method as defined in claim 14, wherein determining the process subsystem conditions which render the minimum total heat exchanger surface area comprises determining process subsystem conditions for:
    one or more possible HEN configurations and one or more possible combinations of steam generation and demand loads' levels; and
    one or more possible HEN configurations and one or more combinations of steam generation and demand loads' levels.

18. A method as defined in claim 1, further comprising designing the process facility based on the process subsystem conditions and utility subsystem conditions.

19. A method for simultaneous synthesis of combined heat and power utility and process systems for a chemical plant, the method comprising the step of:
    defining model input data for a combined heat and power utility and process subsystem mathematical program model, the model comprising a cost function configured to minimize a total cost of combined heat and power utility and process subsystems of a chemical plant, the combined heat and power utility and process subsystems comprising a utility subsystem configured to generate steam and a process subsystem configured to consume steam generated by the utility subsystem, and the model input data comprising a plurality of rigorously bounded process variables for one or more key process of the chemical plant, the plurality of rigorously bounded process variables comprising, for each of the one or more key processes:
        process steam demand intervals for the key process, the process steam demand intervals comprising a process steam demand interval for each of a plurality of different steam pressure levels, wherein each process steam demand interval for a steam pressure level comprises an upper bound and a lower bound of process steam demand for the key process at the steam pressure level; and
        a process power generation interval for the key process, the process power generation interval comprising an upper bound and a lower bound of power generation for the key process; and
    processing, by a computer, the model input data through application of the combined heat and power utility and process subsystem mathematical program model to determine model output data comprising process subsystem conditions and utility subsystem conditions, the process subsystem conditions comprising, for each of the one or more key processes:
        process steam demand load values corresponding to the process steam demand intervals for the key process, the process steam demand load values comprising a process steam demand load value for each of the plurality of different steam pressure levels; and
        a process power generation value corresponding to the process power generation interval.

20. A method as defined in claim 19, wherein the process subsystem conditions and the utility subsystem conditions are determined simultaneously through application of the combined heat and power utility and process subsystem mathematical program model.

21. A method as defined in claim 19, further comprising:
    determining a first cost associated with the utility subsystem;
    determining a second cost associated with the process subsystem;
    determining a greater of the first cost associated with the utility subsystem and the second cost second cost associated with the process subsystem;
    in response to determining that the first cost associated with the utility subsystem is greater than the second cost associated with the process subsystem, determining the utility subsystem conditions; and
    determining the process system conditions based on the utility subsystem conditions determined.

22. A method as defined in claim 19, further comprising the steps of:
    defining a number of steam headers and conditions thereof of the utility system; and
    determining a shaft work network configuration of the utility system, wherein the shaft work network configuration is indicative of a configuration of physical equipment.

23. A method as defined in claim 19, wherein determining the process subsystem conditions and the utility subsystem conditions comprises determining a main design and operating conditions of a heat exchanger network (HEN) design and distillation network sequence for the chemical plant under possible combinations of process operation parametric changes for fully decentralized, partially decentralized, or both fully and partially decentralized process and utility systems design environments.

24. A method as defined in claim 23, wherein the main design and operating conditions of a HEN network design and distillation network sequence is determined using all generally available sources of fuel or energy available to the chemical plant.

25. A method as defined in claim 23, wherein the step of determining a main design and operating conditions of a HEN network design and distillation network sequence is determined responsive to receiving, determining, or receiving and determining a plurality of sets of values each defining a potential range of attribute values of a separate one of a corresponding plurality of process operation parametric changes.

26. A method as defined in claim 19, wherein the processing comprises determining the process subsystem conditions and the utility subsystem conditions based on possible combinations of process design parametric changes using sources of fuel or energy available to the utility system for both fully and partially decentralized process and utility systems design environments.

27. A method as defined in claim 19, wherein the processing comprises determining the process subsystem conditions and the utility subsystem conditions based on possible combinations of process design and operation parametric changes using sources of fuel or energy available to the utility system for both fully and partially decentralized process and utility systems design environments.

28. A method as defined in claim 19, wherein the processing comprises determining the process subsystem conditions and the utility subsystem conditions based on possible distillation sequences using sources of fuel or energy available to the utility system for both fully and partially decentralized process and utility systems design environments.

29. A method as defined in claim 19, wherein the processing comprises determining the process subsystem conditions and the utility subsystem conditions based on possible distillation sequences and under all reasonably possible combinations of process design and operation parametric changes using sources of fuel or energy available to the utility system for both fully and partially decentralized process and utility systems design environments.

30. A method as defined in claim 19, wherein the processing comprises determining the process subsystem conditions and the utility subsystem conditions based on possible heat exchanger network (HEN) designs using sources of fuel or energy available to the utility system for both fully and partially decentralized process and utility systems design environments.

31. A method as defined in claim 19, wherein the processing comprises determining the process subsystem conditions and the utility subsystem conditions based on possible heat exchanger network (HEN) designs and under all possible combinations of process design and operation parametric changes using sources of fuel or energy available to the utility system for both fully and partially decentralized process and utility systems design environments.

32. A method as defined in claim 19, wherein the processing comprises determining the process subsystem conditions and the utility subsystem conditions based on possible distillation columns sequences and heat exchanger network (HEN) designs using sources of fuel or energy available to the utility system for both fully and partially decentralized process and utility systems design environments.

33. A method as defined in claim 19, wherein the processing comprises determining the process subsystem conditions and the utility subsystem conditions based on possible distillation columns sequences and heat exchanger network (HEN) designs under possible combinations of process design and operation parametric changes using sources of fuel or energy available to the utility system for both fully and partially decentralized process and utility systems design environments.

34. A method as defined in claim 19, wherein the process subsystem conditions render a minimum number of heat exchanger network (HEN) units for the chemical plant for all possible distillation columns sequences.

35. A method as defined in claim 19, wherein the process subsystem conditions render a minimum total heat exchanger surface area of a heat exchanger network (HEN) design for the chemical plant and define the surface area of each heat exchanger unit in the HEN.

36. A method as defined in claim 35, wherein determining the process subsystem conditions which render the minimum total heat exchanger surface area comprises determining process subsystem conditions for one or more possible combinations of steam generation and demand loads' levels.

37. A method as defined in claim 35, wherein determining the process subsystem conditions which render the minimum total heat exchanger surface area comprises determining process subsystem conditions for one or more combinations of steam generation and demand loads' levels.

38. A method as defined in claim 35, wherein determining the process subsystem conditions which render the minimum total heat exchanger surface area comprises determining process subsystem conditions for one or more possible distillation columns sequences.

39. A method as defined in claim 35, wherein determining the process subsystem conditions which render the minimum total heat exchanger surface area comprises determining process subsystem conditions for one or more possible distillation columns sequences in conjunction with one or more possible combinations of steam generation and demand loads' levels.

40. A method as defined in claim 35, wherein determining the process subsystem conditions which render the minimum total heat exchanger surface area comprises determining process subsystem conditions for one or more possible distillation columns sequences and one or more combinations of steam generation and demand loads' levels.

41. A method as defined in claim 35, wherein determining the process subsystem conditions which render the minimum total heat exchanger surface area comprises determining process subsystem conditions for one or more possible HEN configurations and one or more possible combinations of steam generation and demand loads' levels.

42. A method as defined in claim 35, wherein determining the process subsystem conditions which render the minimum total heat exchanger surface area comprises determining process subsystem conditions for one or more possible HEN configurations and one or more combinations of steam generation and demand loads' levels.

43. A method as defined in 19, further comprising designing the chemical plant based on the process subsystem conditions and utility subsystem conditions.

* * * * *

UNITED STATES PATENT AND TRADEMARK OFFICE
CERTIFICATE OF CORRECTION

PATENT NO. : 9,606,594 B2  
APPLICATION NO. : 13/757467  
DATED : March 28, 2017  
INVENTOR(S) : Mahmoud Bahy Noureldin et al.

Page 1 of 1

It is certified that error appears in the above-identified patent and that said Letters Patent is hereby corrected as shown below:

In the Claims

In Column 73, Line 62, Claim 4, please delete the word "modeled"

In Column 74, Line 11, Claim 8, please delete the word "modeled"

In Column 74, Line 47, Claim 12, please delete the phrase "a provider of"

In Column 76, Line 43 & 44, Claim 24, please delete the phrase "all generally available"

In Column 76, Line 46 & 47, Claim 25, please delete the phrase "step of determining a"

In Column 77, Line 26, Claim 31, please delete the word "all"

In Column 77, Line 51, Claim 34, please delete the word "all"

Signed and Sealed this  
Second Day of May, 2017

Michelle K. Lee  
*Director of the United States Patent and Trademark Office*